(12) United States Patent
Woolston

(10) Patent No.: US 8,332,279 B2
(45) Date of Patent: Dec. 11, 2012

(54) METHODS AND SYSTEMS FOR SEARCHING FOR GOODS AND SERVICES

(75) Inventor: Thomas G. Woolston, Alexandria, VA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 12/978,102

(22) Filed: Dec. 23, 2010

(65) Prior Publication Data

US 2011/0099090 A1    Apr. 28, 2011

Related U.S. Application Data

(60) Continuation of application No. 09/166,779, filed on Oct. 6, 1998, now Pat. No. 7,937,312, which is a division of application No. 08/554,704, filed on Nov. 7, 1995, now Pat. No. 5,845,265, which is a continuation-in-part of application No. 08/427,820, filed on Apr. 26, 1995, now abandoned.

(51) Int. Cl.
  *G06Q 30/00*    (2012.01)
(52) U.S. Cl. ................. 705/26.1; 705/26.3; 705/26.4; 705/27.1
(58) Field of Classification Search .................. None
  See application file for complete search history.

(56) References Cited

U.S. PATENT DOCUMENTS

| | | | |
|---|---|---|---|
| 2,321,372 A | 6/1943 | Archibald | |
| 2,398,677 A | 4/1946 | Stockfeld | |
| 3,573,747 A | 4/1971 | Adams et al. | |
| 3,581,072 A | 5/1971 | Nymeyer | |
| 3,687,256 A | 8/1972 | Jones | |
| 4,063,220 A | 12/1977 | Metcalfe et al. | |
| 4,247,759 A | 1/1981 | Yuris et al. | |
| 4,270,042 A | 5/1981 | Case | |
| 4,274,759 A | 6/1981 | Long et al. | |
| 4,305,059 A | 12/1981 | Benton | |
| 4,346,442 A | 8/1982 | Musmanno | |
| 4,449,186 A | 5/1984 | Kelly et al. | |
| 4,553,222 A | 11/1985 | Kurland et al. | |
| 4,604,693 A | 8/1986 | Chadima | |
| 4,652,698 A | 3/1987 | Hale et al. | |

(Continued)

FOREIGN PATENT DOCUMENTS

EP    0467546 A2    1/1992

(Continued)

OTHER PUBLICATIONS

Artsearch Advertisement, (prior to 1993).

(Continued)

*Primary Examiner* — Gregory Johnson
(74) *Attorney, Agent, or Firm* — Schwegman Lundberg & Woessner, P.A.

(57) ABSTRACT

A method and apparatus for creating a computerized market for used and collectible goods by use of a plurality of low cost posting terminals and a market maker computer in a legal framework that establishes a bailee relationship and consignment contract with a purchaser of a good at the market maker computer that allows the purchaser to change the price of the good once the purchaser has purchased the good thereby to allow the purchaser to speculate on the price of collectibles in an electronic market for used goods while assuring the safe and trusted physical possession of a good with a vetted bailee.

83 Claims, 11 Drawing Sheets

U.S. PATENT DOCUMENTS

| | | | |
|---|---|---|---|
| 4,654,482 A * | 3/1987 | DeAngelis | 379/93.12 |
| 4,674,044 A | 6/1987 | Kalmus et al. | |
| 4,677,552 A | 6/1987 | Sibley, Jr. | |
| 4,689,786 A | 8/1987 | Sidhu et al. | |
| 4,734,858 A | 3/1988 | Schlafly | |
| 4,739,478 A | 4/1988 | Roberts et al. | |
| 4,742,457 A | 5/1988 | Leon et al. | |
| 4,751,640 A | 6/1988 | Lucas et al. | |
| 4,755,940 A | 7/1988 | Brachtl et al. | |
| 4,757,267 A * | 7/1988 | Riskin | 379/114.24 |
| 4,775,935 A | 10/1988 | Yourick | |
| 4,789,928 A | 12/1988 | Fujisaki | |
| 4,795,890 A | 1/1989 | Goldman | |
| 4,799,156 A * | 1/1989 | Shavit et al. | 705/26.3 |
| 4,812,628 A | 3/1989 | Boston et al. | |
| 4,823,265 A | 4/1989 | Nelson | |
| 4,833,607 A | 5/1989 | Dethloff et al. | |
| 4,835,372 A | 5/1989 | Gombrich et al. | |
| 4,864,516 A | 9/1989 | Gaither et al. | |
| 4,865,097 A | 9/1989 | Allen | |
| 4,876,648 A | 10/1989 | Lloyd | |
| 4,885,685 A | 12/1989 | Wolfberg et al. | |
| 4,887,208 A | 12/1989 | Schneider et al. | |
| 4,903,201 A | 2/1990 | Wagner | |
| 4,907,264 A | 3/1990 | Seiler et al. | |
| 4,910,676 A | 3/1990 | Alldredge | |
| 4,916,441 A | 4/1990 | Gombrich | |
| 4,916,738 A | 4/1990 | Chandra et al. | |
| 4,922,521 A | 5/1990 | Krikke et al. | |
| 4,935,870 A | 6/1990 | Burk, Jr. et al. | |
| 4,947,028 A | 8/1990 | Gorog | |
| 4,962,449 A | 10/1990 | Schlesinger | |
| 4,972,318 A | 11/1990 | Brown et al. | |
| 4,977,595 A | 12/1990 | Ohta et al. | |
| 4,982,346 A | 1/1991 | Girouard | |
| 4,992,940 A | 2/1991 | Dworkin | |
| 5,021,953 A | 6/1991 | Webber et al. | |
| 5,038,284 A | 8/1991 | Kramer | |
| 5,053,957 A | 10/1991 | Suzuki | |
| 5,056,019 A | 10/1991 | Schultz et al. | |
| 5,060,153 A | 10/1991 | Nakagawa | |
| 5,063,507 A | 11/1991 | Lindsey et al. | |
| 5,077,607 A | 12/1991 | Johnson et al. | |
| 5,077,665 A | 12/1991 | Silverman et al. | |
| 5,101,353 A | 3/1992 | Lupien et al. | |
| 5,105,184 A | 4/1992 | Pirani et al. | |
| 5,136,501 A | 8/1992 | Silverman et al. | |
| 5,168,446 A | 12/1992 | Wiseman | |
| 5,191,613 A | 3/1993 | Graziano et al. | |
| 5,193,056 A | 3/1993 | Boes | |
| 5,206,803 A | 4/1993 | Vitagliano et al. | |
| 5,220,501 A | 6/1993 | Lawlor et al. | |
| 5,223,699 A | 6/1993 | Flynn et al. | |
| 5,232,875 A | 8/1993 | Tuttle et al. | |
| 5,235,680 A | 8/1993 | Bijnagte | |
| 5,237,500 A | 8/1993 | Perg et al. | |
| 5,239,462 A | 8/1993 | Jones et al. | |
| 5,243,515 A | 9/1993 | Lee | |
| 5,247,575 A | 9/1993 | Sprague et al. | |
| 5,258,908 A | 11/1993 | Hartheimer et al. | |
| 5,261,070 A | 11/1993 | Ohta | |
| 5,262,006 A | 11/1993 | Andersson et al. | |
| 5,262,942 A | 11/1993 | Earle | |
| 5,265,006 A | 11/1993 | Asthana et al. | |
| 5,272,754 A | 12/1993 | Boerbert | |
| 5,280,305 A | 1/1994 | Monroe | |
| 5,280,422 A | 1/1994 | Moe et al. | |
| 5,280,619 A | 1/1994 | Wang | |
| 5,283,731 A | 2/1994 | Lalonde et al. | |
| 5,285,383 A | 2/1994 | Lindsey et al. | |
| 5,297,031 A | 3/1994 | Gutterman et al. | |
| 5,297,032 A | 3/1994 | Trojan et al. | |
| 5,305,195 A | 4/1994 | Murphy | |
| 5,305,200 A | 4/1994 | Hartheimer et al. | |
| 5,313,637 A | 5/1994 | Rose | |
| 5,319,542 A * | 6/1994 | King et al. | 705/26.81 |
| 5,323,315 A | 6/1994 | Highbloom | |
| 5,325,297 A | 6/1994 | Bird et al. | |
| 5,329,589 A | 7/1994 | Fraser et al. | |
| 5,334,822 A | 8/1994 | Sanford | |
| 5,335,170 A | 8/1994 | Petteruti et al. | |
| 5,335,453 A | 8/1994 | Baldy et al. | |
| 5,336,870 A | 8/1994 | Hughes et al. | |
| 5,341,429 A | 8/1994 | Stringer et al. | |
| 5,345,091 A | 9/1994 | Craig | |
| 5,347,306 A | 9/1994 | Nitta | |
| 5,347,632 A | 9/1994 | Filepp et al. | |
| 5,351,186 A | 9/1994 | Bullock et al. | |
| 5,351,293 A | 9/1994 | Michener et al. | |
| 5,375,055 A | 12/1994 | Togher et al. | |
| 5,383,113 A | 1/1995 | Kight et al. | |
| 5,394,324 A | 2/1995 | Clearwater | |
| 5,402,336 A * | 3/1995 | Spiegelhoff et al. | 705/7.25 |
| 5,402,490 A | 3/1995 | Mihm, Jr. | |
| 5,404,507 A * | 4/1995 | Bohm et al. | 1/1 |
| 5,414,833 A | 5/1995 | Hershey et al. | |
| 5,418,713 A * | 5/1995 | Allen | 705/32 |
| 5,424,524 A | 6/1995 | Ruppert et al. | |
| 5,424,944 A | 6/1995 | Kelly | |
| 5,426,281 A | 6/1995 | Abecassis | |
| 5,428,778 A | 6/1995 | Brookes | |
| 5,432,932 A * | 7/1995 | Chen et al. | 718/103 |
| 5,444,850 A | 8/1995 | Chang | |
| 5,448,625 A | 9/1995 | Lederman | |
| 5,451,998 A | 9/1995 | Hamrick | |
| 5,453,926 A | 9/1995 | Stroschin et al. | |
| 5,465,291 A * | 11/1995 | Barrus et al. | 379/67.1 |
| 5,475,756 A | 12/1995 | Merritt | |
| 5,483,468 A * | 1/1996 | Chen et al. | 702/186 |
| 5,485,510 A | 1/1996 | Colbert | |
| 5,495,284 A * | 2/1996 | Katz | 348/14.09 |
| 5,506,961 A | 4/1996 | Carlson et al. | |
| 5,521,815 A | 5/1996 | Rose, Jr. | |
| 5,526,479 A | 6/1996 | Barstow et al. | |
| 5,548,721 A | 8/1996 | Denslow | |
| 5,553,145 A | 9/1996 | Micali | |
| 5,557,518 A | 9/1996 | Rosen | |
| 5,557,728 A | 9/1996 | Garrett et al. | |
| 5,561,707 A | 10/1996 | Katz | |
| 5,570,291 A | 10/1996 | Dudle et al. | |
| 5,584,025 A | 12/1996 | Keithley et al. | |
| 5,590,197 A | 12/1996 | Chen et al. | |
| 5,592,375 A | 1/1997 | Salmon et al. | |
| 5,592,378 A * | 1/1997 | Cameron et al. | 705/26.62 |
| 5,594,732 A | 1/1997 | Bell et al. | |
| 5,598,536 A | 1/1997 | Slaughter, III et al. | |
| 5,598,557 A | 1/1997 | Doner et al. | |
| 5,611,051 A | 3/1997 | Pirelli | |
| 5,613,012 A | 3/1997 | HoffMan et al. | |
| 5,615,268 A * | 3/1997 | Bisbee et al. | 713/176 |
| 5,621,203 A * | 4/1997 | Swartz et al. | 235/462.11 |
| 5,623,652 A * | 4/1997 | Vora et al. | 707/742 |
| 5,625,818 A | 4/1997 | Zarmer et al. | |
| 5,625,823 A | 4/1997 | Debenedictis et al. | |
| 5,629,982 A | 5/1997 | Micali | |
| 5,630,125 A | 5/1997 | Zellweger | |
| 5,657,389 A | 8/1997 | Houvener | |
| 5,664,110 A * | 9/1997 | Green et al. | 705/27.2 |
| 5,664,111 A | 9/1997 | Nahan et al. | |
| 5,664,115 A | 9/1997 | Fraser | |
| 5,666,493 A | 9/1997 | Wojcik et al. | |
| 5,668,591 A | 9/1997 | Shintani | |
| 5,675,784 A | 10/1997 | Maxwell et al. | |
| 5,689,652 A | 11/1997 | Lupien et al. | |
| 5,694,546 A | 12/1997 | Reisman | |
| 5,694,551 A * | 12/1997 | Doyle et al. | 705/26.62 |
| 5,696,965 A | 12/1997 | Dedrick | |
| 5,706,457 A | 1/1998 | Dwyer et al. | |
| 5,708,780 A | 1/1998 | Levergood et al. | |
| 5,710,887 A | 1/1998 | Chelliah et al. | |
| 5,710,889 A | 1/1998 | Clark et al. | |
| 5,712,989 A | 1/1998 | Johnson et al. | |
| 5,715,314 A | 2/1998 | Payne et al. | |
| 5,715,444 A * | 2/1998 | Danish et al. | 1/1 |
| 5,717,989 A | 2/1998 | Tozzoli et al. | |
| 5,721,780 A | 2/1998 | Ensor et al. | |
| 5,724,424 A | 3/1998 | Gifford | |

| | | |
|---|---|---|
| 5,724,521 A | 3/1998 | Dedrick |
| 5,727,164 A * | 3/1998 | Kaye et al. ................. 705/28 |
| 5,727,165 A | 3/1998 | Ordish et al. |
| 5,732,400 A | 3/1998 | Mandler et al. |
| 5,734,719 A * | 3/1998 | Tsevdos et al. ............ 700/234 |
| 5,745,882 A | 4/1998 | Bixler et al. |
| 5,752,238 A | 5/1998 | Dedrick |
| 5,757,924 A | 5/1998 | Friedman et al. |
| 5,758,328 A | 5/1998 | Giovannoli |
| 5,765,141 A | 6/1998 | Spector |
| 5,771,291 A | 6/1998 | Newton et al. |
| 5,771,354 A | 6/1998 | Crawford |
| 5,771,380 A | 6/1998 | Tanaka et al. |
| 5,774,553 A | 6/1998 | Rosen |
| 5,774,868 A | 6/1998 | Cragun et al. |
| 5,774,873 A | 6/1998 | Berent et al. |
| 5,778,367 A | 7/1998 | Wesinger, Jr. et al. |
| 5,793,301 A | 8/1998 | Patterson, Jr. et al. |
| 5,794,207 A | 8/1998 | Walker et al. |
| 5,794,210 A | 8/1998 | Goldhaber et al. |
| 5,794,219 A | 8/1998 | Brown |
| 5,794,220 A | 8/1998 | Hunt |
| 5,799,285 A | 8/1998 | Klingman |
| 5,803,500 A | 9/1998 | Mossberg |
| 5,809,144 A | 9/1998 | Sirbu et al. |
| 5,812,776 A | 9/1998 | Gifford |
| 5,812,819 A | 9/1998 | Rodwin et al. |
| 5,818,914 A | 10/1998 | Fujisaki |
| 5,819,092 A | 10/1998 | Ferguson et al. |
| 5,826,241 A | 10/1998 | Stein et al. |
| 5,826,244 A | 10/1998 | Huberman |
| 5,832,459 A | 11/1998 | Cameron et al. |
| 5,835,896 A | 11/1998 | Fisher et al. |
| 5,838,906 A | 11/1998 | Doyle et al. |
| 5,842,040 A | 11/1998 | Hughes et al. |
| 5,845,265 A | 12/1998 | Woolston |
| 5,845,266 A | 12/1998 | Lupien et al. |
| 5,850,442 A | 12/1998 | Muftic |
| 5,852,809 A | 12/1998 | Abel et al. |
| 5,854,833 A | 12/1998 | Hogan et al. |
| 5,855,008 A | 12/1998 | Goldhaber et al. |
| 5,864,818 A * | 1/1999 | Feldman ........................ 705/5 |
| 5,864,823 A | 1/1999 | Levitan |
| 5,870,552 A | 2/1999 | Dozier et al. |
| 5,870,717 A | 2/1999 | Wiecha |
| 5,872,848 A | 2/1999 | Romney et al. |
| 5,873,069 A | 2/1999 | Reuhl et al. |
| 5,873,071 A | 2/1999 | Ferstenberg et al. |
| 5,873,099 A | 2/1999 | Hogan et al. |
| 5,878,141 A | 3/1999 | Daly |
| 5,878,400 A | 3/1999 | Carter, III |
| 5,878,423 A | 3/1999 | Anderson et al. |
| 5,884,056 A | 3/1999 | Steele |
| 5,890,138 A | 3/1999 | Godin et al. |
| 5,896,379 A | 4/1999 | Haber |
| 5,903,647 A | 5/1999 | Ronning |
| 5,905,974 A | 5/1999 | Fraser et al. |
| 5,905,975 A | 5/1999 | Ausubel |
| 5,909,492 A | 6/1999 | Payne et al. |
| 5,913,040 A | 6/1999 | Rakavy et al. |
| 5,915,209 A | 6/1999 | Lawrence |
| 5,922,074 A | 7/1999 | Richard et al. |
| 5,926,794 A | 7/1999 | Fethe |
| 5,933,497 A * | 8/1999 | Beetcher et al. .............. 705/59 |
| 5,933,813 A | 8/1999 | Teicher et al. |
| 5,946,467 A | 8/1999 | Pathakis et al. |
| 5,966,699 A | 10/1999 | Zandi |
| 5,971,277 A | 10/1999 | Cragun et al. |
| 5,987,425 A | 11/1999 | Hartman et al. |
| 5,991,739 A | 11/1999 | Cupps et al. |
| 5,999,915 A | 12/1999 | Nahan et al. |
| 6,006,201 A | 12/1999 | Berent et al. |
| 6,023,683 A * | 2/2000 | Johnson et al. ........... 705/26.62 |
| 6,026,368 A | 2/2000 | Brown et al. |
| 6,029,141 A | 2/2000 | Bezos et al. |
| 6,049,785 A | 4/2000 | Gifford |
| 6,055,514 A | 4/2000 | Wren |
| 6,055,516 A | 4/2000 | Johnson et al. |
| 6,055,573 A | 4/2000 | Gardenswartz et al. |
| 6,061,660 A | 5/2000 | Eggleston et al. |
| 6,085,176 A | 7/2000 | Woolston |
| 6,108,639 A | 8/2000 | Walker et al. |
| 6,134,548 A | 10/2000 | Gottsman |
| 6,138,107 A | 10/2000 | Elgamal |
| 6,151,589 A | 11/2000 | Aggarwal et al. |
| 6,167,386 A | 12/2000 | Brown |
| 6,185,683 B1 | 2/2001 | Ginter et al. |
| 6,195,649 B1 | 2/2001 | Gifford |
| 6,199,051 B1 | 3/2001 | Gifford |
| 6,202,051 B1 | 3/2001 | Woolston |
| 6,205,432 B1 | 3/2001 | Gabbard et al. |
| 6,205,437 B1 | 3/2001 | Gifford |
| 6,212,634 B1 | 4/2001 | Geer, Jr. et al. |
| 6,259,699 B1 | 7/2001 | Opalka et al. |
| 6,266,651 B1 | 7/2001 | Woolston |
| 6,272,474 B1 | 8/2001 | Garcia |
| 6,279,112 B1 | 8/2001 | O'Toole, Jr. et al. |
| 6,282,516 B1 | 8/2001 | Giuliani |
| 6,292,786 B1 | 9/2001 | Deaton et al. |
| 6,323,894 B1 * | 11/2001 | Katz ......................... 348/14.08 |
| 6,336,105 B1 | 1/2002 | Conklin et al. |
| 6,336,138 B1 | 1/2002 | Caswell et al. |
| 6,337,937 B1 | 1/2002 | Takushima et al. |
| 6,377,937 B1 | 4/2002 | Paskowitz |
| 6,377,986 B1 | 4/2002 | Philyaw et al. |
| 6,397,212 B1 | 5/2002 | Biffar |
| 6,415,270 B1 | 7/2002 | Rackson et al. |
| 6,427,132 B1 | 7/2002 | Bowman-Amuah |
| 6,432,451 B1 | 8/2002 | Lee et al. |
| 6,449,599 B1 | 9/2002 | Payne et al. |
| 6,457,007 B1 * | 9/2002 | Kikuchi et al. .................... 1/1 |
| 6,490,358 B1 | 12/2002 | Geer, Jr. et al. |
| 7,103,568 B1 | 9/2006 | Fusz et al. |
| 7,133,835 B1 | 11/2006 | Fusz et al. |
| 7,613,633 B1 | 11/2009 | Woolston et al. |
| 7,647,243 B2 | 1/2010 | Woolston |
| 7,702,540 B1 | 4/2010 | Woolston |
| 7,831,477 B2 | 11/2010 | Woolston |
| 7,937,312 B1 | 5/2011 | Woolston |
| 7,970,652 B1 | 6/2011 | Woolston |
| 2001/0007981 A1 | 7/2001 | Woolston |
| 2002/0042736 A1 | 4/2002 | Wang |
| 2002/0082931 A1 | 6/2002 | Siegel et al. |
| 2002/0095379 A1 | 7/2002 | Likourezos et al. |
| 2003/0046186 A1 | 3/2003 | Wren |
| 2003/0200156 A1 | 10/2003 | Roseman et al. |
| 2004/0133512 A1 | 7/2004 | Woolston |
| 2004/0177009 A1 | 9/2004 | Schrenk |
| 2005/0033655 A1 | 2/2005 | Woolston |
| 2011/0016016 A1 | 1/2011 | Woolston |
| 2011/0078051 A1 | 3/2011 | Woolston |
| 2011/0099091 A1 | 4/2011 | Woolston |
| 2011/0288950 A1 | 11/2011 | Woolston |
| 2012/0078757 A1 | 3/2012 | Woolston |
| 2012/0150689 A1 | 6/2012 | Woolston |
| 2012/0150691 A1 | 6/2012 | Woolston |

FOREIGN PATENT DOCUMENTS

| | | |
|---|---|---|
| EP | 467546 A2 * | 1/1992 |
| EP | 0542298 A2 | 5/1993 |
| FR | 2658635 A1 | 8/1991 |
| GB | 2102606 A | 2/1983 |
| GB | 2151061 A | 7/1985 |
| JP | 7115474 A | 5/1995 |
| JP | 10171758 A | 6/1998 |
| JP | 200057079 A | 2/2000 |
| JP | 2003150488 A | 5/2003 |
| JP | 10320410 A | 12/2004 |
| KR | 20000012199 A | 3/2000 |
| NL | 9300266 | 2/1993 |
| WO | WO-9116691 A1 | 10/1991 |
| WO | WO-9215174 A1 | 9/1992 |
| WO | WO-9516971 A1 | 6/1995 |
| WO | WO-9634356 A1 | 10/1996 |
| WO | WO-9719415 A2 | 5/1997 |
| WO | WO-9737315 A1 | 10/1997 |
| WO | WO-9819259 A1 | 5/1998 |
| WO | WO-9835469 A1 | 8/1998 |

| WO | WO-9906913 A1 | 2/1999 |
| --- | --- | --- |
| WO | WO-9913417 A1 | 3/1999 |
| WO | WO-9963461 A1 | 12/1999 |
| WO | WO-0008578 A1 | 2/2000 |
| WO | WO-0017797 A1 | 3/2000 |
| WO | WO-0062231 A1 | 10/2000 |

OTHER PUBLICATIONS

Artsearch Seller Letter, (late 80's-early 90's).
Auctions.com1: Corporate Information, (prior to Jun. 10, 2000).
Auctions.com2: Frequently Asked Questions, (Dec. 1, 2006).
Auctions.com3: Pay by Check, (prior to Jun. 10, 2000).
Auctions.com4: Merchant Central, (prior to Jun. 10, 2000).
Auctions.com5: Antiques & Decorative Arts, (prior to Jun. 10, 2000).
Auctions.com6: View All Categories, (prior to Jun. 10, 2000).
Auctions.com7: Search, (2000).
eBay's Form 10-K for the fiscal year ended Dec. 31, 2000.
eBay: Prospectus, (1998).
eBay: Return of the IPO-Internet auction company stock zooms on the first day of trading, CNNmoney.com, (Sep. 24, 1998).
Mosaic web-browser, Mosaic Netscape Version 0.9 beta, (since 1994), 1 pg.
Numismatists Online Marketing Video, (Oct. 1995).
Numismatists Online Marketing Video Screenshots, (Oct. 1995).
Google Group listings of: AuctionWeb.pdf, ebay webmail.pdf, search for AuctionWeb.pdf.
NCSA Archives for eBay.pdf.
Electronic livestock auctions starting in Britain, Agra Europe, Dialog File 148; 04887015, (Nov. 22, 1990).
Coin Trading to Begin on Acorn Network, Coin World, (Jun. 4, 1986).
Order and Opinion, *MercExchange, LLC* v. *eBay, Inc., et al.* civil Action No. 2:01cv736, (Oct. 18, 2002).
Electronic Market Newsletter, (Oct. 1993), No. 9/10, pp. 1-36.
American Law Institute, Draft-Uniform Commercial Code Revised Article 2 (Sales, Parts 2, 3 and 7), [Online]. Retrieved from the Internet: <URL: http://www.kentlaw.edu/ulc/uniform/uccart2/chap2/ucc2c237.html>, (Jan. 4, 1996), pp. 1-15.
Clarification order Denying eBay's Motion for Summary Judgement that Claims 12, 14, 15, 17, 18, 19, 20, 22, 24, 25, 26, 27, 30, 31, 32, 34, 35 of Patent '051 as well as the Joint Motion for Summary Judgment brought by the Defendants, that claims 1, 4, 5, 8, (Jul. 25, 2002).
Google Newsgroup Re: Computer Software and Hardware at Dealer Cost, (May 12, 1994).
lianogen@netvision.net.il, Google Search Re: InterLNK and Inter SVR Protocol, (Jul. 21, 1995).
Individual announces revolutionary 'Dutch Auction' system for ads on news page web service Business Wire, (Jul. 24, 1995), p. 7241051, Dialog File 148.
Internet Presence, Inc. Newsgroup Posting Re: Announce: Internet ShopKeeper, (Aug. 2, 1994), 2 pgs.
Internet Presence, Inc., Newsgroup Posting Re: Announce: Internet ShopKeeper, 04:39:28, (Aug. 2, 1994), 2 pgs.
Internet Presence, Inc., Newsgroup Posting Re: Beta Testers Wanted: The Internet ShopKeeper, Internet Presence Publishing Corp., (Jul. 20, 1994).
Internet Presence, Inc., Newsgroup Posting Re: INternet '95 Call for Submissions, Internet Presence & Publishing Corp., (Mar. 23, 1995).
Internet Presence, Inc., Newsgroup Posting Re: Internet Business Reply Response, (Sep. 8, 1994).
IVANH@ICONZ.CO.NZ, Re: Internet Shopping Mall?, Google Newsgroup: alt.internet.services, (Nov. 12, 1994).
eBay's Notice of Appeal with the United States Court of Appeals for the Federal Circuit., (Aug. 20, 2003).
Transcript from the videotaped deposition of Jay Mintz taken on Jun. 27, 2002.
Order and Opinion, *MercExchange LLC* v, *eBay, Inc., et al.*, Civil Action No. 2:01 cv736, (Oct. 21, 2002).
Order and Opinion, *MercExchange, LLC* v. *eBay, Inc., et al.*, Civil Action No. 2:01cv736, (Jan. 13, 2003).
Order and Opinion, *MercExchange, LLC* v. *eBay, Inc., et al.*, Civil Action No. 2:01cv736, (Apr. 3, 2003).
Orders Granting Reexamination of (1) U.S. Patent No. 6,085,176 and (2) U.S. Patent No. 5,845,362.
Order and Opinion, *MercExchange, LLC* v. *eBay, Inc., et al.*, Civil Action No. 2:01cv736, (Aug. 6, 2003).
Trial Proceedings, *MercExchange, LLC* v. *eBay, Inc., et al.*, Civil Action No. 2:01cv736, vol. 18B, (May 16, 2003), pp. 3167-3234.
Trial Proceedings, *MercExchange, LLC* v. *eBay, Inc.*, Civil Action No. 2:01cv736, vol. 7B, (May 1, 2003), pp. 1311-1416.
Examiner Interview Summary Record, (Jul. 26, 2000).
Trial Proceedings, *MercExchange, LLC* v. *eBay, Inc. et al.*, Civil Action No. 2:01cv736, vol. 2B, (Apr. 24, 2003), pp. 300-428.
Trial Proceedings, *MercExchange, LLC* v. *eBay, Inc. et al.*, Civil Action No. 2:01cv736, vol. 2A, (Apr. 24, 2003), pp. 214-299.
Trial Proceedings, *MercExchange, LLC* v. *eBay, Inc. et al.*, Civil Action No. 2:01cv736, vol. 3A, (Apr. 25, 2003), pp. 428-529.
Trial Proceedings, *MercExchange, LLC* v. *eBay, Inc. et al.*, Civil Action No. 2:01cv736, vol. 4A, (Apr. 28, 2003), pp. 620-745.
Trial Proceedings, *MercExchange, LLC* v. *eBay, inc. et al.*, Civil Action No. 2:01cv736, vol. 5A, (Apr. 29, 2003), pp. 863-965.
Trial Proceedings, *MercExchange LLC* v. *eBay, Inc., et al.*, Civil Action No. 2:01cv736, vol. 21A, (May 21, 2003), pp. 3487-3569.
Terrific Computer Hardware & Software Bargains Benefit WGBH Channer 2, on DELPHI/Boston, New for Feb. 1987.
MercExchange Complaint in the United States District Court for the Eastern District of Virginia (the "district court") for patent infringement against eBay, Half.com and Returnbuy.com, Inc. ("eBay et al.") asserting infringement of the '265 Patent and '176, (Sep. 26, 2001).
Defendant eBay et al. Answer to MercExchange's Complaint, alleging affirmative defenses of invalidity based on 35 U.S.C. Ã?Â§ 102 (anticipation) and Ã?Â§ 103 (obviousness), (Nov. 7, 2001).
MercExchange's motion to amend the Complaint to assert willful infringement, (Nov. 21, 2001).
District court order granted MercExchange's motion for leave to file an Amended Complaint, and directed defendants to file a responsive pleading within 11 days., (Dec. 7, 2001).
eBay et al. answer to the Amended Complaint, (Dec. 18, 2001).
MercExchange Interrogatories to eBay seeking the bases of its invalidity defenses., (Jan. 23, 2002).
eBay's response to MercExchange's Interrogatories disclosing over 100 patents and 214 so-called "publications" including the following documents: (1) U.S. Patent No. 4,789,928 to Fujisaki (the "Fujisaki Patent"); (2) U.S. Patent No. 5,283,731 to Lalonde et, (Feb. 22, 2002).
eBay's Second Supplemental Response to MercExchange's Interrogatories providing additional alleged "prior art" upon which it would rely at trial to support its invalidity defenses under §102 and 103., (Aug. 30, 2002).
eBay's supplemental Section 282 statement citing additional alleged "prior art". Again, this disclosure included the follwoing documents: (1) the Gifford Patent; (2) the Lindsey Patent; (3) the Lalonde Patent; (4) the Kelly Patent; (5) the Nahan Patent; (6, (Mar. 21, 2003).
eBay's Pretrial Disclosures which included its proposed trial exhibit list. That exhibit list contained the same alleged "prior art" patents and "publications" upon which eBay now relies in its Requests for Reexamination., (Mar. 31, 2003).
Final Pretrial Order of the District Court. That Final Pretrial Order included the same materrials upon which eBay relies in its Requests for Reexamination., (Apr. 24, 2003).
Judgment and Order executed by the Federal District Court for the Eastern District of Virginia of ReturnBuy.com, Inc., inter alia, admitting validity and infringement of U.S. Patent No. 5,845,265, (Feb. 26, 2003).
The district court's Final Pretrial Order included as triable issues the alleged invalidity of MercExchange's '265 and '176 Patents under Sections 102 and 103.
Trial Transcript at 2252-2495, 2584-3120 validity contentions concerning the art of record.
eBay's Renewed Motions for Judgment as a Matter of Law and for a new trial, asserting, again, invalidity of the '265 and '176 Patents., (Jun. 12, 2003).
Final Judgment of the Federal District Court of the Eastern District of Virginia finding that there was substantial evidence supporting the jury's verdict that MercExchange's '265 and '176 Patents were not invalid., (Aug. 6, 2003).

eBay's Appeal Brief with the Federal Circuit (corrected brief)., (Jan. 6, 2004).
Excerpts from the trial proceedings in *MercExchange, LLC* v. *eBay, Inc., et al.*, Civil Action No. 2:01cv736, (Apr. 24, 2003).
Defendants eBay Inc. and Half.com, Inc.'s Supplemental Memorandum in Support of Defendant's Motion for Leave to File a Supplemental Answer Pursuant to Federal Rule of Civil Procedure 15(D), Case No. 2:01-CV-736, United States District Court, Eastern Distri.
In the United States Supreme Court of the United States, *eBay Inc. and Half.Com., Inc.*, v. *MercExchange, L.L.C.*, Petition for a Writ of Certiorari to the United States Court of Appeals for the Federal Circuit, Petition for a Writ of Certiorari, (Jul. 25, 2005).
In the United States Supreme Court of the United States, *eBay Inc. and Half.Com, Inc.*, v. *MercExchange, L.L.C.* on Petition for a Writ of Ceriorari to the United States Court of Appeals for the Federal Circuit, Brief in Opposition, (Sep. 26, 2005).
In the United States Supreme Court of the United States, *eBay Inc. and Half.Com., Inc.*, v. *MercExchange, L.L.C.*, on Petition for a Writ of Certiorari to the United States Court of Appeals for the Federal Circuit, Reply Brief of Petitioner, (Oct. 11, 2005).
*MercExchange, L.L.C.*, v. *eBay, Inc. and Half.com, Inc.*, Civil Action No. 2:01cv736, United States District Court Eastern District of Virginia, Norfolk Division, Order and Opinion, (Dec. 18, 2006).
Numismatists Online Spreadsheet provided to sellers to assist in completing the spreadsheet for their coins, (Oct. 1995).
Numismatists Online Letter and Numismatist Online dealer member agreement, (Sep. 9, 1995).
Original App.pdf.
Defendants' eBay Inc. and Half.com, Inc.'s Reply in Support of Their Motion for Leave to File a Supplemental Memorandum in Support of Defendants' Motion for Leave to File a Supplemental Answer Pursuant to Federal Rule of Civil Procedure 15(D), Case No. 2:0.
Defendants' Reply Memorandum in Support of Their Motion for Leave to File a Supplemental Brief Regarding Recent Facts and Law in Support of Defendants' Motion for Judgment as a Matter of Law or a New Trial on the '265 Patent, Case No. 2:01-CV-736, United S.
Defendants' Motion for Leave to File a Supplemental Brief Regarding Recent Facts and Law in Support of Defendants' Motion for Judgment as a Matter of Law or a New Trial on the '265 Patent, Case No. 2:01-CV-736, United States District Court, Eastern Distric.
Defendants' Memorandum in Support of Their Motion for Leave to File a Supplemental Brief Regarding Recent Facts and Law in Support of Defendants' Motion for Judgment as a Matter of Law or a New Trial on the '265 Patent, Case No. 2:01-CV-736, United States.
Supplemental Brief Regarding Recent Facts and Law in Support of Defendants eBay Inc. and Half.com, Inc.'s Motion for Judgment as a Matter of Law or a New Trial on the '265 Patent, Case No. 2:01-CV-736, United States District Court, Eastern District of Virg.
In the United States District Court in the Eastern District of Virginia Norfolk Division, *MercExchange, L.L.C.*, Plaintiff, v. *eBay, Inc., et al.*, Defendant, Civil Action No. 2:01cv736, Trial Proceedings, Norfolk Virginia, vol. 19B, (May 19, 2003), 3377:4-3378:9.
In the United States District Court in the Eastern District of Virginia Norfolk Division, *MercExchange, L.L.C.*, Plaintiff, v. *eBay, Inc., et al.*, Defendant, Civil Action No. 2:01cv736, Trial Proceedings, Norfolk Virginia, vol. 2B, (Apr. 24, 2003), 387:11-388:2.
Declaration of Robert McFarland in Support of Defendants' Supplemental Memorandum in Support of Defendants' Motion for Leave to File a Supplemental Answer Pursuant to Federal Rule of Civil Procedure 15(D), Case No. 2:01-cv-736, United States District Court.
Addendum in Support of Defendants' eBay Inc. and Half.Com, Inc.'s Supplemental Memorandum in Support of Defendants' Motion for Leave to File a Supplemental Answer Pursuant to Federal Rule of Civil Procedure 15(D), Case No. 2:01-CV-736, United States Distr.
United States Securities and Exchange Commission, Form 10-K/A, Amendment No. 3) uBid.com Holdings, Inc., for the fiscal year ended Dec. 31, 2005, (Jun. 30, 2006).
Securities and Exchange Commiesion, eBay Form 10K for the year ended Dec. 31, 1998.
Claim chart illustrating Wagner's teachings as they relate to independent claims 8, 15, and 26.
eBay Inc. Prospectus, (Sep. 25, 1995).
eBay Annual Report (Form 10-K/A), (Jun. 30, 2006).
In the United States District Court in the Eastern District of Virginia Norfolk Division, *MercExchange, L.L.C.*, Plaintiff, v. *eBay, Inc., et al.*, Defendant, Civil Action No. 2:01cv736, Trial Proceedings, Norfolk Virginia, vol. 5B, (Apr. 29, 2003), 966-1067.
In the United States District Court in the Eastern District of Virginia Norfolk Division, *MercExchange, L.L.C.*, Plaintiff, v. *eBay, Inc., et al.*, Defendant, Civil Action No. 2:01cv736, Trial Proceedings, Norfolk Virginia, vol. 22, (May 22, 2003), 3704-3747.
Request for Ex Parte Reexamination of U.S. Patent No. 5,845,265 issued on Dec. 1, 1998, filed on May 15, 2007.
Hearing Transcript, *MercExchange L.L.C.* v. *eBay Inc., et al.*, Case No. 05-130, (Mar. 29, 2006), 42:5-10; 47:10-22; 48:23-49:2.
U.S. Appl. No. 08/554,704, Response filed Dec. 12, 1997.
Delta file showing the change from Original to CIP.pdf.
Trial Proceedings, *Mercexchange, L.L.C.*, Plaintiff, v. *eBay, Inc., et al.*, Defendant, Norfolk Virginia, vol. 3B, (Apr. 25, 2003), 530-619.
Plaintiff MercExchange, L.L.C.'s Objections to Defendants eBay, Inc. and Half.Com, Inc.'s Notice of Rule 30(B)(6) Deposition of MercExchange, in the United States District Court for the Eastern District of Virginia, Norfolk Division, Case No. 2:01-CV-736, (Mar. 8, 2007).
Defendants' Amended Motion to Strike MercExchange's Unclean Hands Argument and Defendants' Objections to Judge Bradberry's Feb. 26, 2007 Orders, in the United States District Court for the Eastern District of Virginia, Norfolk Division, Civil Action No. (Mar. 7, 2007).
Order, United States District Court, Eastern District of Virginia, Norfolk Division, Action No. w:01cv736, (Mar. 6, 2007).
Plaintiff MercExchange, L.L.C.'s Brief in Opposition to Defendants' Motion to Preclude Consideration of Evidence in Violation of Defendants' Due Process Rights, in the United States District Court, Eastern District of Virginia, Case No. 2:01-CV-736, (Mar. 2, 2007).
Transcript of Proceedings (motions) in the United states District Court for the Eastern District of Virginia, Norfolk Division, Civil Action No. 2:01CV736, (Feb. 22, 2007).
Redline comparison of '720 and '804 applications.
Request for Ex Parte Reexamination of U.S. Patent No. 6,202,051 issued Mar. 13, 2001, filed on Dec. 11, 2006.
Declaration of Jonathan Hubbard in Support of eBay's Request for Reexamination of U.S. Patent No. 6,202,051 executed on Dec. 10, 2006.
Declaration of Douglas Graham in Support of eBay's Request for Reexamination of U.S. Patent No. 6,202,051 executed on Dec. 11, 2006.
Notice of Failure to Comply with Ex Parte Reexamination Request Filing Requirements (37 CFR 1.510(c)), (Mar. 7, 2007).
*MercExchange L.L.C.* v. *eBay Inc., et al.*: 2:01-CV-736, letter from Jeffrey G. Randall to The Honorable James E. Bradberry, United States District Court for the Eastern District of Virginia with Attachments Category A, Excerpted Entries from MercExchange:, (Mar. 7, 2007).
Exhibit re First Question of Patentability from Request for Ex Parte Reexamination of U.S. Patent No. 6,202,051 issued Mar. 13, 2001, filed on Dec. 11, 2006.
Exhibit re Second Question of Patentability from Request for Ex Parte Reexamination of U.S. Patent No. 6,202,051 issued Mar. 13, 2001, filed on Dec. 11, 2006.
Exhibit re Third Question of Patentability re Request for Ex Parte Reexamination of U.S. Patent No. 6,202,051 issued Mar. 13, 2001, filed on Dec. 11, 2006.
Exhibit re Fourth Question of Request for Ex Parte Reexamination of U.S. Patent No. 6,202,051 issued Mar. 13, 2001, filed on Dec. 11, 2006.
Exhibit re Fifth Question of Request for Ex Parte Reexamination of U.S. Patent No. 6,202,051 issued Mar. 13, 2001, filed on Dec. 11, 2006.
Exhibit re Sixth Question of Request for Ex Parte Reexamination of U.S. Patent No. 6,202,051 issued Mar. 13, 2001, filed on Dec. 11, 2006.
Exhibit re Seventh Question of Request for Ex Parte Reexamination of U.S. Patent No. 6,202,051 issued Mar. 13, 2001, filed on Dec. 11, 2006.

Appendix 8 of Request for Ex Parte Reexamination of U.S. Patent No. 6,202,051 issued Mar. 13, 2001, filed on Dec. 11, 2006 re Testimony of Pierre Omidyar Regarding eBay's Fall 1995 Launch and Operations.

Cover letter and enclosures of Fish & Richardson P.C.'s privileged document log to Jeff Randall, Skadden, Arps, Slate, Meagher & Flom LLP, signed by Michael W. Jackson, Litigation Case Manager (Exhibit 1, Phillips Mar. 15, 2007), (Mar. 14, 2007).

Subpoena in a Civil Case for John C. Phillips, Issued by the United States District Court, Southern District of California, *MercExchange, L.L.C* v. *eBay Inc. and Half.com, Inc.*, Case No. 2:01-CV-736, Pending in E.D. Va. (Exhibit 2, Phillips Mar. 15, 2007), (Mar. 5, 2007).

Subpoena in a Civil Case for Fish & Richardson, Issued by the United States District Court, Southern District of California, *MercExchange, L.L.C.* v. *eBay Inc. and Half.com, Inc.*, Case No. 2:01-CV-736, Pending in E.D. Va. (Exhibit 3, Phillips Mar. 15, 2007), (Jan. 11, 2007).

Information Disclosure Statement, Control No. 90/006,956, filed Feb. 22, 2005 (Exhibit 4, Phillips Mar. 15, 2007).

Information Disclosure Statement, Control No. 90/006,956, filed Mar. 14, 2005 (Exhibit 5, Phillips Mar. 15, 2007).

Information Disclosure Statement, Control No. 90/006,956, filed Apr. 1, 2005 (Exhibit 6, Phillips Mar. 15, 2007), (Apr. 1, 2005).

Information Disclosure Statement, Control No. 90/006,956, filed Jul. 29, 2005 (Exhibit 7, Phillips Mar. 15, 2007), (Jul. 29, 2005).

Information Disclosure and MPEP §2259 Provisions of Res Judicata and collateral Estoppel, Control No. 90/006,956, filed Feb. 23, 2005 (Exhibit 8, Phillips Mar. 15, 2007).

Patent Owner's Response to Office Action Dated Mar. 24, 2005, Control No. 90/006,956, filed Jun. 24, 2005 (Exhibit 9, Phillips Mar. 15, 2007).

*MercExchange, L.L.C.* v. *eBay, Inc., et al.*, Civil Action No. 2:01cv736, Trial Proceedings in the United States District Court in the Eastern District of Virginia, Norfolk Division, vol. 19B (Exhibit 10, Phillips Mar. 15, 2007), (May 19, 2003), 3340-3435.

Letter from Santi J. Neuberger, M.D.D.A.B.I.M. dated Feb. 13, 2007, re Kenneth Nahan re unable to provide testimony in a trial (Exhibit 11, Phillips Mar. 15, 2007), (Feb. 13, 2007).

Open Market, Inc., Appendix F, mailed to the USPTO Oct. 24, 1994.

May 2, 2007 letter from Jeffrey G. Randall of Skadden, Arps, Slate, Meagher & Flom LLP to John C. Phillips, Esq., Fish & Richardson P.C., re Reexamination Control No. 90/006,956, *MercExchange LLC* v. *eBay Inc., Half.com, Inc.*, Case No. 2:01-CV-736 (E.D. Va.

May 18, 2007 letter from Gregory N. Stillman of Hunton & Williams to Jeffrey G. Randall, Esp., Skadden, Arps, Slate, Meagher & Flom, LLP re *MercExchange* v. *eBay, Inc.*

*MercExchange, K.L.C.* v. *eBay, Inc. and Half.Com Inc.*, United States District Court, Eastern District of Virginia, Norfolk Division, Civil Action No. 2:01cv736, Memorandum Order, (Mar. 16, 2007).

Artsearch Buyer Letter and Pamphlets, (late 80's-early 90's).

CIP App.pdf.

Office Action in Ex Parte Reexamination, Control No. 90/006,984 dated Dec. 23, 2005 (Exhibit 15, Phillips Mar. 15, 2007), (Dec. 23, 2005).

Patent Owner's Response to Office Action dated Mar. 24, 2006, Control No. 90/006,956, filed Jun. 26, 2006 (Exhibit 18, Phillips Mar. 15, 2007).

U.S. Patent No. 5,402,490, Mihm (Exhibit 19, Phillips Mar. 15, 2007), (Mar. 28, 1995).

*MercExchange LLC* v. *Rogan*: Complaint Under 35 U.S.C. 145 to Authorize the Director to Issue Letters Patent, (Nov. 28, 2003).

Order and Opinion, *MercExchange, LLC* v. *eBay, Inc., et al.*, Civil Action No. 2:01cv736, (Jul. 27, 2007).

Trial Exhibit Nos. 607, 59, 221, 293, 609, 602, 601, 595, 22, 30, 427, 449, 435, 269, 33, 31, 619, 323, 73, 444 and 17 introduction of purported "prior art" references, patents and "publications," determined not to render the claims of the '265 Patent unpa.

MercExchange Response in U.S. Appl. No. 08/554,704, (Dec. 12, 1997).

Hardware needed for making an Ethernet connection with your Mac OS or Mac OS X Computer, (Sep. 2, 2005), 2 pgs.

"MAGICCAP archives—May 1996, week 2 (#114)", [Online]. Retrieved from the Internet: <URL: http://listserv.brown.edu/archives/cgi-bin/wa?A2=ind9605B&L=magiccap&p=R3745>, (Accessed May 18, 2005), 2 pgs.

"Subject: Cybercoins—In rec.collecting.coins Google Groups", Cite 34, Hubbard Declaration, Exhibit H, [Online]. Retrieved from the Internet: <URL: http://www.numismatists.com>, (Oct. 16, 1995), 5 pgs.

"38 results for "clear"", Dictionary.com.

"A Beginner's Guide to HTML", NCSA/pubs@ncsa.uiuc.edu, Appendix A, mailed to the USPTO Oct. 24, 1994, 11 pgs.

"A Quick Guide to Last Minute Weekend Entertainment", Chicago Sun Times—News—48 hours, (Apr. 16, 1994).

"A Quick Tour: A Summary of Approaches", EDventure Holding, Inc., vol. 95, No. 1, ISSN:1047-935X, (Jan. 24, 1995).

"A Seat on the Exchange", Boston computer exchange corporation, (1987), 115 pgs.

"Acid Rain Auction is Successful", American Metal Market, (Apr. 11, 1995), vol. 103 No. 69.

"Acorns Collectors Service Network", pamphlet, Memphis, Tennessee, (1980), 2 pgs.

"Active Message Processing Messages as Messengers", (Ilegible) Centre for Mathematics and Computer Science, Report CSR9035, (August).

"Ads for Antique Shows", The Inside Collector, (Oct. 1992), vol. 3, No. 2.

"Affinity Traders Online Business Plan", (Aug. 18, 1995), 29 pgs.

"Amazon.com: Auction Fees", From Declaration of Jonathan Palmer, [Online]. Retrieved from the Internet: <URL: http://www.amazon.com/exec/obidos/tg/browse/-/537894/103-6577454-7564618>, (Accessed Apr. 24, 2002), 2 pgs.

"Ameritech Library Services Unveils Webpac at ALA", PR Newswire, (Jun. 27, 1995).

"AMIX anticipated growth fuels move to new quarters", Newsbytes, (Aug. 3, 1992), 2 pgs.

"AMIX Demo Screen Shots", Dan Bricklin's Demo 11 Computer Program, Sage Software, (Copyright 1990, 1991), 49 pgs.

"AMIX Information Marketplace: American Information Exchange Customer Guide", American Information Exchange Corporation, Customer Guide Version 1.0, (1991), 214 pgs.

"AMIX Software: your guide to the information marketplace", American Information Exchange Corporation, (Jun. 1992), 294 pgs.

"An Analysis and Recommendation for the Terms of the Reclaim Trading Credit", Report submitted to South Coast Air Quality Management District, Contract No. R-C93074, (Apr. 27, 1993).

"Announcing Interactive Coin Auctions on the Web", Cite 34, Hubbard Declaration, Exhibit G, 2 pgs.

"AOL Numbers Even Better Than They Look", Newsbytes News Network, (Jan. 28, 1994).

"U.S. Appl. No. 08/427,820, Advisory Action mailed Sep. 3, 1998", 2 pgs.

"U.S. Appl. No. 08/427,820, Advisory Action mailed Nov. 2, 1998", 5 pgs.

"U.S. Appl. No. 08/427,820, Appeal Brief filed Mar. 2, 1999", 43 pgs.

"U.S. Appl. No. 08/427,820, Appeal Brief filed Mar. 12, 1999".

"U.S. Appl. No. 08/427,820, Decision on Appeal mailed Sep. 29, 2003".

"U.S. Appl. No. 08/427,820, Examiner Interview Summary mailed Sep. 10, 1997", 2 pgs.

"U.S. Appl. No. 08/427,820, Examiner Interview Summary mailed Sep. 17, 1998", 2 pgs.

"U.S. Appl. No. 08/427,820, Examiner's Answer mailed Jul. 19, 1999".

"U.S. Appl. No. 08/427,820, Examiner's Answer to Appeal Brief mailed Jul. 19, 1999", 31 pgs.

"U.S. Appl. No. 08/427,820, Final Office Action mailed May 12, 1998", 7 pgs.

"U.S. Appl. No. 08/427,820, Non Final Office Action mailed Jan. 3, 1997", 8 pgs.

"U.S. Appl. No. 08/427,820, Non Final Office Action mailed Sep. 17, 1997", 9 pgs.

"U.S. Appl. No. 08/427,820, Preliminary Amendment filed Dec. 5, 1996", 4 pgs.

"U.S. Appl. No. 08/427,820, Response filed Feb. 17, 1998 to Non Final Office Action mailed Sep. 17, 1997", 7 pgs.
"U.S. Appl. No. 08/427,820, Response filed Jun. 3, 1997 to Non Final Office Action mailed Jan. 3, 1997", 13 pgs.
"U.S. Appl. No. 08/427,820, Response filed Aug. 12, 1998 to Final Office Action mailed May 12, 1998", 16 pgs.
"U.S. Appl. No. 08/427,820, Response filed Sep. 14, 1998 to Final Office Action mailed May 12, 1998", 15 pgs.
"U.S. Appl. No. 08/427,820, Response filed Dec. 3, 2007 to Non Final Office Action mailed Oct. 2, 2007", 77 pgs.
"U.S. Appl. No. 08/554,074, Response filed Dec. 12, 1997".
"U.S. Appl. No. 08/554,704, Examiner Interview Summary mailed Jul. 8, 1997", 2 pgs.
"U.S. Appl. No. 08/554,704, Examiner Interview Summary mailed Sep. 10, 1997", 2 pgs.
"U.S. Appl. No. 08/554,704, Non Final Office Action mailed Apr. 3, 1997", 12 pgs.
"U.S. Appl. No. 08/554,704, Non Final Office Action mailed Oct. 16, 1997", 8 pgs.
"U.S. Appl. No. 08/554,704, Notice of Allowance mailed Mar. 17, 1998", 3 pgs.
"U.S. Appl. No. 08/554,704, Response filed Jul. 16, 1997 to Non Final Office Action mailed Apr. 3, 1997", 16 pgs.
"U.S. Appl. No. 08/554,704, Response filed Dec. 12, 1997 to Non Final Office Action mailed Oct. 16, 1997", 12 pgs.
"U.S. Appl. No. 08/554,704, Response to Notice of Allowance filed May 1, 1998", 29 pgs.
"U.S. Appl. No. 09/166,779, Appeal Brief filed Jul. 16, 2002", 35 pgs.
"U.S. Appl. No. 09/166,779, Decision on Appeal mailed Jan. 28, 2005", 17 pgs.
"U.S. Appl. No. 09/166,779, Decision on Reply Brief mailed Sep. 22, 2003", 2 pgs.
"U.S. Appl. No. 09/166,779, Examiner's Answer to Appeal Brief mailed Jan. 28, 2003", 5 pgs.
"U.S. Appl. No. 09/166,779, Examiner's Answer to Appeal Brief mailed Oct. 15, 2002", 3 pgs.
"U.S. Appl. No. 09/166,779, Final Office Action mailed Dec. 12, 2006", 15 pgs.
"U.S. Appl. No. 09/166,779, Non Final Office Action mailed Jun. 15, 2001".
"U.S. Appl. No. 09/166,779, Non Final Office Action mailed Jul. 5, 2000", 10 pgs.
"U.S. Appl. No. 09/166,779, Notice of Allowance mailed Dec. 22, 2010", 40 pgs.
"U.S. Appl. No. 09/166,779, Preliminary Amendment filed Oct. 16, 1998", 7 pgs.
"U.S. Appl. No. 09/166,779, Reply Brief filed Mar. 28, 2003", 4 pgs.
"U.S. Appl. No. 09/166,779, Response filed Jan. 5, 2001 to Non Final Office Action mailed Jul. 5, 2000", 20 pgs.
"U.S. Appl. No. 09/166,779, Response filed Jan. 19, 2007 to Final Office Action mailed Dec. 12, 2006", 2 pgs.
"U.S. Appl. No. 09/166,779, Response filed Apr. 17, 2000 to Restriction Requirement mailed Apr. 3, 2000", 1 pg.
"U.S. Appl. No. 09/166,779, Response filed Jul. 31, 2006 to Non Final Office Action mailed Jan. 30, 2006", 30 pgs.
"U.S. Appl. No. 09/166,779, Restriction Requirement mailed Apr. 3, 2000", 5 pgs.
"U.S. Appl. No. 09/166,779, Substitute Appeal Brief filed Nov. 12, 2002", 34 pgs.
"U.S. Appl. No. 09/203,286, Decision on Appeal Brief mailed Sep. 29, 2003", 41 pgs.
"U.S. Appl. No. 09/203,286, Examiner Interview Summary filed Apr. 11, 2001", 2 pgs.
"U.S. Appl. No. 09/203,286, Examiner Interview Summary mailed Jan. 21, 2001", 1 pg.
"U.S. Appl. No. 09/203,286, Examiner Interview Summary mailed Sep. 16, 1999", 2 pgs.
"U.S. Appl. No. 09/203,286, Examiner Interview Summary mailed Sep. 20, 2000", 1 pg.
"U.S. Appl. No. 09/203,286, Examiner's Answer to Appeal Brief mailed Sep. 4, 2007", 7 pgs.
"U.S. Appl. No. 09/203,286, Final Office Action mailed Apr. 11, 2000", 13 pgs.
"U.S. Appl. No. 09/203,286, Final Office Action mailed Jul. 19, 1999", 11 pgs.
"U.S. Appl. No. 09/203,286, Final Office Action mailed Aug. 28, 2006", 6 pgs.
"U.S. Appl. No. 09/203,286, Non Final Office Action mailed Jun. 17, 1999", 10 pgs.
"U.S. Appl. No. 09/203,286, Preliminary Amendment filed Dec. 1, 1998", 11 pgs.
"U.S. Appl. No. 09/203,286, Reply Brief filed Nov. 13, 2007", 16 pgs.
"U.S. Appl. No. 09/203,286, Response filed Jun. 25, 1999 to Non Final Office Action mailed Jun. 17, 1999", 16 pgs.
"U.S. Appl. No. 09/203,286, Response filed Sep. 21, 1999 to Non Final Office Action mailed Jul. 19, 1999", 14 pgs.
"U.S. Appl. No. 09/203,286, Response filed Oct. 16, 2000 to Final Office Action mailed Apr. 11, 2000", 5 pgs.
"U.S. Appl. No. 09/253,014, Appeal Brief filed Apr. 28, 2002", 60 pgs.
"U.S. Appl. No. 09/253,014, Decision on Appeal mailed Feb. 4, 2004".
"U.S. Appl. No. 09/253,014, Examiner Interview Summary mailed Jan. 23, 2001".
"U.S. Appl. No. 09/253,014, Examiner Interview Summary mailed Nov. 2, 2005", 3 pgs.
"U.S. Appl. No. 09/253,014, Examiner's Answer to Reply Brief mailed Feb. 4, 2004", 25 pgs.
"U.S. Appl. No. 09/253,014, Final Office Action mailed Apr. 11, 2001", 11 pgs.
"U.S. Appl. No. 09/253,014, Non Final Office Action mailed Jun. 25, 2004", 53 pgs.
"U.S. Appl. No. 09/253,014, Non Final Office Action mailed Dec. 12, 2000", 8 pgs.
"U.S. Appl. No. 09/253,014, Non Final Office Action mailed Dec. 27, 1999", 12 pgs.
"U.S. Appl. No. 09/253,014, Notice of Allowance mailed Mar. 3, 2008", 48 pgs.
"U.S. Appl. No. 09/253,014, Notice of Allowance mailed Jun. 17, 2009", 2 pgs.
"U.S. Appl. No. 09/253,014, Notice of Allowance mailed Nov. 17, 2009", 8 pgs.
"U.S. Appl. No. 09/253,014, Notice of Allowance mailed Nov. 26, 2008", 9 pgs.
"U.S. Appl. No. 09/253,014, Preliminary Amendment filed Feb. 19, 2009", 6 pgs.
"U.S. Appl. No. 09/253,014, Preliminary Amendment filed Dec. 14, 2005", 38 pgs.
"U.S. Appl. No. 09/253,014, Reply Brief filed Nov. 12, 2002", 6 pgs.
"U.S. Appl. No. 09/253,014, Response filed Feb. 2, 2001".
"U.S. Appl. No. 09/253,014, Response filed Feb. 2, 2001 to Non Final Office Action mailed Dec. 12, 2000", 38 pgs.
"U.S. Appl. No. 09/253,014, Response filed Mar. 30, 2000 to Non Final Office Action mailed Dec. 27, 1999", 38 pgs.
"U.S. Appl. No. 09/253,014, Response filed Jul. 28, 2000".
"U.S. Appl. No. 09/253,014, Response filed Dec. 7, 2004 to Non Final Office Action mailed Jun. 25, 2004", 34 pgs.
"U.S. Appl. No. 09/253,014, Supplemental Preliminary Amendment filed Jun. 17, 1999", 22 pgs.
"U.S. Appl. No. 09/253,015, Final Office Action mailed Mar. 13, 2002", 59 pgs.
"U.S. Appl. No. 09/253,015, Non Final Office Action mailed Jan. 21, 2004", 41 pgs.
"U.S. Appl. No. 09/253,015, Non Final Office Action mailed May 7, 2003", 87 pgs.
"U.S. Appl. No. 09/253,015, Non Final Office Action mailed May 23, 2001", 24 pgs.
"U.S. Appl. No. 09/253,015, Non Final Office Action mailed Dec. 5, 2000", 34 pgs.
"U.S. Appl. No. 09/253,015, Preliminary Amendment filed Feb. 19, 1999", 4 pgs.
"U.S. Appl. No. 09/253,015, Response filed Feb. 18, 2003 to Final Office Action mailed Mar. 13, 2002", 5 pgs.
"U.S. Appl. No. 09/253,015, Response filed Mar. 2, 2001 to Non Final Office Action mailed Dec. 5, 2000", 27 pgs.

"U.S. Appl. No. 09/253,015, Response filed Aug. 23, 2000 to Restriction Requirement mailed May 23, 2000", 2 pgs.
"U.S. Appl. No. 09/253,015, Response filed Nov. 2, 2001 to Non Final Office Action mailed May 23, 2001", 7 pgs.
"U.S. Appl. No. 09/253,015, Response filed Nov. 5, 2003 to Non Final Office Action mailed May 7, 2003", 9 pgs.
"U.S. Appl. No. 09/253,015, Restriction Requirement mailed May 23, 2000", 6 pgs.
"U.S. Appl. No. 09/253,015, Second Supplemental Preliminary Amendment filed Mar. 7, 2000", 13 pgs.
"U.S. Appl. No. 09/253,015, Supplemental Preliminary Amendment filed Jun. 17, 1999", 9 pgs.
"U.S. Appl. No. 09/253,021, Examiner Interview Summary mailed Jul. 26, 2000", 2 pgs.
"U.S. Appl. No. 09/253,021, Non Final Office Action mailed Jun. 7, 2000", 17 pgs.
"U.S. Appl. No. 09/253,021, Non Final Office Action mailed Sep. 15, 1999", 8 pgs.
"U.S. Appl. No. 09/253,021, Notice of Allowance mailed Aug. 24, 2000", 14 pgs.
"U.S. Appl. No. 09/253,021, Notice of Allowance mailed Oct. 1, 1999", 7 pgs.
"U.S. Appl. No. 09/253,021, Preliminary Amendment filed Feb. 19, 1999", 11 pgs.
"U.S. Appl. No. 09/253,021, Response filed Jul. 28, 2000 to Non Final Office Action mailed Jun. 7, 2000", 19 pgs.
"U.S. Appl. No. 09/253,021, Response filed Sep. 21, 1999 to Non Final Office Action mailed Sep. 15, 1999", 2 pgs.
"U.S. Appl. No. 09/253,021, Supplemental Preliminary Amendment filed Jul. 30, 1999", 7 pgs.
"U.S. Appl. No. 09/253,057, Final Office Action mailed Dec. 12, 2000", 18 pgs.
"U.S. Appl. No. 09/253,057, Non Final Office Action mailed Mar. 28, 2000", 15 pgs.
"U.S. Appl. No. 09/253,057, Notice of Allowance mailed Jan. 17, 2001", 8 pgs.
"U.S. Appl. No. 09/253,057, Preliminary Amendment filed Feb. 19, 1999", 6 pgs.
"U.S. Appl. No. 09/253,057, Response filed Aug. 28, 2000 to Non Final Office Action mailed Mar. 28, 2000", 15 pgs.
"U.S. Appl. No. 09/253,057, Response filed Dec. 28, 2000 to Final Office Action mailed Dec. 12, 2000", 10 pgs.
"U.S. Appl. No. 09/253,057, Supplemental Preliminary Amendment filed Jun. 17, 1999", 8 pgs.
"U.S. Appl. No. 09/264,573, 312 Amendment filed Jan. 21, 2000", 1 pg.
"U.S. Appl. No. 09/264,573, Examiner Interview Summary mailed Sep. 9, 1999", 2 pgs.
"U.S. Appl. No. 09/264,573, Non Final Office Action mailed Aug. 3, 1999", 7 pgs.
"U.S. Appl. No. 09/264,573, Non Final Office Action mailed Aug. 3, 1999".
"U.S. Appl. No. 09/264,573, Notice of Allowance mailed Dec. 20, 1999", 6 pgs.
"U.S. Appl. No. 09/264,573, Preliminary Amendment filed Mar. 8, 1999", 6 pgs.
"U.S. Appl. No. 09/264,573, Response filed Sep. 14, 1999".
"U.S. Appl. No. 09/264,573, Response filed Sep. 14, 1999 to Non Final Office Action mailed Aug. 3, 1999", 16 pgs.
"U.S. Appl. No. 09/418,564, Final Office Action mailed May 5, 2003", 11 pgs.
"U.S. Appl. No. 09/418,564, Non Final Office Action mailed Nov. 7, 2001", 38 pgs.
"U.S. Appl. No. 09/418,564, Preliminary Amendment filed Jul. 12, 2002", 12 pgs.
"U.S. Appl. No. 09/418,564, Response filed Jan. 30, 2003 to Non Final Office Action mailed Jul. 30, 2002", 10 pgs.
"U.S. Appl. No. 09/418,564, Supplemental Preliminary Amendment filed Mar. 3, 2000", 17 pgs.
"U.S. Appl. No. 09/556,653, Examiner Interview Summary Jul. 25, 2003", 3 pgs.
"U.S. Appl. No. 09/556,653, Final Office Action mailed Jul. 11, 2003", 10 pgs.
"U.S. Appl. No. 09/556,653, Final Office Action mailed Sep. 25, 2002", 6 pgs.
"U.S. Appl. No. 09/556,653, Non Final Office Action mailed Dec. 20, 2001", 7 pgs.
"U.S. Appl. No. 09/556,653, Preliminary Amendment filed Apr. 21, 2000", 4 pgs.
"U.S. Appl. No. 09/556,653, Response filed Jun. 3, 2003 to Final Office Action mailed Sep. 25, 2002", 6 pgs.
"U.S. Appl. No. 09/556,653, Response filed Jun. 20, 2002 to Non Final Office Action mailed Dec. 20, 2001", 5 pgs.
"U.S. Appl. No. 09/557,617, Examiner Interview Summary mailed May 25, 2004", 3 pgs.
"U.S. Appl. No. 09/557,617, Examiner Interview Summary mailed Aug. 31, 2004", 3 pgs.
"U.S. Appl. No. 09/557,617, Final Office Action mailed Feb. 24, 2004", 9 pgs.
"U.S. Appl. No. 09/557,617, Non Final Office Action mailed Mar. 23, 2004", 9 pgs.
"U.S. Appl. No. 09/557,617, Non Final Office Action mailed May 21, 2003", 6 pgs.
"U.S. Appl. No. 09/557,617, Non Final Office Action mailed Aug. 16, 2002", 9 pgs.
"U.S. Appl. No. 09/557,617, Non Final Office Action mailed Oct. 5, 2004", 15 pgs.
"U.S. Appl. No. 09/557,617, Notice of Allowance mailed Feb. 18, 2011", 24 pgs.
"U.S. Appl. No. 09/557,617, Response filed Feb. 18, 2003 to Non Final Office Action mailed Aug. 16, 2002", 16 pgs.
"U.S. Appl. No. 09/557,617, Response filed May 17, 2004 to Non Final Office Action mailed Mar. 23, 2004", Response to Non Final Office Action.
"U.S. Appl. No. 09/557,617, Response filed Oct. 11, 2006 to Restriction Requirement mailed Sep. 12, 2006", 1 pg.
"U.S. Appl. No. 09/557,617, Response filed Nov. 21, 2003 to Non Final Office Action mailed May 21, 2003", 10 pgs.
"U.S. Appl. No. 09/557,617, Response filed Nov. 26, 2004 to Non Final Office Action mailed Oct. 5, 2004", 33 pgs.
"U.S. Appl. No. 09/557,617, Restriction Requirement mailed Sep. 12, 2006", 4 pgs.
"U.S. Appl. No. 09/644,857, Non Final Office Action mailed Sep. 12, 2003", 22 pgs.
"U.S. Appl. No. 09/670,561, Decision on Appeal mailed Feb. 4, 2004", 24 pgs.
"U.S. Appl. No. 09/670,561, Final Office Action mailed Jun. 8, 2004", 21 pgs.
"U.S. Appl. No. 09/670,561, Non Final Office Action mailed Aug. 29, 2003", 5 pgs.
"U.S. Appl. No. 09/670,561, Preliminary Amendment filed Sep. 27, 2000", 18 pgs.
"U.S. Appl. No. 09/670,561, Response filed Mar. 1, 2004 to Non Final Office Action mailed Aug. 29, 2003", 17 pgs.
"U.S. Appl. No. 09/670,562, Examiner Interview Summary mailed Jan. 17, 2007", 3 pgs.
"U.S. Appl. No. 09/670,562, Examiner Interview Summary mailed Aug. 23, 2007", 3 pgs.
"U.S. Appl. No. 09/670,562, Final Office Action mailed May 18, 2004", 10 pgs.
"U.S. Appl. No. 09/670,562, Non Final Office Action mailed Feb. 8, 2006", 8 pgs.
"U.S. Appl. No. 09/670,562, Non Final Office Action mailed Feb. 8, 2008", 12 pgs.
"U.S. Appl. No. 09/670,562, Non Final Office Action mailed Sep. 11, 2003", 6 pgs.
"U.S. Appl. No. 09/670,562, Notice of Allowance mailed Jun. 15, 2009", 12 pgs.
"U.S. Appl. No. 09/670,562, Notice of Allowance mailed Dec. 15, 2008", 5 pgs.
"U.S. Appl. No. 09/670,562, Preliminary Amendment filed Sep. 27, 2000", 5 pgs.
"U.S. Appl. No. 09/670,562, Response filed Mar. 11, 2004 to Non Final Office Action mailed Sep. 11, 2003", 32 pgs.
"U.S. Appl. No. 09/670,562, Response filed Aug. 8, 2006 to Non Final Office Action mailed Feb. 8, 2006", 17 pgs.

"U.S. Appl. No. 09/670,562, Response filed Aug. 8, 2008 to Non Final Office Action mailed Feb. 8, 2008", 7 pgs.
"U.S. Appl. No. 09/670,562, Response filed Sep. 20, 2004 to fFinal Office Action mailed May 18, 2004", 11 pgs.
"U.S. Appl. No. 09/670,562, Response filed Nov. 18, 2005 to Restriction Requirement mailed Oct. 18, 2005", Nov. 18, 2005.
"U.S. Appl. No. 09/670,562, Restriction Requirement mailed Oct. 18, 2005", 6 pgs.
"U.S. Appl. No. 09/779,551, Examiner Interview Summary mailed Nov. 2, 2005", 3 pgs.
"U.S. Appl. No. 09/779,551, Final Office Action mailed Feb. 14, 2005", 35 pgs.
"U.S. Appl. No. 09/779,551, Non Final Office Action mailed Feb. 17, 2004", 13 pgs.
"U.S. Appl. No. 09/779,551, Non Final Office Action mailed Mar. 6, 2009", 21 pgs.
"U.S. Appl. No. 09/779,551, Non Final Office Action mailed Aug. 19, 2002", 7 pgs.
"U.S. Appl. No. 09/779,551, Notice of Allowance mailed Aug. 21, 2009", 7 pgs.
"U.S. Appl. No. 09/779,551, Preliminary Amendment filed Feb. 9, 2001", 11 pgs.
"U.S. Appl. No. 09/779,551, Response filed Feb. 18, 2003 to Non Final Office Action mailed Aug. 19, 2002", 3 pgs.
"U.S. Appl. No. 09/779,551, Response filed Jun. 8, 2009 to Non Final Office Action mailed Mar. 6, 2009", 8 pgs.
"U.S. Appl. No. 09/779,551, Response filed Aug. 15, 2005 to Final Office Action mailed Feb. 14, 2005", 14 pgs.
"U.S. Appl. No. 09/779,551, Response filed Aug. 17, 2004 to Non Final Office Action mailed Feb. 17, 2004", 7 pgs.
"U.S. Appl. No. 10/496,714, Appeal Brief filed Apr. 27, 2007", 9 pgs.
"U.S. Appl. No. 10/740,151, Non Final Office Action mailed Oct. 19, 2007", 18 pgs.
"U.S. Appl. No. 10/740,151, Preliminary Amendment filed Feb. 17, 2003", 3 pgs.
"U.S. Appl. No. 10/824,322, Final Office Action mailed Aug. 5, 2009", 11 pgs.
"U.S. Appl. No. 10/824,322, Non-Final Office Action mailed Jan. 15, 2010", 12 pgs.
"U.S. Appl. No. 10/824,322, Non-Final Office Action mailed Nov. 14, 2008", 12 pgs.
"U.S. Appl. No. 10/824,322, Notice of Allowance mailed Jul. 1, 2010", 13 pgs.
"U.S. Appl. No. 10/824,322, Preliminary Amendment filed Apr. 13, 2004", 3 pgs.
"U.S. Appl. No. 10/824,322, Response filed Apr. 15, 2010 to Non Final Office Action mailed Jan. 15, 2010", 9 pgs.
"U.S. Appl. No. 10/824,322, Response filed May 14, 2009 to Non Final Office Action mailed Nov. 14, 2008", 6 pgs.
"U.S. Appl. No. 10/824,322, Response filed Aug. 11, 2008 to Restriction Requirement mailed Feb. 11, 2008", 5 pgs.
"U.S. Appl. No. 10/824,322, Response filed Nov. 14, 2009 to Final Office Action mailed Aug. 5, 2009", 8 pgs.
"U.S. Appl. No. 10/824,322, Restriction Requirement mailed Feb. 11, 2008", 6 pgs.
"U.S. Appl. No. 12/890,210, Non Final Office Action mailed Mar. 21, 2011", 12 pgs.
"U.S. Appl. No. 12/890,210, Response filed Jun. 1, 2011 to Non Final Office Action mailed Mar. 21, 2011", 6 pgs.
"U.S. Appl. No. 90/006,956, Examiner Interview Summary filed Mar. 11, 2009", 2 pgs.
"U.S. Appl. No. 90/006,956, Examiner Interview Summary filed Feb. 12, 2009", 4 pgs.
"U.S. Appl. No. 90/006,956, Examiner Interview Summary filed Sep. 6, 2006", 5 pgs.
"U.S. Appl. No. 90/006,956, Final Office Action mailed Nov. 20, 2008", 54 pgs.
"U.S. Appl. No. 90/006,956, Non Final Office Action mailed Mar. 24, 2005", 12 pgs.
"U.S. Appl. No. 90/006,956, Non Final Office Action mailed Mar. 24, 2006", 105 pgs.
"U.S. Appl. No. 90/006,956, Non Final Office Action mailed Oct. 2, 2007", 67 pgs.
"U.S. Appl. No. 90/006,956, Response filed May 6, 2009 to Final Office Action mailed Nov. 20, 2008", 1 pg.
"U.S. Appl. No. 90/006,956, Response filed Jun. 26, 2006 to Non Final Office Action mailed Mar. 24, 2006", 78 pgs.
"U.S. Appl. No. 90/006,956, Response filed Dec. 3, 2007 to Non Final Office Action mailed Oct. 2, 2007", 77 pgs.
"U.S. Appl. No. 90/006,957, Examiner Interview Summary filed Mar. 11, 2009", 2 pgs.
"U.S. Appl. No. 90/006,957, Examiner Interview Summary mailed Feb. 11, 2009", 3 pgs.
"U.S. Appl. No. 90/006,957, Final Office Action mailed Sep. 22, 2008", 53 pgs.
"U.S. Appl. No. 90/006,957, Non Final Office Action mailed May 10, 2005", 15 pgs.
"U.S. Appl. No. 90/006,957, Non Final Office Action mailed Sep. 6, 2006", 4 pgs.
"U.S. Appl. No. 90/006,957, Response filed Jan. 5, 2009 to Final Office Action mailed Sep. 22, 2008", 13 pgs.
"U.S. Appl. No. 90/006,957, Response filed Jan. 9, 2006 to Non Final Office Action mailed May 10, 2005", 41 pgs.
"U.S. Appl. No. 90/006,957, Response filed Oct. 6, 2006 to Non Final Office Action mailed Sep. 6, 2006", 23 pgs.
"U.S. Appl. No. 90/006,984, Examiner Interview Summary mailed Feb. 23, 2006", 2 pgs.
"U.S. Appl. No. 90/006,984, Examiner Interview Summary mailed Mar. 7, 2007", 4 pgs.
"U.S. Appl. No. 90/006,984, Examiner Interview Summary mailed Nov. 2, 2005", 12 pgs.
"U.S. Appl. No. 90/006,984, Examiner Interview Summary mailed Nov. 21, 2006", 26 pgs.
"U.S. Appl. No. 90/006,984, Final Office Action mailed Sep. 28, 2010", 43 pgs.
"U.S. Appl. No. 90/006,984, Final Office Action mailed Dec. 23, 2005", 81 pgs.
"U.S. Appl. No. 90/006,984, Non Final Office Action mailed Jan. 31, 2005", 26 pgs.
"U.S. Appl. No. 90/006,984, Non Final Office Action mailed Oct. 2, 2006", 112 pgs.
"U.S. Appl. No. 90/006,984, Response filed Feb. 23, 2006 to Final Office Action mailed Dec. 23, 2005", 45 pgs.
"U.S. Appl. No. 90/006,984, Response filed Mar. 14, 2007 to Non Final Office Action mailed Oct. 2, 2006", 7 pgs.
"U.S. Appl. No. 90/006,984, Response filed Mar. 31, 2005 to Non Final Office Action mailed Jan. 31, 2005", 64 pgs.
"U.S. Appl. No. 90/006,984, Response filed Dec. 4, 2006 to Non Final Office Action mailed Oct. 2, 2006", 30 pgs.
"U.S. Appl. No. 90/006,984, Response to Examiner's Interview Summary Statement filed Dec. 21, 2006", 7 pgs.
"U.S. Appl. No. 90/006,984, Supplemental Amendment mailed Dec. 27, 2005", (Mar. 29, 2004), 29 pgs.
"U.S. Appl. No. 90/006,984, Supplemental Response filed May 6, 2005 to Non Final Office Action mailed Jan. 31, 2005", 10 pgs.
"U.S. Appl. No. 90/008,362, Final Office Action mailed Sep. 28, 2010", 43 pgs.
"U.S. Appl. No. 90/008,362, Response filed Nov. 29, 2010 to Final Office Action mailed Sep. 28, 2010", 4 pgs.
"U.S. Appl. No. 90/008,650, Examiner Interview Summary mailed Feb. 12, 2009", 4 pgs.
"U.S. Appl. No. 90/008,650, Final Office Action mailed Nov. 20, 2008", 54 pgs.
"U.S. Appl. No. 90/008,650, Non Final Office Action mailed Oct. 2, 2007", 67 pgs.
"U.S. Appl. No. 90/008,650, Response filed Dec. 3, 2007 to Non Final Office Action mailed Oct. 2, 2007", 77 pgs.
"Archives of the Internet Marketing Discussion List", (Jan. 24, 2002).
"Art Listing Form (completed)", published by Artsearch, (Dec. 12, 1988).
"Artsearch Listing Form", Denver Colorado, (late 1980s-early 1990s), 6 pgs.
"Asset Management Control, Inc.", Business Process PowerPoint Presentation Re: U.S. Appl. No. 08/189,987, (1993-1994).
"AT&T PersonaLink Services to Use Intelligent Network Assistants", AT&T, (Jan. 6, 1994).

"Aucnet USA to Use GM Hughes Satellite for Auto Auction", Dow Jones & co., Inc.,, (Feb. 9, 1994).
"Auction Catalog Cybercoins", Cite 34, Hubbard Declaration, Exhibit J, (1995), 4 pgs.
"Auction Report", Cite 34, Hubbard Declaration, Exhibit M, 6 pgs.
"Auction Web Welcome", [Online]. Retrieved from the Internet: <URL: http://members.tripod.com/zzozz1/zbay/retrobay/welcome.html>.
"AuctionWeb Billing Information", [Online]. Retrieved from the Internet: <URL: http://web.archive.org/web/1998/1206125104/http://www2ebay.com/aw/billing.html>, (Accessed May 18, 2005).
"AuctionWeb Listing—Computer Software—Macintosh", [Online]. Retrieved from the Internet: <URL: http:/web.archive.org/web19981206050054/http://www.ebay.com/aw/listing/lists/list-54/list-54.html>, (Accessed May 18, 2005), 1 pg.
"AuctionWeb Listings—Photography, Video Equipment", [Online]. Retrieved from the Internet: <URL: http://web.archive.org/web/19990218074857/http://www2ebay.com/aw/listings/lists/list-92/list-92.html>, (Accessed May 18, 2005).
"AuctionWeb Welcome", [Online]. Retrieved from the Internet: <URL: http://web.archive.org/web/19990219155122/http://www.ebay.com/aw/welcome.htnl>, (Accessed May 18, 2005), 2 pgs.
"AuctionWeb: Interactive Web Auction", [Online]. Retrieved from the Internet: <URL: http://groups-beta.google.com/group/misc.forsale.non-computer/messages/d45b835b280cfdd8?hl=en&t...>, (Sep. 24, 1995), 3 pgs.
"AUCTIONWEB: Interactive Web Auction", [Online]. Retrieved from the Internet: <URL: http://groups-beta.google.com/group/misc.forsale.computers.pc-specific.misc/messages/ace1f724ea0f45...>, (Sep. 13, 1995), 2 pgs.
"Bank Card Originated Messages—Interchange Message Specifications—Content for Financial Transcation", International Standard, (1987).
"Big Players Team Up to Provide Affordable Web Security Standards", Electronic Marketplace Report, (Apr. 18, 1995).
"BookIt!", Web Ventures, [Online]. Retrieved from the Internet: <URL: http://www.webventures.com>, (1996).
"BPAI decision on Appeal in U.S. Appl. No. 08/427,820", (Jul. 13, 2003), 41 pgs.
"Breakaway Companies Part II", Electronic Information Report, vol. 16, No. 16., Simba Information, Inc.
"Business Plan for Intermart", Intermart, (Jul. 13, 1994), 32 pgs.
"Buy and Sell Stocks on the Internet", DOT.com Marketing Section, (Jan. 1995), Business Communication, vol. 1,No. 10.
"Cashing in on Cyberspace Tribune's Big Stake in Interactive", NewsInc, (Nov. 27, 1995), 2 pgs.
"Cassini Resource Exchange User's guide", California Institute of Technology, (Apr. 1993), 19 pgs.
"Central Motor Auction in Strategic Alliance with MITAC:2", Extel Examiner, (Oct. 28, 1994).
"Centris 650: Technical Specifications from Apple Computer".
"Checkfree Announces New Electronic Payments Agreements", Corporate EFT Report, (Dec. 28, 1994).
"Checkfree Corp and Internet Provider Go for Secure Access", Information Access Company, Gralla Publications U.S., (Feb. 1, 1995).
"Chicago Firm Offers Internet Brokerage Services", Simba Information, Inc., Media Daily, (Dec. 21, 1994), Section No. 342, vol. 2.
"Cig Searchbots", (Jan. 27, 2002), 4 pgs.
"Civil Docket for Case No. 2:01-cv-736-JBF-JEB", U.S. District Court, Eastern District of Virginia (Norfolk), Jan. 1, 2007-Apr. 9, 2007.
"Clearing House Automated Payments System", National Westminster Bank.
"CommerceNet Security Details?", University of Illinois at Urbana, (May 25, 1994).
"Community Guidelines", [Online]. Retrieved from the Internet: <URL: http://web.archive.org/web/19990117052746/http://pages.ebay.com/aw/guidelines.html>, (Apr. 11, 2006).
"Company Presentations (Innovators—Includes Related Article on Network Topologies)", EDventure Holdings, Inc.,, (Feb. 23, 1995), vol. 95, No. 2, ISSN: 1047-935X.
"Competition in the Dutch Flower Markets", (Nov. 6, 2001), 7 pgs.

"Complaint", *Mercexchange LLC v Aden Enterprises*, United States District Court for the Eastern District of Virginia, Alexandria, Virginia, Civil Action No. 00-752-A, (May 8, 2000).
"CompuServe's Big Push Will Impact Online Commerce", Electronic Information Report, Simba Information, Inc. (Aug. 8, 1995), vol. 9, No. 15.
"Confidential Attorneys' Eyes Only, Deposition of Paul Thomas Ryan", *MercExchange, L.L.C. v. eBay Inc., and Returnbuy, Inc.*, United States District Court Eastern District of Virginia Norfolk Division, Civil Action No. 2:01-CV-736, (Jun. 27, 2002).
"Confidential Deposition of Jason Robert Surratt", *MercExchange, L.L.C. v. eBay Inc., and Returnbuy, Inc.*, United States District Court Eastern District of Virginia Norfolk Division, Civil Action No. 2:01-CV-736, (Jun. 20, 2002), 47 pgs.
"Confidential Video Deposition of Larry W. Evans", *MercExchange, L.L.C. v. eBay Inc., and Returnbuy, Inc.*, United States District Court Eastern District of Virginia Norfolk Division, Civil Action No. 2:01-CV-736, (Mar. 26, 2003).
"Confidential Video Deposition of Q. Todd Dickinson", *MercExchange, L.L.C. v. eBay Inc., and Returnbuy, Inc.*, United States District Court Eastern District of Virginia Norfolk Division, Civil Action No. 2:01-CV-736, (Apr. 3, 2003).
"Confidential Video Deposition of Richard B. Troxel", *MercExchange, L.L.C. v. eBay Inc., and Returnbuy, Inc.*, United States District Court Eastern District of Virginia Norfolk Division, Civil Action No. 2:01-CV-736, (Mar. 25, 2003).
"Consignment Nodes", U.S. Appl. No. 08/427,820, (Apr. 26, 1995).
"Consignment Nodes", U.S. Appl. No. 08/554,704, (Nov. 7, 1995).
"Consignment Nodes", (red-line).
"Continued Deposition of Lawrence Snapp", *MercExchange, L.L.C. v. eBay Inc., and Returnbuy, Inc.*, United States District Court Eastern District of Virginia Norfolk Division, Civil Action No. 2:01-CV-736, (Jun. 17, 2002).
"Continued Deposition of Nicholas Joseph Magliato", *MercExchange, L.L.C. v. eBay Inc., and Returnbuy, Inc.*, United States District Court Eastern District of Virginia Norfolk Division, Civil Action No. 2:01-CV-736, (Apr. 17, 2002).
"Corporate information, About Auctions. corn: Auctions You Can Trust", Auctions.com, (Jun. 7, 2000), 3 pgs.
"Corporate Information: History", Sothebys, [Online]. Retrieved from the Internet: <URL: http://search.sothebys.com/about/corporate/as.corphistory.html>, (Accessed Jun. 16, 2004), 2 pgs.
"Corrected Brief for Plaintiff-Cross Appellant", In the United States Court of Appeals for the Federal Circuit, *Mercexchange LLC*, Plaintiff-Cross Appellant v. *eBay, Inc. and Half.com, Inc.*, Defendants-Appellants, Appeal from the United States District Court for the Eastern District of Virginia in 2:01-CV, (Mar. 31, 2004).
"Corrected Brief of Appellants", In the United States Court of Appeals for the Federal Circuit, Case No. 03-1600, -1616, *MercExchange, L.L.C. v. eBay, Inc. and Half.com, Inc.*, (Jan. 6, 2004), 70 pgs.
"Create your AuctionWeb account", [Online]. Retrieved from the Internet: <URL: http://web.archive.org/web/19990221044526/www2ebay.com/aw/account-order.html>, (Accessed May 18, 2005), 2 pgs.
"Cybercash as a Virtual Smart Car Internet", Electronic Payments International, (Aug. 1, 1995).
"Cyberspace Cowboys", Sportstyle, 17(2), (Feb. 1995), 3 pgs.
"Daemon", [Online]. Retrieved from the Internet: <URL: http://www.webopedia.com/TERM/d/daemon.html>, (Jun. 2, 2004), 2 pgs.
"Dateline", Data Based Advisor, 10(10), (Oct. 1992), 2 pgs.
"DEC XL560 Pentium for Sale", Google Newsgroup: la.forsale; nj.forsale; pa.forsale; austin.forsale; ph, Paradigm Shift Corporation, (May 31, 1994).
"Decision", In the United States Court of Appeals for the Federal Circuit, Case No. 03-1600, -1616, *MercExchange, L.L.C. v. eBay, Inc. and Half.com, Inc.*, (Mar. 16, 2005).
"Deposition of Alan Fisher, vol. 1", *MercExchange, L.L.C. v. eBay Inc., and Returnbuy, Inc.*, United States District Court Eastern District of Virginia Norfolk Division, Civil Action No. 2:01-CV-736, (Jun. 18, 2002), 22 pgs.

"Deposition of Alan Fisher, vol. II", *MercExchange, L.L.C.* v. *eBay Inc., and Returnbuy, Inc.*, United States District Court Eastern District of Virginia Norfolk Division, Civil Action No. 2:01-CV-736, (Jun. 19, 2002), 24 pgs.

"Deposition of Alfred C. Weaver, Ph.D.", *MercExchange, L.L.C.* v. *eBay Inc., and Returnbuy, Inc.*, United States District Court Eastern District of Virginia Norfolk Division, Civil Action No. 2:01-CV-736, (May 8, 2002).

"Deposition of Cameron McEachern, Highly Confidential—Attorneys' Eyes Only", *MercExchange, L.L.C.* v. *eBay Inc., and Returnbuy, Inc.*, United States District Court Eastern District of Virginia Norfolk Division, Civil Action No. 2:01-CV-736, (Jun. 14, 2002).

"Deposition of Choy Heng-Wah", *MercExchange, L.L.C.* v. *eBay Inc., and Returnbuy, Inc.*, United States District Court Eastern District of Virginia Norfolk Division, Civil Action No. 2:01-CV-736, (Apr. 9, 2002).

"Deposition of Greg Scharer", *MercExchange, L.L.C.* v. *eBay Inc., and Returnbuy, Inc.*, United States District Court Eastern District of Virginia Norfolk Division, Civil Action No. 2:01-CV-736, (Jun. 5, 2002).

"Deposition of Jerry Kaplan", *MercExchange, L.L.C.* v. *eBay Inc., and Returnbuy, Inc.*, United States District Court Eastern District of Virginia Norfolk Division, Civil Action No. 2:01-CV-736, (Jun. 18, 2002), 49 pgs.

"Deposition of Jonathan W. Palmer", *MercExchange, L.L.C.* v. *eBay Inc., and Returnbuy, Inc.*, United States District Court Eastern District of Virginia Norfolk Division, Civil Action No. 2:01-CV-736, (Mar. 31, 2003).

"Deposition of Jonathan W. Palmer, Ph.D.", *MercExchange, L.L.C.* v. *eBay Inc., and Returnbuy, Inc.*, United States District Court Eastern District of Virginia Norfolk Division, Civil Action No. 2:01-CV-736, (May 8, 2002).

"Deposition of Lawrence a. Snapp", *MercExchange, L.L.C.* v. *eBay Inc., and Returnbuy, Inc.*, United States District Court Eastern District of Virginia Norfolk Division, Civil Action No. 2:01-CV-736, (Apr. 19, 2002).

"Deposition of Mark Borghi", *MercExchange, L.L.C.* v. *eBay Inc., and Returnbuy, Inc.*, United States District Court Eastern District of Virginia Norfolk Division, Civil Action No. 2:01-CV-736, (Jun. 26, 2002).

"Deposition of Mark DiMaggio", *MercExchange, L.L.C.* v. *eBay Inc., and Returnbuy, Inc.*, United States District Court Eastern District of Virginia Norfolk Division, Civil Action No. 2:01-CV-736, (Apr. 11, 2002).

"Deposition of Martin Adelman", *MercExchange, L.L.C.* v. *eBay Inc., and Returnbuy, Inc.*, United States District Court Eastern District of Virginia Norfolk Division, Civil Action No. 2:01-CV-736, (Apr. 9, 2003).

"Deposition of Michael Luther", *MercExchange, L.L.C.* v. *eBay Inc., and Returnbuy, Inc.*, United States District Court Eastern District of Virginia Norfolk Division, Civil Action No. 2:01-CV-736, (Jun. 20, 2002).

"Deposition of Michael Nardella", *MercExchange, L.L.C.* v. *eBay Inc., and Returnbuy, Inc.*, United States District Court Eastern District of Virginia Norfolk Division, Civil Action No. 2:01-CV-736, (May 6, 2002).

"Deposition of Nicholas Joseph Magliato", *MercExchange, L.L.C.* v. *eBay Inc., and Returnbuy, Inc.*, United States District Court Eastern District of Virginia Norfolk Division, Civil Action No. 2:01-CV-736, (Apr. 10, 2002).

"Deposition of Pierre Omidyar", *MercExchange, L.L.C.* v. *eBay Inc., and Returnbuy, Inc.*, United States District Court Eastern District of Virginia Norfolk Division, Civil Action No. 2:01-CV-736, (Jun. 4, 2002), 14 pgs.

"Deposition of Q. Todd Dickinson", *MercExchange, L.L.C.* v. *eBay Inc., and Returnbuy, Inc.*, United States District Court Eastern District of Virginia Norfolk Division, Civil Action No. 2:01-CV-736, (May 10, 2002).

"Deposition of Thomas Woolston", *MercExchange, L.L.C.* v. *eBay Inc., and Returnbuy, Inc.*, United States District Court Eastern District of Virginia Norfolk Division, Civil Action No. 2:01-CV-736, (Apr. 16, 2002), 52 pgs.

"Downtown Anywhere Visitors Center", Downtown Anywhere Inc.,, (Mar. 12, 2002).

"DVD containing NBC Today Show", dated Sep. 1, 1994 (video and transcript), and Edwin Newman's Honicorp (Nahan) Presentation, 192 (video and transcript).

"E-mail from John Phillips to Stefano Karmis at USPTO dated (USPTO U.S. Appl. No. 90/006,956) (Exhibit 12, PhOct. 27, 2005 re Woolston '265 patent reexam illips Mar. 15, 2007)", Woolston '265 patent reexam (USPTO U.S. Appl. No. 90/006,956: F&R 13466-010RX1), (Oct. 27, 2005).

"E-mail from John Phillips to Yogesh Garg at USPTO dated Dec. 21, 2005 re Woolston '051 patent reexamination (U.S. Appl. No. 90/006,984) (Exhibit 13, Phillips Mar. 15, 2007)", (Dec. 21, 2005).

"Earth Day on the Internet-Rockers and Performances Give Autographed Posters to Save the Earth", Newswire, PR News Wire Assoc., Inc., (Mar. 14, 1995).

"eBay Adds Credit Card Requirement", Auction Watch, [From Declaration of Jonathan Palmer], (Oct. 12, 1999).

"eBay Adults Only Information", [Online]. Retrieved from the Internet: <URL: http://web.archive.org/web/19990428172805/ww-webay.com/aw/adult.html>, (Accessed May 18, 2005), 2 pgs.

"eBay Automotive", [Online]. Retrieved from the Internet: <URL: http://web.archive.org/web/20000303121535/http://www.ebay.com/auto-index.html>, (Accessed May 18, 2005), 2 pgs.

"eBay Computers", [Online]. Retrieved from the Internet: <URL: http://web.archive.org/web/19990508170258/www.ebay.com/aw/computer-index.html>, (Accessed May 18, 2005), 1 pg.

"eBay Inc. Announces First Quarter 1999 Financial Results", [Online]. Retrieved from the Internet: <URL: http://investor.ebay.com/releasedetail.cfm?ReleaseID=15257>.

"eBay Inc. Announces First Quarter 2000 Financial Results".

"eBay Inc. Announces First Quarter 2001 Financial Results", [Online]. Retrieved from the Internet: <URL: http://investor.ebay.com/releasedetail.cfm?ReleaseID=37138>, (Apr. 19, 2001).

"eBay Inc. Announces First Quarter 2002 Financial Results", [Online]. Retrieved from the Internet: <URL: http://investor.ebay.com/releasedetail.cfm?ReleaseID=77835>.

"eBay Inc. Announces Fourth Quarter and 1998 Year End Financial Results", [Online]. Retrieved from the Internet: <URL: http://investorebay.com/releasedetail.cfm?releaseID-15256>, (Jan. 26, 1999).

"eBay Inc. Announces Fourth Quarter and Full Year 2003 Financial Results".

"eBay Inc. Announces Fourth Quarter and Full Year 2004 Financial Results".

"eBay Inc. Announces Fourth Quarter and Full Year 2005 Financial Results".

"eBay Inc. Announces Fourth Quarter and Year End 1999 Financial Results", [Online]. Retrieved from the Internet: <URL: http://investor.ebay.com/releasedetail.cfm?ReleaseID-15263>, (Jan. 25, 2000).

"eBay Inc. Announces Fourth Quarter and Year End 2000 Financial Results", [Online]. Retrieved from the Internet: <URL: http://investor.ebay.com/releasedetail.cfm?ReleaseID=31808>.

"eBay Inc. Announces Fourth Quarter and Year End 2001 Financial Results", [Online]. Retrieved from the Internet: <URL: http://investor.ebay.com/releasedetail.cfm?ReleaseID=69550>, (Jan. 15, 2002).

"eBay Inc. Announces Fourth Quarter and Year End 2002 Financial Results", [Online]. Retrieved from the Internet: <URL: http://investor.ebay.com/releasedetail.cfm?ReleaseID=99663>.

"eBay Inc. Announces Second Quarter 1999 Financial Results", [Online]. Retrieved from the Internet: <URL: http://investor.ebay.com/releasedetail.cfm?ReleaseID=15258>, (Jul. 26, 1999).

"eBay Inc. Announces Second Quarter 2001 Financial Results", [Online]. Retrieved from the Internet: <URL: http://investor.ebay.com/releasedetail.cfm?ReleaseID=49392>, (Jul. 2001).

"eBay Inc. Announces Second Quarter 2002 Financial Results", [Online]. Retrieved from the Internet: <URL: http://investor.ebay.com/releasedetail.cfm?ReleaseID=85623>.

"eBay Inc. Announces Third Quarter 1998 Financial Results", [Online]. Retrieved from the Internet: <URL: http://investor.ebay.com/releasedetail.cff?ReleaseID=210560>, (Oct. 27, 1998).

"eBay Inc. Announces Third Quarter 1999 Financial Results", (Oct. 26, 1999).

"eBay Inc. Announces Third Quarter 2001 Financial Results", [Online]. Retrieved from the Internet: <URL: http://investorebay.com/releasedetail.cfm?ReleaseID=62264>, (Oct. 18, 2001).

"eBay Inc. Announces Third Quarter 2002 Financial Results", [Online]. Retrieved from the Internet: <URL: http://investor.ebay.com/releasedetail.cfm?ReleaseID=92686>.

"eBay Inc. Releases Second Quarter 2000 Financial Results", n[Online]. Retrieved from the Internet: <URL: http://investor.ebay.com/releasedetail.cfm?ReleaseID=18746>.

"eBay Inc. Releases Third Quarter 2000 Financial Results", [Online]. Retrieved from the Internet: <URL: http://investor.ebay.com/releasedetail.cfm?ReleaseID=26289>.

"eBay Inc.'s Memorandum in Support of ebay's Post-Markman Motion for Summary Judgement of Noninfringement and Uenforceability of U.S. Patent No. 6,202,051", (Filed Under Seal) by eBay, (Nov. 15, 2002).

"eBay Inc.'s Reply Memorandum in Support of eBay's Post-Markman Motion for Summary Judfement of Noninfringement and Unenforceability of U.S. Patent No. 6,202,051", (Filder Under Seal) by ebay, (Dec. 13, 2002).

"eBay Photo & Electronics", Online]. Retrieved from the Internet: <URL: http://web.archive.org/web/19990429051242/http://www.ebay.com/aw/photo-index.html>, (May 18, 2005).

"eBay Welcome", [Online]. Retrieved from the Internet: <URL: http://web.archive.org/web/19981202085151/http:www.ebay.com/aw/welcome.html>, (May 18, 2005).

"eBay welcome", [Online]. Retrieved from the Internet: <URL: http://web.archive.org/web/19990422032535/http://www.ebay.com/aw/welcome.html>, (Accessed May 18, 2005), 2 pgs.

"eBay's AuctionWeb tops one million bids, leading online auction service announces record year", M2 Presswire [From Declaration of Jonathan Palmer], (Dec. 12, 1996).

"eBay's compulsory disclosure under 35 U.S.C. § 282", (Jun. 28, 2002).

"eBay: Last man standing", [Online]. Retrieved from the Internet: <URL: http://news.com.com/eBay+Last+man+standing/2009-1017_3-887630.html>, (Apr. 20, 2002).

"EFT Issues: EFT Heads Down a New Payments Path", Bank Network News, faulkner & Gray Inc., ISSN: 1063-4428, (Sep. 25, 1994).

"Electronic File Directory MESCH-WAIS", Internet Presence Inc., (Mar. 28, 2002).

"Electronic Shopping War Heats Up", Corporate EFT Report, (Nov. 16, 1994), vol. 14, Issue 22.

"Errata", In the United States Court of Appeals for the Federal Circuit, Case No. 03-1600, -1616, *MercExchange, L.L.C.* v. *eBay, Inc. and Half.com, Inc.*, (Mar. 18, 2005).

"Ethernet Network for Two Macs article", (Aug. 1998).

"Expert Report of Arthur Keller", eBay Non-confidential Expert Reports/Declarations, (Jun. 9, 2002), 16 pgs.

"Expert Report of Kurt Maly", eBay Non-confidential Expert Reports/Declarations, (Jun. 10, 2002), 38 pgs.

"Expert Report of Stephen Crocker", eBay Non-confidential Expert Reports/Declarations, (Jun. 10, 2002), 23 pgs.

"Farmers Plugging Into Electronic Cattle Ring", The Financial Post (Toronto), Weekly Edition, Section 4, (Jan. 1, 1994), p. S11.

"FCC Will Allow Remote Electronic Bidding in Oct. 26 Narrowband PCS Auction", Common Carrier Week, (Oct. 10, 1994), 2 pgs.

"Financial Institution Retail Message Authentication", American National Standard X9-19, American Bank Association, (Aug. 13, 1986).

"First Auction Wins the Bid for Online", Internet Shopping Network,, (Jan. 7, 2002), 4 pgs.

"First Virtual Holdings: look, Ma, no crypto!", [online] [retrieved on Dec. 1, 2006], Retrieved from the Internet: <http://findarticles.com/p/larticles/mi_m0REL/is_n1_v95/a1_16520623/print>, (Jan. 24, 1995), 3 pgs.

"Frequently asked questions", [Online]. Retrieved from the Internet: <URL: http://web.archive.org/web/19990224132540/http://www2ebay.com/aw/faq.html>, (May 18, 2005).

"Frequently asked questions", [Online]. Retrieved from the Internet: <URL: http://web.archive.org/web/19981206111341/http://www2ebay.com/aw/faq/html>, (May 18, 2005).

"Gallery in a Database", (Sep. / Oct. 1990), p. 19.

"Give some feedback on an AuctionWeb user", [Online]. Retrieved from the Internet: <URL: http://web.archive.org/web/19981203032739/www2ebay.com/aw/user-feedback.html>, (May 18, 2005), 2 pgs.

"Go for the green—country club members scrambling to buy PGA west, mission hills courses at auction", Los Angeles Times Horne Edition col. D1, (Jun. 30, 1993), p. 3.

"Google Groups, viewing message Pierre-1209952317370001@pierre.vip.best.com, newsgroups:", Google Groups, (Sep. 12, 1995).

"Google Groups: Alt.censorship", [Online]. Retrieved from the Internet: <URL: http://groups-beta.google.com/group/alt.censorship/mes/a12befe479d7006a?q=pierre+author:pierre+aut...>, (Accessed May 18, 2005), 3 pgs.

"Google Groups: alt.marketing.online.ebay", [Online]. Retrieved from the Internet: <URL: http://groups-beta.google.com/alt.marketing.online.ebay/brows_thread/thread/7f2d54a0ffad2e55/...>, (May 18, 2005), 3 pgs.

"Google Groups: Alt.personals.bondage", [Online]. Retrieved from the Internet: <URL: http://groups.google.com/groups?1=author:pierre%40netcome.com&hl=en&selm=1993Mar10.064848.2020%40netcome.com&rnum=16>, (Accessed May 18, 2005).

"Google Groups: alt.privacy", [Online]. Retrieved from the Internet: <URL: http://groups.google.com/groups?q=author:pierre%40netcom.com&hl=en&selm=pierre-0211941530410001%40pierre.slip.netcom.com&rnum=5>, (Accessed May 18, 2005), 2 pgs.

"Google Groups: alt.sex.graphics", [Online]. Retrieved from the Internet: <URL: http://groups.google.com/group?q=author:pierre%40claris.com&hl=en&selm=11057%40claris.com&rnum=3>, (Accessed May 18, 2005), 2 pgs.

"Google Groups: AuctionWeb Listings", [Online]. Retrieved from the Internet: <URL: http://group.google.com/groups?hl=en&ie=ISO-8859-1&oe=ISO-8859-1&selm=pierre-2409951422240001%40pierre.vip.best.com>, (Accessed May 18, 2005), 4 pgs.

"Google Groups: AuctionWeb Listings", [Online]. Retrieved from the Internet: <URL: http://groups.google.com/groups?num=100&hl=en&ie=ISO-8859-1&oe=ISO-8859- 1&scoring=r&as_drrb=b&q=author%3Aaw@ebay.com&btnG=Google&Search&as_mind=1&as_minm=1&as_miny=1996&as_maxd=31&as_maxm=3&as_maxy=1996>, (Accessed May 18, 2005), 4 pgs.

"Google Groups: aw@ebay.com—bay area", [Online]. Retrieved from the Internet: <URL: http://groups.google.com/groups?num=50&hl=en&ie=ISO-8859-1&oe=ISO-8859-1&q=%22aw#ebay.com%22+bay&area>, 3 pgs.

"Google Groups: ba.market.forsale", [Online]. Retrieved from the Internet: <URL: http://groups-beta.google.com/group/ba.market.forsale/browse_thread/thread/614165e5d256eeb8/23ble...>, (May 18, 2005), 3 pgs.

"Google Groups: comp.org.eff.talk", [Online]. Retrieved from the Internet: <URL: http://groups.google.com/groups?q=pierre+author:pierre+author:omidyar&start=50&hl=en&scoring=r&selm=1993Mar3.075423.16960%40netcom.com&rnum=64>, (Accessed May 18, 2005), 2 pgs.

"Google Groups: rec.arts.startek", [Online]. Retrieved from the Internet: <URL: http://groups.google.com/groups?q=author:pierre+author.omidyar7smart=50&hl=en&ie=ISO-8859-1&oe=ISO-8859-1&scoring=r&selm=11086%40claris.com&rnum=84>, (Accessed May 18, 2005), 2 pgs.

"Google Groups: Search Author:Pierre@ebay.com AcutionWeb", [Online]. Retrieved from the Internet: <URL: http://groups.google.com/groups?q=author:pierre%40ebay.com+auctionweb&num=50&hl=en&ie=ISO-8859-1&oe=ISO-8859-1>, (Accessed May 18, 2005), 4 pgs.

"Google Groups:comp.infosystems.www.announce", [Online]. Retrieved from the Internet: <URL: http://groups-beta.google.com/group/comp.infosystems.www.announce/msg/2a6c7fbb1c7162ae?q=%22...>, (May 18, 2005), 1 pg.

"Google Newsgroup Re: new News Group re: Collecting Stamps", Automatic Newsgroup, (Jan. 11, 1994).

"Google Newsgroup Re: press/Digital and Open Market Partner to do Business Over the Internet", Digital Press & Analysis News, (Nov. 7, 1994), 3 pgs.

"Google Search", [Online]. Retrieved from the Internet: <URL: http://groups-beta.google.com/groups?q=author:pierre%40eBay.com+auctionweb&num=50&hl+en&ie...>, (May 18, 2005).

"Google Search Re: Weekly Product Highlight—Webpac Link to Notis LMC", Ameritech Library Services News, (Sep. 8, 1995).

"Helpful hints for Using free WAIS with Multiple Search Gateway", (Aug. 29, 1994).

"Here Come the Little Guys! Aucnet Inc.,", Tokyo Business Today, Tokyo Keizai Inc.,, (Feb. 1995), p. 5.

"Higher-Tech Home Dealing the Information Superhighway Has Arrived With Shoppers and Sellers Both Taking Advantage of Advances.; [3 Star Edition]", Joe Kilsheimer of the Sentinel Staff. Orlando Sentinel. Orlando, Fla., (Nov. 20, 1994), J.1 pg.

"Highly Confidential Video Deposition of Alfred C. Weaver", *MercExchange, L.L.C. v. eBay Inc., and Returnbuy, Inc.*, United States District Court Eastern District of Virginia Norfolk Division, Civil Action No. 2:01-CV-736, see at least p. 257, line 19 to p. 260, line 5; and p. 263, line 17 to p. 264, line 9, (Apr. 4, 2003), 68 pgs.

"How Credit Cards Work", [Online]. Retrieved from the Internet: <URL: http://money.howstuffworks.com/credit-card.htm/printable>.

"How Digital Cameras Work", [Online]. Retrieved from Internet <URL: http://electronics.howstuffworks.com/digital-camera1.html.

"How Routers Work", [Online]. Retrieved from the Internet: <URL: http://computer.howstuffworks.com/router.htm/printable>, (May 13, 2004).

"IBM Personal Computer/AT", vol. 129, [Online]. Retrieved from the Internet: <URL: http://en.wikipedia.org/wiki/IBM_Personal_Computer/AT>, (retrieved on May 5, 2006).

"IEM Prospectus: 1994 Virginia Senate Race [General Election (Candidates) Market] Vote Share Market", Iowa Electronic Markets, (Jun. 8, 2002).

"If you Build It, They May Come", PC Week, p. N01, (Nov. 18, 1995), 5 pgs.

"In the United States District Court in the Eastern District of Virginia Norfolk Division, *MercExchange, L.L.C.*, Plaintiff, v. *eBay, Inc., et al.*, Defendant, Civil Action No. 2:01cv736, Trial Proceedings, Norfolk Virginia, vol. 4B", (Apr. 28, 2003), 758-760; 775; 811:21-814:13; 990:14-15.

"Intel 80286", [Online]. Retrieved from the Internet: <URL: http://en.wikipedia.org/wiki/Intel_80286>, (retrieved on May 5, 2006).

"Interactive Coin Sales Begin Using Online Computers", Cite 34, Hubbard Declaration, Exhibit K, Coin World, (Oct. 23, 1995), 66.

"Interchange Message Specification for Debit and Credit Card Message Exchange Among Financial institutions", American National Standard, American Bankers Association, (May 16, 1988).

"Intermart Architecture and Design", Software Partners, Inc., (May 1, 1995), p. 1-10, California.

"Intermart Database Schemes", Intermart, (Feb. 7, 1995), vol. 5, p. 1-13.

"Internet providers take next step towards electronic commerce", Gale Group, (Dec. 1994), 2 pgs.

"Internet-based Investor Service Completes Trials; Adds Mutual Funds to investment Offerings", PR Newswire Association, Inc. (Jan. 17, 1995), Section: Financial News, Chicago.

"Interview summary in reexam Control. No. 90/006,984", (Nov. 21, 2006), 26 pgs.

"Japan Business Television Launches International Operations", PR Newswire, (Oct. 27, 1994).

"Japan's Largest Commercial Video Selects Spar Satellite Transmission Equipment", Canadian News Wire, (May 10, 1994).

"Job opportunities at eBay Inc.—Last Updated, Aug. 8, 1997", [Online]. Retrieved from the Internet: <URL: http://web.archive.org/web/19990203225956/http://www2ebay.com/aw/jobs.html>, (May 18, 2005).

"Joint Conference on Information Superhighway and You", Chinese Information and Networking Association, (Aug. 29, 1994).

"Joint Reply/Opposition Brief for Defendants-Appellants e-Bay Ind. and Half.com, Inc.", In the United States Court of Appeals for the Federal Circuit, Case No. 03-1600, -1616, *MercExchange, L.L.C.* v. *eBay, Inc. and Half.com, Inc.*, (Apr. 21, 2004).

"June Update", [Online]. Retrieved from the Internet: <URL: http://web.archive.org/web/19990223205606/www2ebay.com/aw/construction_news/htmljune.html>, (Accessed May 18, 2005), 1 pg.

"Jury Verdict of validity and infringement of 41 claims of the '265 and '176 Patents.", (May 27, 2003).

"Makingmarkets—American Information Exchange and InterImpulse create a need and fill it—Tutorial", RELease 1.0, (Jul. 14, 1990), 12 pgs.

"MCI Selects Netscape Communications Secure Software for New internet—MCI Service", Netscape Communication news Release, (Nov. 21, 1994).

"*MercExchange LLC v Ebay Inc.*", Civil Action No. 2:01cv736, vol. 19A, Trial Proceedings, Norfolk VA, (May 19, 2003), 4 pgs.

"MercExchange Office Action Response in U.S. Appl. No. 09/253,021", (Jul. 28, 2000), 19 pgs.

"MercExchange's Opposition to eBay's Motion for Summary Judgment of Noninfringement and Unenforceability of U.S. Patent No. 6,202,051 & Appendix of Exhibits to its Brief in Opposition to eBay's Motion for Summary Judgment", Filed Under Seal, filed by MercExchange on Dec. 3, 2002.

"Merchant Accounts and Key Management", Open Market, Inc., Appendix E, mailed to the USPTO Oct. 24, 1994, 13 pgs.

"MESCH: The Web's Multi-WAIS Engine for Searching Commercial Hosts", Internet Presence Inc., (Oct. 29, 1994).

"Method and Apparatus for Facilitating Internet Commerce Through Internetworked Markets and Auctions", Preliminary Amendment, (Feb. 19, 1999).

"Mosaic for X version 2.0 Fill-Out form Support", mosaic-x@ncsa.uiuc.edu, Appendix B, mailed to the USPTO Oct. 24, 1994, 9 pgs.

"MUDA Manual and Diskette Mailing List", (Dec. 28, 1992).

"MUDA Manual and Diskette Mailing List", (Sep. 1991).

"U.S. Appl. No. 09/253,021, Non Final Office Action mailed Jun. 7, 2000".

"Nemo's Inc., Acorn Collectors Service Network. Memphis, TN", (late 1980s), 2 pgs.

"Network General Buy Propels McAfee Into Top 10", Software Industry Report vol. 29, No. 20, (Oct. 20, 1997).

"New Issues—Checkfree: New and Noteworthy", Emerging and Special Situations, vol. 15, No. 9, McGraw-Hill Publishing, (Sep. 18, 1995).

"New MUDA Manual (SSWP 783) and Diskette Mailing List", (Dec. 1991).

"New Service Enables internet Users to Directly Buy, Sell and Manage Investments", PR Newswire Association, Inc. (Dec. 21, 1994), Section: Financial News.

"Newsgroup Posting Re: Shopkeeper Beta Testing", KEITH@TCP.IP.NET,, (Jul. 14, 1994).

"Newsgroup Posting Re: Usenet Software: History and Sources", (Jun. 8, 2002).

"Numismatists Online Presents . . . Internet Mail-Bid Auctions", Cite 34, Hubbard Declaration, Exhibit B, Numismatists Online, Menlo, Park, California,, (Aug. 1995), 2 pgs.

"Office Action", U.S. Appl. No. 08/427,820, U.S. Patent and Trademark Office, (Jan. 3, 1997).

"Office Action", U.S. Appl. No. 08/427,820, U.S. Patent and Trademark Office, (Sep. 17, 1997).

"Old MacDonald Had a PC", Canadian Business and Current Affairs Western Report, MicroMedia Limited ISSN: 0831-8891, (Sep. 13, 1993), p. 21.

"OMI Provides Secure Commercial Presence", Business Communications Co., vol. 1, No. 8, (Nov. 1994), p. 1.

"Online marketplace '95—marketing & Transactions Apr. 19, 1995", Newsbytes News Network, (Apr. 19, 1995), Chcago,IL.

"Online Pollution Trading in California", Newsbytes New Network, (Apr. 14, 1995).

"Onsale Joins Fray as Online Shopping Picks Up Speed: Internet Booms", Computer Reseller News, CMP Publications, Inc., USA, (Jun. 5, 1995), 1 pg.

"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pages.
"Open Market Inc. first to offer complete", Business Wire, (Oct. 24, 1994).
"Order", In the United States Court of Appeals for the Federal Circuit, Case No. 03-1600, -1616, *MercExchange, L.L.C.* v. *eBay, Inc. and Half.com, Inc.*, (Aug. 16, 2004).
"Order & Opinion regarding the Markman Hearing", dated Oct. 18, 2002.
"Order Addressing numerous discovery matters, etc.", *MercExchange, L.L.C.* v. *eBay, Inc., and Half.Com, Inc.*, United States District Court for the Eastern District of Virginia, Norfolk Division, Civil Action No. 2:01cv736, filed Feb. 26, 2007.
"Order denying Motion for Protective Order", *MercExchange, L.L.C.* v. *eBay, Inc., and Half.Com, Inc.*, United States District Court, Eastern District of Virginia, Norfolk Division, Action No. 2:01cv736, filed Mar. 6, 2007.
"Order for Taste Unlimited-Savory-Sauces", KEITH@TCP.IP.NET, PETERS_JIM@TANDEM.COM,, (Nov. 7, 1994).
"Order re Production of Documents", *MercExchange, L.L.C.* v. *eBay, Inc., and Half.Com, Inc.*, United States District Court, Eastern District of Virginia, Norfolk Division, Action No. 2:01cv736, Mar. 28, 2007.
"Order Vacating Ruling on Defendants' Motion to Compel", *MercExchange, L.L.C.* v. *eBay, Inc., and Half.Com, Inc.*, United States District Court, District of Connecticut, Case No. 3:07mc38 (JBA), filed Feb. 26, 2007.
"Outsourcing Taps on-line Goldmine", Computer World Inc.,, (Jun. 5, 1995), p. 20.
"Packet Switching", Wikipedia, [Online]. Retrieved from the Internet: <URL: http://en.wikipedia.org/wiki/Packet-switched_data_network>, (Nov. 14, 2006).
"Part II: Information Companies Invest to Gain Competitive Edge", Electronic Information Report, (Feb. 28, 1997), vol. 18, No. 8.
"PAWWS to Announce New Portfolio management Challenge, On-Line", M2 Communications Ltd., (Oct. 11, 1994).
"Paying Bills Electronically".
"Petition for Consistency for U.S. Appl. No. 09/166,779, Petitions for Consistency mailed Apr. 22, 2005", 71 pgs.
"Phil Salin and AMIX.", RELease 1.0, 91(12), (Dec. 26, 1991), 4 pgs.
"Phillips Deposition (filled under seal)", (Jun. 2002), 17-19.
"Phillips Deposition (filled under seal)", (Jun. 2002), 90, 96, 307, 308, and 319.
"Phillips Deposition (filled under seal)", (Jun. 2, 2008), 46 and 197.
"Post-Markman Rebuttal/Supplementation of Stephen Crocker Ph.D.", eBay Non-confidential Expert Reports/Declarations, (Dec. 23, 2002), 13 pgs.
"Preview Media and America Online Announce New Travel Services for America online Subscribers", PR Newswire, (Feb. 7, 1995), 3 pgs.
"Prodigy outline Internet Plans, Launches Services Sep. 24, 1994", Newsbytes News Network, (Sep. 29, 1994), 3 pgs.
"Proforma", Half.Com Proforma Quarterly Income Statement.
"Protest Under 37 CFR § 1.29(a), U.S. Appl. No. 09/253,014 mailed Jun. 18, 2004".
"Re: Linking and Organizing", KEITH@TCP.IP.NET, DKNIGHT@POWERGRID.ELECTRICITI.COM, (Aug. 30, 1994).
"Re:[isppa-1] Web page of Service Providers", KEITH@TCP.IP.NET, (Aug. 24, 1994).
"Rebuttal Expert Report of Alfred C. Weaver Regarding Allegations of Invalidity of U.S. Patent No. 6,202,051 and U.S. Patent No. 5,845,265", filed by MercExchange, (Jun. 28, 2002), 116 pgs.
"Registered user information request", AuctionWeb User Query, [Online]. Retrieved from the Internet: <URL: http://web.archive.org/web/19981205044546/http://www.2ebay.com/aw/user-query.html>, (May 18, 2005).
"Registered user services", [Online]. Retrieved from the Internet: <URL: http://web.archive.org/web/19990117002622/www2ebay.com/aw/registration.html>, (May 18, 2005).
"Reply Brief for Plaintiff-Cross Appellant", In the United States Court of Appeals for the Federal Circuit, Case No. 03-1600, -1616, *MercExchange, L.L.C.* v. *eBay, Inc. and Half.com, Inc.*, (May 5, 2004).

"Report on the Feasibility and Economics of Establishing a network for Electronic Sale of Sheep and Cattle Throughout Australia", Argicultural Business Research Institute, (Nov. 1983).
"Request for Ex Parte Reexamination, U.S. Patent No. 5,845,265, filed Jan. 16, 2007 (Exhibit 21, Phillips Mar. 15, 2007)", (Jan. 16, 2007).
"RN Newsreader Software", Academic Consulting Services, [Online]. Retrieved from the Internet: <URL: http://www.academ.com\m.html>, (May 18, 1998).
"Save the Earth FNDTN: Internet Online Rock and Roll Art Auction Celebrating Earth Day is Declared Open to the World for One Month; http://www.commerce.com/saveeearth", Business Wire, (1995), 2 pgs.
"Save the earth foundation: Internet auction online rock and roll art auction celebrating earth day is declared open to the world for one month", Business Wire, (Apr. 24, 1995).
"Save the earth foundation: the first ever autographed concert poster auction via the Internet", BW 1999, (Apr. 17, 1995).
"Save the Earth: Earth Day ALA Internet International Superstars Give Autographed Posters to Save the Earth", Business Wire, (Feb. 10, 1995), 1 pg.
"Search Commercial on the Internet a Survey of Searching Tools on the Internet", (Jan. 27, 2002).
"SEC disclosure", eBay, [Online]. Retrieved from the Internet: <URL: www.ebay.com>, (Sep. 1995).
"Security Top Issue for Banks Planning to Surf the Internet", Financial Services Report, (Apr. 12, 1995), vol. 12, Issue 8.
"SNPP a Simple Network Payment Protocol (Illegible)".
"Some early instances—prototypes, even-of object markets. (potential markets for programming objects)", RELease 1.0, 92(7), (Jul. 31, 1992), 12 pgs.
"Spry's Air Mosaic Express Provides Internet Access to World Wide Wed", The PC Netter, (Dec. 1, 1994), vol. 9, No. 12.
"Stanley Gibbons Auctions-Welcome to the SG World of Auctions", (Jan. 24, 2002).
"Subject: Beware Re: Cybercoins—http://www.numismatists.com, In rec.collecting.coins Google Groups", Cite 34, Hubbard Declaration, Exhibit I, (Oct. 19, 1995), 2 pgs.
"Supplement to the Expert Report of Dr Arthur Keller Addressing Invalidity in View of the Courts Markman and SJ Rulings the Subsequent Opinions of Drs Weaver and Palmer and Noninfringement in View of the Courts Markman Ruling", eBay Non-confidential Expert Reports/Declarations, (Dec. 23, 2002), 24 pgs.
"Supplemental Expert Report of Dr Arthur Keller", eBay Non-confidential Expert Reports/Declarations, (Aug. 30, 2002), 90 pgs.
"Technically Advanced Interactive Shopping Mall Based in Memphis, TN to Open on the Internet September", M2 Presswire, (Sep. 27, 1994), 2 pgs.
"The American Information Exchange Corporation Business Plan", American Information Exchange Corporation, (1990), 68 pgs.
"The Computer Museum Holds First Real-Time Charity Auctions on the World Wide Web", Business Wire, (May 8, 1995).
"The Development of Electronic Commerce", Electronic Markets, 9/10, (Oct. 1993), 3-4, 23-24, 27-28.
"The Evolution of TELCOT the Foundation of the Seam'", TELCOT Plains Cotton Cooperative Association, (1997), 3 pgs.
"The MD5 Message Digest Algorithm", Network Working Group, MIT laboratory for Computer Science and RSA Data Security. Inc., (Apr. 1, 1992).
"The Summer Conferences: Issues and Answers, Products and Services are SLA and ALA", Information Today, (Jul. 17, 1995), vol. 12, No. 7.
"The What's New Archives", Global NetworkNavigator, Inc.,, [Online]. Retrieved from the Internet: <URL: http://archive.ncsa.uiuc.edu/SDG/Software/Mosaic/Docs/whats-new.html>, (1996).
"Transcript of Proceedings (Motions) in the United States District Court for the Eastern District of Virginia, Norfolk", Civil Action No. 2:01cv736, (Nov. 17, 2006).
"Trial Proceedings, *MercExchange, LLC* v. *eBay, Inc., et al.*, Civil Action No. 2:01cv736, vol. 13A", (May 9, 2003), pp. 2326-2436.
"Trial Proceedings, *MercExchange, LLC* v. *eBay, Inc., et al.*, Civil Action No. 2:01cv736, vol. 15B", (May 13, 2003), pp. 2779-2877.

"Trial Proceedings, *MercExchange, LLC v. eBay, Inc., et al.*, Civil Action No. 2:01cv736, vol. 16A", (May 14, 2003), pp. 2878-2972.

"Tribune Co. Emerges as Big Interactive Services Player", Electronic Information Report, (Oct. 6, 1995), vol. 16, No. 43, Simba Information, Inc.

"Tribune Co. Seeks Next-Generation Media", Venture Capital Journal, (Aug. 1, 1995).

"Tribune Takes Papers Online, Cautiously", Interactive Content, (Feb. 1, 1995).

"Trusted Computer System Evaluation Criteria (The Orange Book)", Dept. of Defense Standards, DoD 5200.28-STD. Dec. 1985.

"uBid.com—Register to Bid", From Declaration of Jonathan Palmer, [Online]. Retrieved from the Internet: <URL: https://www.ubid.com/app/sgnon/default.asp>, (Accessed Apr. 24, 2002), 3 pgs.

"USA Commercenet Urges Government to East Export Restrictions on Encryption", Business Wire, (Jun. 26, 1995).

"User's Guide: Borland Paradox for Windows, Version 5.0", Borland International, Inc., (1994).

"USPTO Office Communication—U.S. Appl. No. 09/253,014,", Defendant's Exhibit 453, (Dec. 12, 2000), 8 pgs.

"Video Deposition of Ophir Frieder", *MercExchange, L.L.C. v. eBay Inc., and Returnbuy, Inc.*, United States District Court Eastern District of Virginia Norfolk Division, Civil Action No. 2:01-CV-736, (Apr. 4, 2003).

"Video Deposition of Thomas Woolston", *MercExchange, L.L.C. v. eBay Inc., and Returnbuy, Inc.*, United States District Court Eastern District of Virginia Norfolk Division, Civil Action No. 2:01-CV-736, (Jun. 18, 2002), 79 pgs.

"Video Deposition of Thomas Woolston, vol. 2", *MercExchange, L.L.C. v. eBay Inc., and Returnbuy, Inc.*, United States District Court Eastern District of Virginia Norfolk Division, Civil Action No. 2:01-CV-736, (Jun. 19, 2002), 79 pgs.

"Video Deposition of Thomas Woolston, vol. 3", *MercExchange, L.L.C. v. eBay Inc., and Returnbuy, Inc.*, United States District Court Eastern District of Virginia Norfolk Division, Civil Action No. 2:01-CV-736, (Jun. 20, 2002), 80 pgs.

"Video Deposition of William Jackson Matney, Jr.", *MercExchange, L.L.C. v. eBay Inc., and Returnbuy, Inc.*, United States District Court Eastern District of Virginia Norfolk Division, Civil Action No. 2:01-CV-736, (Jun. 13, 2002).

"Videotape Deposition upon Oral Examination of Keith M. Basil", *MercExchange, L.L.C. v. eBay Inc., and Returnbuy, Inc.*, United States District Court Eastern District of Virginia Norfolk Division, Civil Action No. 2:01-CV-736, (Apr. 9, 2002).

"Videotaped Depositio of Jay Mintz", *MercExchange, L.L.C. v. eBay Inc., and Returnbuy, Inc.*, United States District Court Eastern District of Virginia Norfolk Division, Civil Action No. 2:01-CV-736, (Jun. 27, 2002).

"Videotaped Deposition of John Christopher Phillips, San Diego, California, Thursday, Mar. 15, 2007", In the United States District Court for the Eastern District of Virginia, Norfolk Division, No. 2:01cv736.

"Videotaped Deposition of Joseph Petsick", *MercExchange, L.L.C. v. eBay Inc., and Returnbuy, Inc.*, United States District Court Eastern District of Virginia Norfolk Division, Civil Action No. 2:01-CV-736, (Jun. 10, 2002).

"Videotaped Deposition of Kenneth Maxwell", *MercExchange, L.L.C. v. eBay Inc., and Returnbuy, Inc.*, United States District Court Eastern District of Virginia Norfolk Division, Civil Action No. 2:01-CV-736, (Jun. 11, 2002).

"Videotaped Deposition of Perry Blankley", *MercExchange, L.L.C. v. eBay Inc., and Returnbuy, Inc.*, United States District Court Eastern District of Virginia Norfolk Division, Civil Action No. 2:01-CV-736, (Jun. 28, 2002).

"Videotaped Oral Deposition of Michael Caputo", *MercExchange, L.L.C. v. eBay Inc., and Returnbuy, Inc.*, United States District Court Eastern District of Virginia Norfolk Division, Civil Action No. 2:01-CV-736, (Jun. 20, 2002).

"We could not locate the p. your requested", [Online]. Retrieved from the Internet: <URL: http://web.archive.org/web/20010322200718/pages.ebay.com/unavailable/page-not-found.html>, (May 18, 2005).

"WebMail Watch Service", Omidyar, [Online]. Retrieved from the Internet: <URL: http://groups-beta.google.com/group/comp.infosystems.www.browsers.misc/msg/ede1e062aa087710?q...>, (Aug. 25, 1995).

"Welcome to eBay!", [Online]. Retrieved from the Internet: <URL: http://web.archive.org/web/19970614001443/www.ebay.com>, (May 18, 2005).

"Welcome to Construction News!", [Online]. Retrieved from the Internet: <URL: http://web.archive.org/web/19981205202636/http://www2ebay.com/aw/construction_news/>, (May 18, 2005).

"Welcome to eBay!", [Online]. Retrieved from the Internet: <URL: http://web.archive.org/web/19961221031919/http://calculus.ebay.com>, (May 18, 2005).

"What's new at eBay's Auction Web", AuctionWeb What's New, [Online]. Retrieved from the Internet: <URL: http://web.archive.org/web19981202085151/http://www.ebay.com/aw/update.html>, (May 18, 2005), 6 pgs.

"Wholesale Showroom Opens to Public", Miami Herald; FINAI Section: Home & Design, (Oct. 21, 1984), p. 6H.

"Win a trip to the Sydney 2000 Olympic Games!", [Online]. Retrieved from the Internet: <URL: http://web.archive.org/web/20000511212217/wwwebay.com/aboutebay/index.html>, (May 18, 2005).

"World's First Virtual Auction Set to Go", The Ottawa Citizen, Business Section, (Oct. 22, 1994), p. E2.

"WWW 94 Vendor Exhibits", NCSA: Mosaic and the Web Conference, (Oct. 14, 1994).

"Yahoo Shopping Auctions", From Declaration of Jonathan Palmer, [Online]. Retrieved from the Internet: <URL: http://help.yahoo.com/help/us/auct/asell/asell-01.html>, (Accessed Apr. 24, 2002), 4 pgs.

Abadi, M., et al., "Authentication and Delegation With Smart-Cards", System Research Center, (Oct. 22, 1990).

Adams, R., "Newsgroup Posting Re: Hiring Webmasters and HTML Writers", (Oct. 6, 1994).

Akerlof, G, et al., "The Market for Lemon: Quality Uncertainty and the Market Mechanism", The Quarterly Journal of Economics, (May 13, 2002), vol. 84, Issue 3, pp. 488-500.

Anand, R., "Research Report—The Electronic Flea Market", Computer Science, RC 19678 (87230), IBM Research Division, (Jul. 28, 1994), 1-18.

Anderson, R., "UEPS a Second Generation Electronic Waller", University Computer Laboratory.

Anderson, R., "Why Cryptosystems Fail".

Andrews, P., "Online Users Hide Their Identities for Many Reasons, Legal and Illegal", Seattle Times, (Nov. 20, 1994), 6 pgs.

Angrist, S., "Iowa Market Takes Stock of presidential Candidates", Wall Street Journal, (Aug. 28, 1995).

Anis, "First Virtual bank of Cyberspace", (Oct. 28, 1994).

Aquilera, Mario C., "Coin Collectors Go International Via Cyberspace", San Diego Daily Transcript, (Apr. 17, 1995).

Arai, Toshifumi, et al., "Retrieving electronic documents with real-world objects on InteractiveDESK", UIST Proceeding of the 8th Annual ACM Symposium on User Interface and Software Technology, (1995), 37-38.

Asthana, A, et al., "An indoor wireless system for personalized shopping assistance", Workshop on Mobile Computing Systems and Applications, 1994. Proceedings., (Dec. 1994), 69-74.

Athens, G. H, "FCC auction built on client/server", Computerworld; Framingham, (Apr. 3, 1995), vol. 29, Iss. 14; p. 58, 1 pgs.

Bakos, J. Y, "A Strategic Analysis of Electronic Marketplaces", MIS Quarterly vol. 15, No. 3,, (Sep. 1991), p. 295-310.

Bakos, Yannis J., "A Strategic Analysis of Electronic Marketplace", MIS Quarterly, 15(3), (Sep. 1991), 16 pgs.

Banatre, J-P, "The Design and Building of Enchere, a Distributed Electronic Marketing System", Communications of the Association for Computing Maiciner, New York, NY, US. vol. 29 No. Jan. 1986, XP000002077, (Jan. 1986), 9-29.

Bank, D., "Coming to the Cyberworld: Virtual Cash", Buffalo News Business, (Mar. 15, 1995).

Bank, D., "Turning PCs Into ATMS", San Jose Mercury news, (Feb. 7, 1995).

Banks, V., "News Group Posting—Google Search Re: E-D-U-P-A-G-E", (Apr. 11, 1994).

Barnes, S., "Newsgroup Posting Re: Light Boxes for Viewing Slides", (Sep. 15, 1994).
Basil, K., "WAIS Searching script with support for multiple database querying", (1994).
Baty, J., et al., "InterShop: Enhancing the Vendor/Customer Deialectic in Electronic Shopping", Journal of Management information Systems vol. II, No. 4 (1995), pp. 9-31.
Baumann, G. W, "Personal Optimized Decision/Transaction Program", IBM Technical Disclosure Bulletin,, (Jan. 1995), 83-84.
Bazeley, "Ubid Marketing itself as Legally Safer than eBay", San Jose Mercury News, (Jun. 12, 2004).
Bellovin, S., "Usenet: The Great Renaming 1985-1988", WWW>VRX.NET, (Jun. 8, 2002).
Bendremer, S., "Downtown Anywhere: The New Internet City (Online Commerce Etc.)", Google Newsgroup: comp.infosystems.announce, (Jul. 21, 1994).
Benjamin, R., et al., "Electronic Markets and Virtual Value Chains on the Information Superhighway", Sloan Management Review, (Winter 1995).
Benson, B., et al., "The impact of Provincial Marketing Boards on Price Relations and Pricing Dynamics in the North America Slaughter Hog Market", (Jul. 1994).
Berners-Lee, Tim, "Hypertext Transfer Protocol (HTTP), A Stateless Search, Retrieve and Manipulation Protocol", draft-ietf.iiir-http-00.txt, Appendix C, mailed to the USPTO Oct. 24, 1994, (May 5, 1993).
Berners-Lee, Tim, "Uniform Resource Locator", Internet Draft, IETF URL Working Group, Appendix D, mailed to the USPTO Oct. 24, 1994, (Jul. 14, 1993).
Bernstein, Judith, "Computer Museum Holds an Internet Auction", Open Systems Today, 149, (1994), 2 pgs.
Bichl, S., "IC Cards in High Security Applications", Voest Alpine, AG.
Bina, Eric, et al., "Secure access to data over the Internet", Proceedings of the Third International Conference on Parallel and Distributed Information Systems, (1994), 99-102.
Birenbaum, "Add-on encapsulation for router-based networks, products leaders/internetworking, data communications", (May 21, 1994), pp. 41-42.
Blankenhorn, Dana, "Building the tools for Web commerce", Interactive Age, 208, (1995), 34.
Blankenhorn, Dana, "Open market Web site takes new tack—Launched as an online mall, site not focuses on the company's WebServer Line", Internet Week, (Oct. 9, 1995).
Blankley, P., "E-mail Re: Acorn Collectors and eBay", (Jun. 15, 2002).
Blucher, J., "Profits Run Secondary Art Market", Daily News reports. Anchorage Daily News. Anchorage, Alaska, recovered from Proquest on Oct. 31, 2008, (Nov. 10, 1991), E.1.
Boelke, B., "Google Search Re: News Group-Collecting Stamps—WWW Auction Update", (Mar. 30, 1995).
Borman, et al., "Electronic Agricultural Auctions in the United Kingdom", EM—Electronic Markets, No. 9-10, (Oct. 1993), pp. 27-28.
Bos, J., "SmartCash a Practical Electronic Payment System", Center for Mathematics and Computer Science, (August).
Bowers, Richard, "Barbie Sold for $7,999 on Internet", Newsbytes News Network [From Declaration of Jonathan Palmer], (Feb. 14, 1997).
Brouwer, J., et al., "Human-Machine Communication for Educational Systems Design".
Brown, H., "Gogle Newsgroup Re: Lady Death and Shi Auction", (Oct. 26, 1994).
Buckman, A., "Electronic business", Viacom to auction 'Cosby' spots, (Feb. 1, 1998), pp. 1-4.
Burchfield, B., "Cast Study—The Cirrus Banking Network", (Aug. 1985), 10 pgs.
Burk, H., "A Value Exchange Systems Enabling security and Unobservavbility, Computers and security".
Burmeister, J., "Google Search Re: Newton Mail Is Here!", (Oct. 8, 1993).
Business Wire, Inc., "The Computer Museum Brings Auction Block to Cyberspace in First Internet Auction", Business Wire, Inc., (Mar. 14, 1994), 2 pages.

Canessa, E., et al., "Proceedings of the WWW94 Workshop at CERN: Offering the Same Information Via Multiple Services".
Carlson, D., et al., "An Analysis of the Information and Report Requirements, Market, Architectures, Operational and Regulatory Issues, and Derivative Instruments for Reclaim", Pacific Stock Exchange, Inc., Contract No. R-C93074, (Jul. 6, 1993).
Cash, J., "Electronic Commerce", Information Week, (Dec. 26, 1994), Columnist Section, p. 60.
Chabrow, E., "A New Era is Brokered in", Information Week, (Sep. 18, 1995), 3 pgs.
Chalker, K., "Newsgroup POsting Re: AMD/Intel?", PSI Public Usenet Link, (Sep. 20, 1994).
Chalker, K., "Newsgroup Posting Re: for Sale: New Western Digital 1Gb 1DE Drive—$540!", PSI Public Usenet Link, (Sep. 28, 1994).
Chalker, K., "Newsgroup Posting Re: Motherboards with BIOS Support for EIDE", PSI Public Usenet Link, (Oct. 5, 1994).
Chalker, K., "Newsgroup Posting Re: Pentium Bug—How to Tell?", PSI Public Usenet Link, (Nov. 25, 1994).
Channing, R., et al., "Online Images From the History of Medicine (OLI): Creating a Large Searchable Image Database for Distribution Via World-Wide Web", Lister Hill Center for Biomedical Communications.
Chaum, D., "Abstract-Untraceable Electronic (Illegible)", Center for Mathematics and Computer Science.
Chaum, D., "Achieving Electronic Privacy", Scientic American, 267(2), (Aug. 1992), 8 pages.
Chaum, D., "Implementing Capability-Based Protection Using Encryption", Electronics Research Laboratory—University of Berkeley, (Jul. 17, 1978).
Chernicoff, "You can shop 'til you drop—from your desktop; Net Outlook; PC Week Netweek; Column", Information Access Company, No. 3, vol. 12, ISSN: 0740-160416226069, (Jan. 23, 1995), p. N13.
Chess, D., et al., "Itinerant Agents for Mobile Computing", IEEE Personal Communications, (Oct. 1995), p. 34-49.
Chess, D., et al., "Mobile Agents: Are They a Good Idea?", IBM Research Division, (Jan. 7, 2002).
Churbuck, D., "Dial-A-Catalog", Forbes, (Oct. 10, 1994), p. 126-130.
Clarke, R., "EDI is But One Element of Electronic Commerce", International EDI Conference, (Nov. 6, 2001).
Clarke, R., "The Strategic Intent of Online Trading Systems a Case Study in National Livestock Marketing", Xamax Consultancy Ltd., (Aug. 16, 1992), 22 pgs.
Clemons, E, "Evaluating the prospects for alternative electronic securities", Proceedings of ICIS 91: 12th International Conference on Information Systems, (Dec. 16-18, 1991), 53-61.
Clemons, E., et al., "The Impact of Information Technology on the Organization of Economic Activity: The Move to the Middle Hyupothesis", (Fall 1993), vol. 10, No. 2, pp. 9-35.
Clifford, D., "Notes on Community Information Systems", (Dec. 10, 1989), 7 pgs.
Cohen, D., "Computerized Commerce", Proceedings of the IFIP World Camputer Congress Held Aug. 28-Sep. 1, 1989, Reprinted From Information Processing 89, (Oct. 1989), 27 pgs.
Cohen, Danny, "Electronic Commerce", University of Southern California, Information Sciences Institute, ISI Research Report, ISI/RR-89-244, (Oct. 1989), 1-19, 31-33.
Connelly, M., "Ford Sets Electronic Auction: New Setup Will Sell Some Used Vehicles Automotive News", Crain Communications, Inc., (Apr. 10, 1995).
Contini, A., et al., "Title Auction Selling", Agriculture and Rural Division, (Nov. 6, 2001).
Cook, J., "Headline Send Fido Shopping Why Fight Cwords? Web Site Mascot Can Sniff Out Super Gifts While You Stay in Your SLippers", St. Louis Post Dispatch Inc., (Dec. 7, 1995).
Cox, M., et al., "Manic Market: Prices of Hottest Art Reach Stunning Levels As Boom Keep Going—Some Still Say It Has to End, But Smart-Money Crowd Is Paying Little Attention—New Millions From a Swede", Wall Street Journal (Eastern edition). New York, N.Y., recovered from Proquest, (Nov. 28, 1988), 1 pg.
Crawford, "eBay's Risky Bid", Industry Spotlight, [From Declaration of Jonathan Palmer], Corporate Counsel, (May 2002).

Crone, R., "Notes from the Infobahn: Navigating the Web of New Alliances in Cyberspace", American Banker, (Aug. 7, 1995).
Crossley, David, "WAIS Through the Web discovering Environmental Information", (Sep. 15, 1994).
Cummings, "", Stealing the Real Estate Spotlight, Business Journal of new Jersey, vol. 3, No. 6, p. 37.
Davies, S. A, "Treasury action to 'go live' with computer tenders. (Treasury Automated Auction Processing System, or TAAPS)(Public securities association supplement)", Bond Buyer v. 304, n2914, (Apr. 29, 1993), 5 pgs.
Davis, J., et al., "A Protocol and Server for a Distributed Digital Technical Report Library", (Apr. 25, 1994).
Davis, J., "Dropin Publishing With the World Wide Web", Xerox, Inc. and Cornell University, (May 3, 1999).
De Lafuente, D., "A Virtual Paradise Online Users Can Find Business Offering Everything From Bar-Hopping to Wine Tours, Casinos to Camping", Chicago Sun Times, (Apr. 2, 1995).
De Violini, Lois M. Evans, "Philatelic Lit BBS Gets Under Way", The Compulatelist (Jan. 1993), vol. 4, No. 1.
Debendictis, E., "Goofle Search Re: Relative Spped of PERL vs TCL vs C", (Jan. 28, 1996).
Deborah, V., "Homes On-Line—Call It Virtual Realty Technology: Thanks to advances in Orange County and the Valley, more and more consumers are real estate shopping by computer—without all that driving,; [Orange County Edition]", Los Angeles Times (pre-1997 Fulltext). Los Angeles, Calif.:, [recovered from Proquest on Oct. 31, 2008], (Dec. 4, 1994), 1 pg.
Del Rosso, L., "Marketel says it plans to launch air fare "auction" in June", travel Weekly, (Apr. 29, 1991), vol. 50(34), p. 1.
Del Rosso, L., "Ticket-bidding firm closes its doors", Travel Weekly, (Mar. 12, 1992), vol. 51(21). p. 1.
Dewees, "The Auction Encyclopedia", The Auction Research and Education Press, Inc., (1980), 49-56.
Dickinson, Q. T, "Expert Report of Q. Todd Dickinson", filed by MercExchange, (Jun. 10, 2002).
Dickinson, Q. T, "Rebuttal Expert Report of Q. Todd Dickinson", filed by MercExchange, (Jun. 28, 2002).
Dippold, R., "Google Newsgroup Re: Collecting Stamps", (Jan. 3, 1994).
Dubois, "", Better Impression: Art Market Continues to Show Recovery Signs, Barron's National Business and Financial Weekly, v. 72, No. 20, (1992), pp. 18.
Dyson, E., "Information, Bid and Asked", Forbes, vol. 146, Issue 4, (Aug. 20, 1990).
Dyson, Esther, "Forum dress rehearsal: behind the scenes.(includes a related article on the format followed by the Forum, and a related article on the purpose of office automation) (director's script for the 1991 platforms for Computing Forum)", RELease 1.0, 91(2), (Feb. 25, 1991), 25 pgs.
Eichmann, D., "The RBSE Spider Balancing Effective Search Against Web Load", Repository Based Software Engineering Program.
Eisenberg, Amee, "Shopping for software: it may never be the same. ", Computer Shopper, 12(8), (Aug. 1992), 4 pgs.
Elmer-Dewitt, P., "Battle for the Soul of the Internet", Time Magazine Cover Story Technology Section, (Jul. 26, 1994), 10 pgs.
Epper, K., "Money Creators: Point of Sale Pioneer Setting POint of Sail on the Internet", American Banker,, (Feb. 10, 1995), vol. 160, No. 28.
Etzioni, O., et al., "A Softbot-Based Interface to the Internet", Department of Computer Science and Engineering—University of Washington, (Jul. 19, 2000).
Etzioni, O., et al., "Intelligent Agents on the Internet: Fact, Fiction and Forecast", University of Washington, Seattle, WA, (May 30, 1995).
Excel, K., "Google Newsgroup Re: Shopping on the Net? Check this Out! Not an Ad by Me!!", (Apr. 12, 1994).
Feldman, R., et al., "Auctions: theory and applications", International Monetary Fund, (Sep. 1993), papers; v.40n3, pp. 485-511.
Fielding, R., "Maintaining Distributed Hypertext Infostructures: Welcome to MOMSpider's Web", University of California, Irvine, CA, (Apr. 17, 1994).

Finin, T., et al., "KQML as an Agent Communication Language", University of Maryland & Valley Forge Laboratory, (Nov. 1994), p. 8.
Finlay, D., "A Safer System: Answers are Being Develped to the Main Booking Barrier on the Internet—The Security of Information", Travel Agent, (Apr. 10, 1995).
Fong, T., et al., "Success and Failure Factors for Implementing Argicultural Electronic Markets", Department of Information Systems Monash University, (Jun. 11, 1997).
Ford, K., "Newsgroup Posting Re: Kudos to KC COmputers", MicroMagic, Huntsville, AL, (Sep. 13, 1994).
Forsythe, R., "", [Letter to Professor Neumann Regarding the IPSM], University of Iowa, (Jun. 5, 2002).
Forsythe, Robert, "The Iowa Presidential Stock Market: A Field Experiment", Research in Experimental Economics, vol. 4, ISBN: 0-89232-652-2, (1991), 1-43.
Franklin, Matthew, "The Design and Implementation of a Secure Auction Service", 1995 IEEE Symposium on Security and Privacy, Oakland, California May 8-10, 1995, (1995), 2-14.
French, J., et al., "Final Report for NSF Grant: NSF-CDA-9308259", (Apr. 30, 1994).
Frieder, O., "Rebuttal Expert Report of Ophir Frieder Regarding Defendants' Allegations of invalidity of U.S. Patent No. 6,085,176", filed by MercExchange, (Jun. 28, 2002).
Gaffin, A. M, "Everybody's Internet Update", (Feb. 1995), No. 9.
Gaffin, A., "Re: Need Information on the Internet Shopping Network", Google Newsgroup: news.newusers.questions, (May 18, 1994).
Garcia, B., "Fast-moving pace is not for the shy or the undecided", Herald Real Estate Miami Herald Final Edition, (May 5, 1991), p. 4G.
Gavin, B., "Web World: Corporate Solutions of Today", Google Newsgroup: news.announce.conferences, (Oct. 25, 1994).
Gifford, D., "Cryptograph Sealing for Information Secrecy and Authentication", Stanford University, (1982).
Gifford, R., "GEAC's Plan for Supporting Silver Platter ERL", Google Newsgroup: bit.listserv.advance-1, (Mar. 23, 1995).
Gligor, V., et al., "Object Migration and Authentication", IFEE Transaction on Software, (Nov. 1979), p. 607-611.
Golden, F., "AAL's Riga doubts Marketel's appeal to retailers; Chris Riga of American Airlines", Travel Weekly, (Nov. 13, 1989), vol. 14(91), p. 4.
Goodman, S., "MCI Unveils Internet MCI: New MCI-Branded Software", Google Newsgroup: comp.dcom.telecom, (Mar. 27, 1995).
Gordon, M., "Auctions become high tech", Dealer Business, (Mar. 1995), 29(7), p. 21.
Gordon, M., "No Place Like the Auction: Auctions Continue to Grow and Become More Sophisticated in Meeting Dealer Needs", Newsbyte News Network, (Nov. 1, 1994).
Gould, Carole, "Funds Watch: Expanding On-Line Services", The New York Times, (Apr. 23, 1995).
Goulde, M., "Sun Microsystems bringing interactive technology to the WWW", Open Information Systems, 10:3, (Mar. 1995), p. 29.
Graham, I, "The Emergence of Linked Fish Markets in Europe", Focus Theme, 1-3.
Graham, I., "Electronic Livestock Auctions in the UK", (Department of Business Studies, University of Edinburgh), Electronic Markets, (Nov. 6, 2001).
Granacki, J., et al., "A Component Library Management System and Browser, Research Report ISI/RR-93-386", University of Southern California Information Sciences Institute, (Apr. 1993), p. 1-19.
Grant, G., "Mosaic Communications Unveils Network Navigator and Server Software for the Internet", (Sep. 1, 1994), 3 pgs.
Griffin, "Corporate Art Buying Meets Technology", Colorado Business Magazine, (Mar. 1990).
Griffiths, J., "Dealers Move into Electronic Motor Trading", Financial Times, (Nov. 13, 1994), p. 13.
Hammonds, Keith H., "Alex Randall: Planting 'seeds' in the third world", Business Week, 3187, (Nov. 12, 1990), 131.
Harkavy, Michael, et al., "Electronic Auctions with Private Bids", article, 3rd USENIX Workshop on Electronic Commerce, (Aug. 31, 1998), 61-73.
Harty, K., "Case Study: The VISA Transaction Processing System", (May 30, 1988).

Hauser, R, "Anonymous Delivery of Goods in Electronic Commerce", IBM Technical Disclosure Bulletin, 39(3), (Mar. 1996), 363-366.

Heng-Wah, Choy, "", Declaration of Choy Heng-Wah Regarding BidBroker Software—an Electronic Auction System filed in *MercExchange, LLC v. eBayInc., et al.*, Case No. 2:01-CV-736 (E.D. Va), (Mar. 8, 2002), 13 pgs.

Heng-Wah, Choy, "Google Newsgroup Re: Electronic Stamp Auction", (Jun. 17, 1994), 1 page.

Hess, C., et al., "Computerized Loan Organization Systems: An Industry Case Study of the Electronic Markets Hypothesis", MIS Quarterly, (Sep. 1994), vol. 18, No. 3, p. 251-275.

Hildesley, C., "Sotheby's Guide to Buying and Selling at Auction., N.Y.", W. W. Norton & Company, (1984), 32-33.

Hoffman, D., et al., "Marketing in Hypermedia Computer-Mediated Environments: Conceptual Foundations", Project 2000: Research Program on Marketing in Computer-Mediated Environments, (Nov. 6, 2001).

Holmquist, Lars Erik, et al., "Token-Based Access to Digital Information", Proceedings of the 1st International Symposium on Handheld and Ubiquitous Computing, (1999), 125-142.

Horst, H., "", Google Newsgroup: de.sci.medizin, [Medline via internet], (Mar. 19, 1994).

Hubbard, J., "Subject: SF Company Introduces Interactive WWW Auctions", Cite 34, Hubbard Declaration, Exhibit F, (Oct. 16, 1995), 2 pgs.

Hughes, K., "Entering the World-Wide Web: A Guide to Cyberspace", Enterprise Integration Technologies, (May 1994).

Jackson, E., "Stamp Collecting on Usenet in1994: Part I", Google Newsgroup, (Dec. 27, 1993).

Jackson, E., "Stamp Collecting on Usenet in1994: Part II", Google Newsgroup, (Dec. 28, 1993).

Jackson, E., "Stamp Collecting on Usenet in1994: Part III", Google Newsgroup, (Dec. 28, 1993).

Jackson, H. K, "Hitchhiker's Guide: Commerce on the Net: What's the Hold Up?", Open Systems Today, (Oct. 31, 1994), Issue 162.

Jacoby, P., "", Newsgroup Posting Re: Nice Postcard for Best Answer, AmeriDate Consulting Inc., (Oct. 27, 1994).

Jaremko, G., "New Generaion of Farmer Plugged into Computer Trading Centre", Calgary Herald, (Jul. 16, 1993), p. A1.

Jelassi, T., "Competing Through EDI at Brun Passot: Achievements in France and Ambitions for the Single European Market", MIS Quarterly, (Dec. 1994), p. 337-352.

Johnson, et al., "Automated double oral auctions using IBM PC network", Association for Computing Machinery, CSC '86 Cincinnati Proceedings, (Feb. 1986), p. 507.

Johnson, Alonzo, "Multiple Unit Double Auction User's Manual", Social Science Working Paper 676, Division of the Humanities and Social Sciences California Institute of Technology, Jun. 1988, Revised Sep. 1989, 1-9.

Johnston, T., "Where to Now for Calm", Australian Farm Journal, (Apr. 1994).

Jones, R., "Digital's World-Wide Web Server: A Case Study", First International Conference on the World-Wide Web, Geneva, Switzerland, (May 1994).

Kambil, A., et al., "Information Technology. Competition and Market Transformation: Re-enginerring the Dutch Flower Actions", (Jan. 1995).

Kan, J., "Financial-Investment Software", MACworld: Streetsmart 1.0, MAC Publishing LLC, (Feb. 1995).

Kaplan, J., "", Intermart, [Message Confirmation], (Jun. 4, 1994).

Kaplan, J., "", Re:Intermart, (Feb. 1, 1994).

Kaplan, J., "", Status Review and Plans, (Jan. 5, 1995).

Kaplan, J., "", Summary of Our Meeting—Intermart Mosiac HTML—Interface Design, (Dec. 7, 1994).

Kaplan, S. J, "Intermart: the Virtual Shopper's Paradise", Intermart, (Dec. 7, 1994), 17 pgs.

Kapplin, S., et al., "An Analysis of Recent Rates of Return and of the Secondary Market for Public Real Estate Limites Partnerships", The Journal of Real Estate Research, (Fall 1986), p. 33-44.

Kareckas, L., "1 1/2 Smart Talk on Bargain Finder", Google Newsgroup: ba.smartvalley, ba.announce, (Oct. 24, 1995).

Karpinski, R., "Front Ends: New Windows 95 Browsers on Tap", Interactive Age, (Jul. 3, 1995), Issue 218.

Kehoe, "Technology: Caught in the Web—A new cyberspace neighbourhood has joined the Internet and traffice in brisk", Financial Times, (Nov. 25, 1994).

Keller, A., et al., "A Smart Catalog and Brokering Architecture for Electronic Commerce", (Dec. 1994), 14 pgs.

Kindberg, Tim, et al., "Towards a Real-World Wide Web", Proceeding: EW 9 Proceedings of the 9th Workshop on ACM SIGOPS European Workshop: Beyond the PC: New Challenges for the Operating System, (2000), 1-6.

King, Julia, "Digitized art gallery paints retail's future", (Nov. 28, 1994).

Kinkade, M., "Re: DEC XL560 Pentium System for Sale", Google Newsgroup:la.forsale, nj.forsale,nj.forsale, ny.forsale, pa.forsale, Austin.forsale,ph, (Jun. 2, 1994).

Klein, S., "Introduction to Electronic Auctions", Focus Theme.

Klemets, A., "The Design and implementation of a Media on Demand for System for WWW", The Royal Insitute of Technology, Sweden.

Knoblock, C., et al., "An Architecture for Information Retrieval Agents", University of Southern California, p. 49-56.

Knoblock, C., et al., "Information Gathering From Heterogeneous Distributed Environments", Papers from the 1995 AAAI Symposium, AAAI Press, (Mar. 27, 1995).

Knowles, A., "Payment Systems Link to Internet (CyberCash Inc.'s Internet Payment Services and Checkfree Corp's Checkfree Commercial Payment Services to Be Linked With Partners", PC Week vol. 12, No. 22, (Jun. 5, 2001).

Knowles, Anne, "Rival transaction models emerging; on-line authentication schemes check credit cards or users to ensure security. (Open Market Inc's Electronic Commerce Model and CyberCash Inc model)", PC Week, 12(12), (Mar. 27, 1995), 49(2).

Koepper, K., "Room inventory auctioning: the next CRS generation", Lodging, (Jan. 1990), pp. 26-30.

Koster, M., "ALIWEB—Archie-Like Indexing in the Web", (Mar. 16, 1994), Version 1.0, p. 1-10.

Kotay, K., et al., "Transportable Agents", Dartmouth College, (Nov. 10, 1994), p. 1-15.

Krajewski, et al., "Applicability of Smart Cards to Network User Authenticaion", Computing Systems, vol. 7, No. 1,, The MITRE Corp., (Winter 1994), p. 75-89.

Krajewski, M., "Concept for a Smart Card Kerberos", The MITRE Corp, Bedford, MA.

Krajewski, M., "Smart Card Augmentation of Kerberos", The MITRE Corp, Bedford, MA.

Krishanmurthy, B., et al., "Web Protocols and Practice", HTTP/1.1. Networking Protocols, Caching, & Traffice Measurement, 2001, p. 6, Addison-Wesley Publishing, (2001).

Kupfer, Andrew, "Software "Agents" will make life easy", Fortune, 129(2), (Jan. 24, 1994), 72-73.

Kutler, J., et al., "Information Superhighway: Looking More and More Like a Business Router", American Banker vol. 159, No. 223 (Nov. 18, 1994), p. 14.

Kuttner, R., "Computers may turn the world into one big commodities pit", Business Week, (Sep. 11, 1989), No. 3123, p. 17.

Lagoze, C., et al., "Dienst implementation Reference Manual", (May 5, 1995), p. 1-69.

Lapp, J., "Web User Head Count", Google Newsgroup: comp. inforsystems.www.providers, (Jun. 15, 1994).

Lashkari, Y., et al., "Collaborative Interface Agents", MIT Media Laboratory.

Ledyard, J., et al., "Using Computerized Exchange Systems to Solve an Allocation Problem in Project Management", California Institute of Technology, (Nov. 1993).

Lee, H., "Proceedings of the 29th Annual Hawaii International Conference on Systems Sciences—1996", Electronic Brokerage and Electronic Auction: the Impact of it on Market Structures, (1996), pp. 397-406.

Lee, Ho Geun, "AUCNET: Electronic Intermediary for Used-Car Transactions", Focus Theme, Electronic Markets, vol. 7, No. 4, (1997), 24-28.

Lee, R., et al., "Shopping in the Electronic Marketplace", Journal of Management Information system, (Spring 1986), vol. 1, No. 4.

Lehman, "", Lego Sale: Auczilla is here, rec.toys.lego, (Feb. 26, 1995), 8 pgs.

Lewis, "", Gallery-Hopping- and Shopping—via PCT, Bits & Bites, Business Week, No. 3401, (Dec. 5, 1994), p. 1.

Lewis, P., "Attention Shoppers: Internet is Open", The New York Times, (Aug. 12, 1994), Section: D, p. 1, col. 3.

Lewis, P. H., "Auction of Collectibles on the Internet", New York Times, (May 25, 1995), 1 pg.

Lichty, et al., "America Online Membership Kit & Tour Guide", Ventana Press, (1992), 287-290.

Lichty, T., "The Official America Online for Macintosh Tour Guide", 2nd Edition, Ventana Press, (1994).

Lichty, T., "The official America Online for Windows Tour Guide", 1st Edition, Ventana Press, (1993).

Lichty, T., "The Official America Online for Windows Tour Guide", 2nd Edition, Ventana Press, (1994).

Lietzke, R., "Outsider Buys Into Checkfree Tribune Co. of Chicago Purchases Minority Stake in Bill-Payment Firm", The Columbus Dispatch, (Dec. 6, 1994).

Lifton, R., "RND's ethernet bouter family—an inside look, computer communicaions, product description", (Oct. 1989), vol. 12(5), pp. 288-294.

Lindsey, D., et al., "TELCOT: An Application of Information Technology for Competitive Advantage in the Cotton Industry", MIS Quarterly, (Dec. 1990), p. 347-357.

Liss, K., "Tradewinds vol. 1.3 (Monthly Round-Up of Internet Coverage in Trade and Industry Magazine)", Googel Newsgroup: bit.listserv.buslib-I, (Dec. 19, 1994).

Lucianovic, "", Stamp Auction Via Internet? rec.collecting.stamps, (Apr. 21, 1995).

Lucianovic, W. M, "Re:Stamp Auctions Via Internet?", Google Newsgroup: rec.collecting.stamps, (Apr. 19, 1995).

Lucking-Reiley, D., "Using Field Experiments to Test Equivalence Between Auction Formats: Magic on the Internet", The America Economic Review, (Dec. 1999), p. 1063-1080.

Lynch, M., et al., "Product Quality, Information efficience, and Regulations in Experimental Markets", Research in experimental Exonomics, (1991), p. 269-318.

Lynch, S., "Online // Get Ready to Shop, Bank Safely on Net", The Orange County Register, (Jun. 5, 1995).

Maa, M., et al., "Recent Improvements in the NASA Technical Report Servers", [Online]. Retrieved from the Internet: <URL: http://techreports.larc.nasa.gov/cgi-bin/NTRS>, (Oct. 1995), p. 1-10.

Machrone, B., "Digital Cash Options Need a Closer Look (Online Banking Transactions) (Up Periscope)", PC Week, (Apr. 10, 1995), vol. 12, No. 14, Ziff-Davis Publishing.

Maes, P., "Intelligent Agents: Agents that Reduce Work and Information Overload", Communications of the ACM, (Jul. 2000), vol. 37, No. 7.

Maes, P., "Modeling Adaptive Autonomour Agents", MIT Media-Laboratory.

Malcolm, K., "Newsgroup Posting Re: Real Estate Related WWW Providers Wanted", (Nov. 3, 1994).

Malcolm, K., "Newsgroup Posting REL: Web Page of Service Providers", Internet Presence, Inc.,, (Aug. 24, 1994).

Malone, P., "Re: How to Access CompuServe? The Answer", Google Newsgroup: comp.graphics.packages.3dstudio, (May 13, 1995).

Malone, T., et al., "Electronic Markets and Electronic Hierarchies", Communications of the ACM, 14(25), (Jun. 1987), 484-497.

Malone, T., et al., "The Logic of Electronic Markets", Harvard Business Review, (May-Jun. 1989), pp. 166-169.

Maly, K., "Post-Markman Supplemental Expert Report of Kurt Maly Re: Noninfringement and Invalidity of U.S Patent No. 6085176", eBay Non-confidential Expert Reports/Declarations, (Dec. 20, 2002), 21 pgs.

Maly, K., et al., "Wide Area Technical report Service", Waters Technical Report [Online]. Retrieved from the Internet: <URL: http://archive.ncsa.edu/SDG/IT94/Proceedings/Databases/maly/maly/html>, (Apr. 30, 1994).

Marien, G. K, "", Google Search Subject Stamps List Update, Google Newsgroup: rec.collecting.stamps, (Nov. 2, 1992).

Martin, et al., "Sold! the professional's guide to real estate auctions", Published by Kathleen A. Welton, (1991), 247-248.

Maskery, Maryann, "Car auction reaches into space", Automotive News, Dialog File 16, Accession No. 03482064, (Nov. 25, 1991), 3 pgs.

Massimb, Marcel, "Electronic Trading, Market Structure and Liquidity", Financial Analysts Journal, 50(1), (Jan./Feb. 1994), 39-50.

Mayega, V., "WWW.Mall of the Future", From the Moment (Dec. 7, 1994), (Jan. 7, 2002), p. 7.

McBryan, O., "GENVL and WWW: Tools for Taming the Web", (Mar. 19, 2000).

McCarthy, Gene, "The Electronic Auctioning of Servicing", Mortgage Banking, (Dec. 1994), 96-98.

McGookin, Stephen, "Home-based brokers stay on-line via the Internet—The number of personal on-line brokerage accounts . . . ", The Financial Times Limited; Financial Times (London, England), (Nov. 1, 1995), p. 13.

McKee, D., "Towards Better Integration of Dynamic Search Technology and the World-Wide Wed".

Medvinsky, G., et al., "Netcash: A Design for Practical Electronic Currency on the Internet", Information Sciences Institute University of Southern California, (1993).

Mendez, M., "Google Search Subject: Free Personal Ads", Google Newsgroup: alt.personals, (Feb. 10, 1995).

Menefee, "San Jose Mercury News on the Internet", Newsbytes, (Jan. 20, 1995).

Merrill, K., "GE Capital to Extend Integrator Buying Spree", Computer Reseller News, (Jul. 1996), pp. 2 and 32.

Messmer, E., "Car Auctions Via Business TV to Debut Plans to launch as Online Used Car Auction Service", Network World, vol. 11, Iss.30, (Jul. 25, 1994), 1 pg.

Messmer, Ellen, "Harvest time for Web commerce products", Electronic Commerce, Network World, Inc., (Oct. 9, 1995), 39.

Metcalfe, Bob, "From the Ether, Open Market brings real money to the Web with a clever purchasing setup", InfoWorld, (Jul. 3, 1995), 43.

Metcalfe, R., "From the Ether Internet Digital Cash, Don't leave Your Home Page Without It", InfoWorld, (Mar. 13, 1995), vol. 17, Issue 11.

Miller, M., "Netbill (@)—Credit Cards on the Net", Google Newsgroup: comp.org.cpsr.talk, (Dec. 22, 1994).

Mockapetris, P., "Domain Names: Concepts and Facilities", Network Working Group, Request for Comments: 1034, [Online]. Retrieved from the Internet: <URL: http://rfc.sunsite.dk/rfc/rfc1034.html>, (Nov. 1987), 1-55.

Mockapetris, P., "RFC1035: Domain Names—Implementation and Specification", (Nov. 1987).

Montanaro, S., "Newsgroup Posting Re: Automatrix Announces its World Wide Web Server", GE Corporation Research and Development, Schenectady, NY, (Sep. 3, 1994).

Moore, Pamela L., "Bank Opens Secure Internet Stores", The Charlotte Observer (North Carolina), (Mar. 16, 1995).

Morgan, J., "No-Cost, No-Hassie Programs for Trading Funds From Home", NewsDay, Inc.,, (Oct. 2, 1994), Section: Money & Careers, p. 6.

Morris, M., "Newsgroup Posting Re: Big-WWW Service Providers List", Finesse Liveware, (Aug. 31, 1994).

Morton, I., "The Future Looks Used Car-Friendly", Evening Standard, London, (Nov. 24, 1994).

Moss, Barry, "Bob's First Internet Stamp Auction", (Apr. 25, 1995).

Mossinghoff, G. J, "Expert Report of Hon. Gerald J. Mossinghoff", filed by eBay, Half.com and ReturnBuy, (Sep. 20, 2002).

Mulqueen, J. T, "Checkfree Asks IPO Investors to underwrite $50M Offering", Communications Week, (Sep. 25, 1995), Issue 576.

Murray, E., "Re: SSL/STLP Winsock Implementation", (Aug. 13, 1996).

Neches, Anna-Lena, et al., "FAST system for connecting government suppliers", Electronic Markets, 3(3), (1993), 3 pgs.

Needham, R., "Adding Capability Access to Conventional File Servers", Xerox Palo Alto Research Center, p. 3-4.

Nelson, M., et al., "Electronic Document Distribution: Design of the Anonymour FTP Langley Technical Report Server", NASA Technical Memorandum 4567, (Mar. 1994).

Nelson, M., et al., "The Widest Practicable Dissemination: The NASA Technical Report Server", (1995).

Nelson, M. L, et al., "The World Wide Web and Technology Transfer at NASA Langley Research Center", Proceeding of the Second International World Wide Wed Conference: Mosaic and the Web, Chicago, IL, (Oct. 19-21, 1994), p. 701-710.

Nelson, M., et al., "World Wide Web Implementation of the Langley Technical Report Server", NASA Technical Memorandum 109162, (Sep. 1994).

Neo, B S, "The implementation of an electronic market for pig trading in Singapore", Journal of Strategic Information Systems; vol. 1(5), (Dec. 1992), 278-288.

Neuman, B Clifford, et al., "Proxy-based Authorization and Accounting for Distributed Systems", Proceedings of the 13th International Conf. on Distributed Computing Systems, (May 1993), 283-291.

Neuss, C., et al., "Lost in Hyperspace? Free Text Searches in the Web", Fraunhofer Insitute for Computer Graphics.

Nimmer, R., "Electronic Contracting: Legal Issues", Journal of Computer and Information Law vol. XVI, (1996), pp. 211-246.

Nishihara, et al., "A new scheme of connectionless transmission over ATM with scalability and cut-through technique", XVI World Telecom Congress Proc., (Sep. 21, 1997), p. 199-206.

Norton, R., "Winning the game of business", Fortune; New York, (Feb. 6, 1995), vol. 131, Iss. 2; p. 36, 1 pgs.

Oakland, A., "Transcript of June 11 NBC Story on Cyber Selling", Newsgroup: news.admin.misc, (Jun. 16, 1994).

Obraczka, K., et al., "Internet Resource Discovery", (Sep. 1993), p. 8-22.

O'Dell, John, "Automobiles", The Los Angeles Times copyright, The Times Mirror Company; Los Angeles Times 1994 All Rights Reserved, (Aug. 23, 1994), 13-14.

Okamoto, T., et al., "Universal Electronic Cash", NTT Laboratories, p. 324-337.

Omidyar, P., "Google Newsgroup Re: AuctionWeb: Interactive Web Auction", (Sep. 12, 1995), 3 pgs.

Omiya, E., "Google Nesgroup Re: Electronic Stamp Auction", (Jun. 19, 1994).

Orr, Joel N., "Join the Information Economy", Computer-Aided Engineering, (Apr. 1992), p. 84.

Orr, Joel N, "The Computer-Aided Engineer: Join the information economy", Computer-Aided Engineering, 11(4), (Apr. 1992), p. 84.

Padgett, "Information Marketplace Stocks "Shelves" for Mid-June Debut, Link-Up", (May/Jun. 1992).

Palmer, J. W, "Rebuttal Expert Report of Jonathan W. Palmer Regarding Allegations of Invalidity", filed by MercExchange, (Jun. 28, 2002).

Pelline, J., "Travelers bidding on airline tickets: SF firm offers chance for cut-rate fares", San Francisco Chronicle, (Aug. 19, 1991), p. A4.

Peniston, B., et al., "Intro to Internal Digital Dollars on the Internet", (Apr. 16, 1995), Section: Business, p. B5.

Penrose, P., "The Next Generation", Banking Technology, 12(2), (Mar. 1, 1995), p. 1.

Pfitzmann, B., et al., "How to Break and Repair a 'Provably Secure' Untraceable Payment System", p. 338-350.

Phillips, "How to Dominate the Online Auction Market", (2005).

Phillips, John, "Email from John Phillips to James Dwyer, Tom Woolston, Lissi Marquis re reexamination Control Nos. 90/006,984, 90/006,957, and 90/006,956, dated Mar. 3, 2006 (Exhibit 16, Phillips Mar. 15, 2007)".

Picard, J., "Re: Bob's First Internet Stamp Auction", Google Newsgroup: rec.collecting.stamps, (Apr. 26, 1995).

Plott, C., "A Computerized Laboratory Market System & Research Support Systems for the Multiple Unit Double Auction a Computerized Laboratory Market System & Research Support Systems for the Multiple Unit Double Auction", Social Science Working Paper 783, Division of the Humanities and Social Sciences California insitute of Technology, (Nov. 19, 2000).

Plott, C. R, "Expert Repot of Charles R. Plott", filed by eBay, (Jun. 10, 2002).

Plott, C. L, "Post-Markman Supplementation/Rebuttal of Charles L. Plott", filed by eBay, (Dec. 17, 2002).

Port, O., "An electronic supermarket for all things digital", Business Week, issue 3298, (Dec. 21, 1992), 1 pg.

Porter, D., "Trading in a Pure Exchange Economy Without Auctioneer: An Experimental Approach", California Institute of Technology, (Mar. 1993).

Post, D L, et al., "Application of auctions as a pricing mechanism for the interchange of electric power", IEEE Transactions on Power Systems, 10(3), (Aug. 1995), 1580-1584.

Putz, S., "Interactive Information Services Using World Wide Web Hypertext", Prepared for First International Conference on WorldWide Web, Mau 25-27, 1994, Geneva, Switzerland, (Apr. 20, 1994).

Race, T., "The debate over electronic bidding reaches Washington", The New York Times, (Oct. 6, 1991), p. 12, col. 1.

Raeder, A., "Internet World 95: An Eyewitness Report", Information today, (May 1, 1995).

Ramos, Steven, "Kick the tires on the screen", Forbes, 147(2), (Jan. 21, 1994), 100-101.

Rangaswamy, A., "New Production Development (NPD) Turbo-Charged by the Internet", (2001).

Rayport, J., "Managing in the Market Place", 2002 Harvard Business Review, (Nov./Dec. 1994), p. 141.

Reck, M., "Formally Specifying an Automated Trade Execution System", The Journal of Systems and Software, 1993, Elsevier Science Publishing, USA, (1993), 245-252.

Reck, M., et al., "Types of Electronic Auctions", (1992), p. 236-243.

Reck, Martin, "Trading-Process Characteristics of Electronic Auctions", Focus Theme, vol. 7, No. 4, (1997), 17-23.

Regan, "", Ubid Adds Auction Traffic with iWon Deal, E-commerce Times, (Mar. 6, 2001).

Rescorla, E., et al., "The Secure Hypertext Transfer Protocol", Enterprise Integration Technologies, (Jun. 1994).

Resnick, P., et al., "Twenty-Second Annual Telecommunications Policy Research Conference: Papers Section 2", Solomons, MD, (Oct. 1-3, 1994), p. 1-23.

Ritter, J., "Scope of the uniform commercial code: computer contracting cases and electronic commercial practices", 45 Bus Law. 2553, (Aug. 1990).

Roberts, Ralph, "Auction Action!", Tab Books, Inc., (1986), and 121-125.

Robertson, Scott, "", MercExchange response to eBay's Appeal Brief (corrected brief)., (Mar. 31, 2004).

Rockoff, T E, et al., "Design of an Internet-based system for remote Dutch auctions", Internet Research: Electronic Networking Applications and Policy, vol. 5(4), (Jan. 1, 1995), 10-16.

Rodriguez, K., "Netscape Upgrades Web Servers; Offers New Apps to Enable Commerce", InforWorld, (Mar. 27, 1995), Section: Top of the News, p. 12.

Rossler, M., et al., "Intelligent Agents: Software Servants for an Electronic Information World and More", Online magazine, (Jul. 2000).

Rubin, B., "Google Newsgroup Re: Newsday Online/Software", (Nov. 30, 1994).

Sackman, G>, "Newsgroup Posting Re: Think Big! Products WWW Site fom WorldMartÃ??", CERFnet, (Nov. 10, 1994).

Safdar, S. J, "(FAQ) Internet Parental Control", Google Newsgroup: comp org eff talk comp org cpsr talk alt wird alt politics datahighway, (Aug. 8, 1995).

Sandberg, J., "Business Brief: Electronic Check-Payment Plan for the Internet to be developed", The Wall Street Journal, (Aug. 23, 1995).

Sandberg, J., "Cybercash Receives Clearance to Expert Payment Software", The Wall Street Journal, (May 8, 1995).

Sandberg, J., "Electronic Check Payment Plan in Development for the Internet", The Asian Wall Steet Journal, (Aug. 24, 1995).

Sandberg, J., "Firms to Allow Internet Buying by Credit Card", The Wall Street Journal Europe, (Nov. 14, 1994).

Sandberg, J., "MasterCard Aims to Link Internet with Credit Cards", The Wall Street Journal, (Jan. 10, 1995).

Sandberg, J., "MasterCard Fires Back in Dispute Over the Internet", The Wall Street Journal, (Oct. 5, 1995).

Sandberg, J., "MasterCard, Backed by IBM and Other, Enters Fight for Internet Payment Rules", The Wall Street Journal, (Oct. 4, 1995).

Sandberg, J., "New Internet Security Lapse Raises Concern for Businesses Using the Web", The Wall Street Journal, (Feb. 21, 1995).

Sandberg, J., "US Browsers Will be Able to Pay Online, But Security is a Concern", (Sep. 14, 1994).

Sandberg, Jared, "Mosaic, First Data in move to protect credit card transactions on Internet", Wall Street Journal, (Nov. 14, 1994), B8.

Sandberg, Jared, "System planned for shopping on the Internet", Wall Street Journal, (Sep. 13, 1994), B1.

Sandholm, T., et al., "Issues in Automated Negotiation and Electronic Commerce: Extending the Contract Net Framework", University of Massachusetts at Amherst, 8 pgs.

Santalesa, R., "Internet Security Standards Take Shape at Last; Web Commerce to Increase; Issues of Responsibility Remain", Computer Shopper from Edwire vol. 15, No. 7, (Jul. 1, 1995).

Schell, Ernest H., "Management Software Update (Part 1)", Catalog Age vol. 8, No. 5, (May 1991), p. 91.

Schell, Ernest H., "Management Software Update (Part 2)", Catalog Age vol. 9, No. 6, (Jun. 1992), p. 87.

Schmid, B F, "The Development of Electronic Commerce", EM—Electronic Markets, No. 9-10, (Oct. 1993), 2 pgs.

Schmitz, Tom, "California computer auctions—No Boon for Bargain Hunters", Knight-Ridder/Tribune Business News, Dialog File 609, Accession No. 2096205, (Sep. 13, 1993), 4 pgs.

Schneider, "Computer helps in search for art—local businessman builds database of works for sale", Rocky Mountain News, (May 6, 1990).

Schrage, M., "An experiment in economic theory: labs testing real markets", The Los Angeles Times, (Nov. 26, 1989), Section B1.

Schwartz, M., et al., "A comparison of Internet resource discovery approaches", Computing Systems, 5(4), (1992), 1-17.

Schwartz, Michael F., "Internet Resource Discovery at the University of Colorado", (Oct. 1992), 16 pgs.

Shamos, M. I, "Expert Report of Michael Ian Shamos", filed by eBay, (Jun. 10, 2002).

Shamos, M. J, "Expert Report of Michael Ian Shamos Regarding Materiality of Prior Art Regerence Not Disclosed by Patentee", filed by eBay, (Sep. 23, 2002), 10 pgs.

Sharp, A., "From army knives to gold coins, collectors attend 'on-line' auctions", Memphis Business Journal v. 8(10), (Jul. 28, 1986), p. 10.

Siegmann, Ken, "Nowhere to go but up", PC Week; vol. 12(42), Ziff-Davis Publishing Company, (Oct. 23, 1995), 1-3.

Siio, Itiro, et al., "Real-World Interaction using Absolute Mouse", Joho Shori Gakkai Kenkyu Hokoku, 99(35), [Online]. Retrieved from the Internet: <URL: http://siio.jp/projects/absolutemouse/SigHI83.pdf>, (1999), 7-12.

Simmons, B., "Trivia for Money re: Online Gaming for Cash Prizes", Google Newsgroup: ree games trivia, (Dec. 17, 1995).

Sinton, P., "Allowance Trading: Electronic Auction Exceeds Expectation", Environment and Energy Publishing, LLC, (Apr. 27, 1995).

Siong, N., "Hog Auction market: managing Implementation Resistance", Singapore Business Development series, (1996), pp. 252-275.

Siong, N. B, et al., "Online Trading at the Singapore Hog Auction market (Ham)", Department of Computer Science, Australia National University, WWW.ANU.EDU.AU, Xamax Consultancy Pry. Ltd., Canberra, (Jul. 25, 1992).

Sirbu, M., "Internet Billing Server Prototype Scope Document in Technical Report 1993", Carnegie Mellon University, (Oct. 14, 1993).

Sirbu, Marvin A., "Internet Billing Service Design and Prototype Implementation", IMA Intellectual Propert Project Proceedings, 1(1), http://www.cni.org/docs/ima.ip-workshop/Sirbu.html, (1994), 1-19.

Sirbu, Marvin, et al., "Netbill: An Internet Commerce System Optimized for Network-Delivered Services", IEEE Personal Communications, 2, (Aug. 1995), 34-39.

Sirbu, V., "Electronic Wallet".

Sjolin, Martin, "A WWW Front End to an OODBMS", Proceedings of the Second International World Wide Web Conference, Chicago, USA, 1994, (Jun. 1994).

Slater, D., "Internet Commerce Inches Forward", Computerworld; Framingham Issue:10, (Mar. 6, 1995), p. 101.

Smith, B., "Internet Marketing Re: Credit Card Transactions on the Net", (Nov. 22, 1994).

Smith, N., "What Can Archives Offer the World Wide Web", University of Kent in Canterbury, (Apr. 22, 1994).

Smith, P., et al., "Electronic Marketing of Fisheries Products", Australia, ABARE, (Mar. 1995).

Smith, V., "Auctions, Bidding and Contracting: Uses and Theory—An Experimental Comparison of Alternative Rules for Competitive Market Exchange", New York University Press, (1983), pp. 307-334.

Smith, V., et al., "Competitive Market Insitutions: Double Auctions vs Sealed Bid-Offer Auctions", The American Economic Review vol. 72, No. 1, (Mar. 1982).

Smith, V., et al., "On Nonbinding Price Controls in a Competitive Market", The American Economi Review vol. 71, No. 3, (Jun. 1981).

Solomon, S., "Staking a Claim on the Internet", (Nov. 1996).

Sommerfeld, W., "Newsgrooup Posting Re: Registration on the Internet", Hewlett Packard-Chelmsford Site, (Apr. 19, 1995).

Speidel, R., et al., "Impact of electronic contracting on contract formation under revised UCC Article 2, Sales", C878 ALI-ABA 335, (Dec. 9, 1993).

Stefano, C., et al., "Distributed Databases: An Overview", McGraw-Hill,Inc., (1984), p. 1-17 & 47-54.

Steinar, K., "Newsgroup Posting Re: Making freeWAIS Easy to Setup\Configure", (Aug. 31, 1994).

Stewart, Thomas A., et al., "Boom Time on the New Frontier", Fortune, (Sep. 27, 1993).

Tao-Yang Wong, W., "FYI: CommerceNet Press Release", Telecom Digest vol. 14, Issue 185, WTWONG@EIT.COM, (Apr. 27, 1994).

Tara, J., et al., "AOL Screen Name, Trial Account Abuse and Usenet (was Re: Warning: for Sale Fraud)", (Jul. 7, 1994).

Tatters, W., "Navigating the Internet with CompuServe", Sams.net Publishing, 1st Edition, 1995.

Taylor, D., "Newsgroup Posting Re: The Internet Mall: Shopping the Information Highway", Case Western Reserve University Cleveland, OH, (Oct. 16, 1994).

Tenenbaum, J., et al., "Development of Network Infrastructure and Services for Rapid Acquisition", (Jan. 2, 1992), 19 pgs.

Tenenbaum, J., et al., "Digest of Papers COMPCON '95—CommerceNet: Spontaneous Electronic Commerce on the Internet", Technologies for the Information Super Highway, San Francisco, CA, (May 9, 1995).

Tetzeli, R., "Electronic Storefronts on the Internet", Fortune, (Nov. 28, 1994), p. 191.

The Computer Museum Auction, "First-ever Internet Auction Produces Results for the Computer Museum", Press release, (duplicate releases), (Apr. 28, 1994), 4 pages.

Thomas, C. M, "57 Northeast Mitsubishi Dealers Try Out Computerized Auctions", Automotive News, (Sep. 19, 1994).

Titch, S., et al., "If you Build it, Will they Come? Information Service Providers Say the market is There. All they Need Is a Way to Deliver the Information", Telephony, Intertee Publishing Corporation vol. 222, No. 24, (Jun. 15, 1992).

Tjostheim, Ingvar, "A case study of an on-line auction for the World Wide Web", Norwegian Computing Center (NR), 1-10.

Toner, A., "Hogs Sold in High-Tech Market Bidders Linked Throught Satellite", Omaha World-Herald, (Sep. 11, 1994).

Traub, "", M:tG Auction (winding down)—Updated No. 77, rec.games.deckmaster, (Jan. 24, 1995).

Traub, "", MTG: All Editions Rare and Uncommon Auction, rec.games.deckmaster, (May 9, 1994), 9 pgs.

Tucker, J., "Google Search Re: Enter 13 Zip Entertainment Listing Service for Wildest BBS", Realty.Com, (Oct. 14, 1995).

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, 6 pgs.

Verity, J. W, "The Internet, How it Will Change the Way You Do Business", Business Week, McGraw Hill Publication, (Nov. 14, 1994), pp. 80-88.

Verity, J., "Truck Lanes for the Information Highway", The McGraw Hill Publishers, (Apr. 18, 1994), p. 112.

Vernon, L. S, et al., "Experimental market economics", edited version in Dec. 1992 issues of Scientific American, (Sep. 1991), 14 pgs.

Vielmetti, Edward, "Subject: Re: Publishing Articles Through the Net", Newsgroups: alt.internet.services,alt.wais, (Jan. 8, 1993), 1 pg.
Vielmetti, Edward, "Subject: Re: Updated AMiX information", Newsgroups: alt.cyberspace, (Nov. 22, 1992), 2 pgs.
Voelker, et al., "Mobisaic: an information system for a mobile wireless computing environment", IEEE, (1995), pp. 185-190.
Von Rosen, E., "The Evolving Electronic Commerce", Intranets: AMG, (Apr. 26, 1995).
Voydock, V., "Security Mechanisms in High Level Network Protocols", (1983).
Wagner, M., "Online Cash and Credit Move Closer to reality", Open Systems Today Issue 169, CMF Publications, (Feb. 20, 1995).
Wan, J., "", Google Newsgroup Re: Electronic Stamp Auction, (Jun. 12, 1994).
Warbelow, A, et al., "Aucnet: TV Auction Network System", Harvard Business School Case/Study, HBVR#9-190-001, USA, (Jul. 1989), 1-15.
Warwick, M., "Inside Broadcast (business television)", Communications International, vol. 21, No. 10, ISSN:0305-2109, (Oct. 1, 1994).
Wayne, L., "The Next Giant in Mutual Finds?", New York Times (Late Edition), (Mar. 20, 1994).
Weisman, "Amix Cuts Staff in Wake of Leaving parent Company", The Business Journal—San Jose, (Sep. 7, 1992).
Wellman, M. P., "A Market-Oriented Programming Environment and Its Application to Distributed Multicommodity Flow Problems", Journal of Artificial Intelligence Research, (May 1993).
Wellman, M. P, "Expert Report of Michael P. Wellman, Ph.D. Concerning the Invalidity of U.S. Patent No. 5,845,265", filder by eBay, Returnbuy and Half.com, (Jun. 7, 2002).
Wellman, M. P, "Post-Markman Supplemental Expert Reports of Michael P. Wellman, Ph.D., on the Invalidity and Noninfringement of US Patent No. 5,845,265", (Portions of the document have been redacted), filed by eBay, (Dec. 23, 2002).
Whitaker, Russell Earl, "Subject: American Information Exchange", Newsgroups: misc.entrepreneurs,bit.listserv.xtropy-l,la.general, (Jan. 5, 1993), 6 pgs.
Whitmore, S., "Business on the net: the new gold rush", PC Week, vol. 12, No. 43, (Oct. 30, 1995), 106.
Whitmore, S., "Innovative Schemes for Business Online Marketplace", PC Week—Special Report, No. 106, (Oct. 30, 1995).
Williams, A. W., "Computerized Double-Auction Markets: Some Initial Experimental Results", The Journal of Business, vol. 53, No. 3, Part I, The University of Chicago Press, (Jul. 1980).
Wilson, Claire, "Gallery Hopping On-Line", International Herald Tribune, (Oct. 29, 1994), 3 pgs.
Windley, P. J., "Newsgroup Re: Webb Mall", Laboratory for Applied Logic Brigham Young University, (Sep. 15, 2000).
Windley, P. J., "NewsgroupRE: * Announce: Deals of the WWW Server *", Laboratory for Applied Logic Brigham Young University, (Oct. 20, 1994).
Wingfield, "Web-to-ODBC—database links made easy", InfoWorld, (Jul. 17, 1995), p. 41.
Wirbel, L., et al., "Two Move to Make Internet Safe for Commerce-Security Schemes Bow", Electronic Engineering Times, Issue 844, (Apr. 17, 1995).
Wong, W., et al., "Developing an Internet Presence with On-Line Electronic Catalogs", (Oct. 9, 1994), 1-4.
Woodruff, M., "Electronic Auction", Resources Technology, (May 1985).
Wright, Randy, et al., "Is it time to travel the auction route?", Real Estate Today, 5 pgs.
Yamada, Ken, "Information Highway Revs Up", Computer Resellers News, Manhasset, (Jan. 30, 1995), 3 pgs.
Yin, "An Automated Auction Engine for the WWW", [Online]. Retrieved from the Internet: <URL: comp.infosystems.www.announce>, (Jun. 6, 1995).

Yin, "Listing for 2 Dark Boxes for auction", rec.games.trading-cards.marketplace, (May 29, 1995).
Zecher, J., "Commerce With Caution on the Internet", Wall Street and Technology, vol. 12, No. 1, 32-36.
Ziegler, B., et al., "How the Internet Put the Squeeze on Intel's Chip", The Wall Street Journal Europe, (Dec. 29, 1994).
Ziegler, B., et al., "Intel Case Shows the Internet's Potential as a Tool of Consumer Dissent", The Asian Wall Street Journal Technology Section, Dow Jones & Co., Inc., (Dec. 28, 1994).
Ziegler, B., et al., "Online: Online Snits Fomenting Online Storms", The Wall Street Journal, Dow Jones & Co., Inc., (Dec. 23, 1994).
Zitner, "America Online Pulls Plug on Software Scam", Boston Globe, (Feb. 3, 1995).
Znidarsic, J., "History of the Auction: The Auction Today", Auction Watch.
Zwass, V., "Electronic Commerce: Structures and Issues", International Journal of Electronic Commerce, Fall 1996, vol. 1, No. 1, (Fall 1996), 3-23.
"U.S. Appl. No. 09/166,779, Final Office Action mailed Jun. 19, 2001", 18 pgs.
"U.S. Appl. No. 12/890,210, Advisory Action mailed Jun. 21, 2012", 3 pgs.
"U.S. Appl. No. 12/890,210, Response filed Jun. 11, 2012 to Final Office Action mailed Feb. 27, 2012", 9 pgs.
"U.S. Appl. No. 12/890,469, Response filed Jun. 25, 2012 to Non Final Office Action mailed Oct. 20, 2011", 9 pgs.
"U.S. Appl. No. 12/978,133, Response filed Jun. 25, 2012 to Non Final Office Action mailed Jan. 23, 2012", 15 pgs.
"U.S. Appl. No. 13/198,609, Advisory Action mailed Jul. 11, 2012", 3 pgs.
"U.S. Appl. No. 13/198,609, Response filed Jun. 25, 2012 to Final Office Action mailed Mar. 23, 2012", 7 pgs.
"U.S. Appl. No. 90/008,650, Response filed Feb. 17, 2009 to Examiner Interview Summary mailed Feb. 12, 2009", 13 pgs.
"U.S. Appl. No. 12/890,193, Non Final Office Action mailed Dec. 12, 2011", 15 pgs.
"U.S. Appl. No. 12/890,193, Response filed Jun. 11, 2012 to Non Final Office Action mailed Dec. 12, 2011", 8 pgs.
"U.S. Appl. No. 12/890,210, Final Office Action mailed Feb. 27, 2012", 15 pgs.
"U.S. Appl. No. 12/890,210, Non Final Office Action mailed Sep. 12, 2011", 13 pgs.
"U.S. Appl. No. 12/890,210, Response filed Dec. 12, 2011 to Non Final Office Action mailed Sep. 12, 2011", 7 pgs.
"U.S. Appl. No. 12/890,469, Non Final Office Action mailed Mar. 23, 2012", 23 pgs.
"U.S. Appl. No. 12/890,469, Non Final Office Action mailed Oct. 20, 2011", 10 pgs.
"U.S. Appl. No. 12/890,469, Response filed Jan. 20, 2012 to Non Final Office Action mailed Oct. 20, 2011", 9 pgs.
"U.S. Appl. No. 12/978,133, Non Final Office Action mailed Jan. 23, 2012", 33 pgs.
"U.S. Appl. No. 13/198,609, Final Office Action mailed Mar. 23, 2012", 12 pgs.
"U.S. Appl. No. 13/198,609, Non Final Office Action mailed Nov. 4, 2011", 7 pgs.
"U.S. Appl. No. 13/198,609, Response Filed Feb. 6, 2012 to Non-Final Office Action", 7 pgs.
"U.S. Appl. No. 13/198,609, Response filed Feb. 6, 2012 to Non Final Office Action mailed Nov. 4, 2011", 7 pgs.
"U.S. Appl. No. 13/399,633, Non Final Office Action mailed May 24, 2012", 5 pgs.
"U.S. Appl. No. 13/399,777, Non Final Office Action mailed May 8, 2012", 17 pgs.

* cited by examiner

FIG. 13

METHODS AND SYSTEMS FOR SEARCHING FOR GOODS AND SERVICES

RELATED APPLICATIONS

This application is a continuation of U.S. patent application Ser. No. 09/166,779, filed on Oct. 6, 1998 now U.S. Pat. No. 7,937,312, which is a divisional of U.S. patent application Ser. No. 08/554,704, filed on Nov. 7, 1995 now U.S. Pat. No. 5,845,265, which is a continuation-in-part of U.S. patent application Ser. No. 08/427,820, filed on Apr. 26, 1995 now abandoned, all of which are incorporated herein by reference.

BACKGROUND OF THE INVENTION

The present invention relates to used and collectible goods offered for sale by an electronic network of consignment stores. More specifically, the present invention may be an electronic "market maker" for collectable and used goods, a means for electronic "presentment" of goods for sale, and an electronic agent to search the network for hard to find goods. In a second embodiment to the present invention, a low cost posting terminal allows the virtual presentment of goods to market and establishes a two tiered market of retail and wholesale sales.

Certain items and used goods have a large following of collectors. These items include baseball cards, dolls, pens, watches, comic books, stamps, coins, and the like. It is well known to establish shops specializing in these items. It is also well-known to establish boards for the sale of used goods. And is known to sell new goods on a special television channel like the Home Shopping Channel.

The prior art does not provide a means to electronically market used goods or provide an avenue to allow participants to speculate on the price of collectable or used goods in an electronic market place. Moreover, the art does not show a way for small to medium size business to use a low cost posting terminal in conjunction with a market maker computer to collectively create a virtual market for used and collectible goods. Thus, to address the short comings of the art the present invention has the following objectives:

SUMMARY OF THE INVENTION

To establish a low cost computer means for a used good and/or consignment stores to establish a "trusted" computerized market for used and collectible goods.

To establish a computer means to administrate and provide inventory tracking to used good and/or consignment stores when the stores make a virtual presentment of a good to a computerized market and the good is sold at the virtual market and/or the good is sold through the store front.

To establish a computer means to double tier a computerized market for goods, where the first tier is a retail price and the second tier is a wholesale or dealer to dealer price and an authorized dealer has pre-approved access to the dealer-to-dealer price and may charge and display the retail price to a local store customer.

To establish a computer means for archiving records of transactions in a computerized market for collectible and used goods and distributing the archive to computer terminals that may then research and analyze valuation and price trends of collectible and used goods in the computerized market.

To establish a computer means for a used good store or consignment store to sell used goods and collectibles electronically and to provide the automatic electronic re-sale of goods purchased.

To establish a market for goods with a dominant electronic "market maker" node to allow collectors to speculate on the collectable goods market.

To provide the excitement of a "live" auction house type atmosphere to remote participants in a electronic auction.

To provide data analysis to the market makers of collectable good or consignment node users on the price, price movements, and quantity of collectable goods in the virtual market.

To provide an electronic agent interface for participants to search a plurality of consignment nodes to search for a used good or collectable item.

To provide a means to track down the owner of a particular used or collectable good. Further, to provide a trusted network of consignment nodes that act as brokers to provide a means to electronically present a used good or collectable to an electronic market.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly the present invention resided in the novel methods, arrangements, combinations and improvements herein shown and described.

The present invention is a network of consignment nodes and a low cost easy to use posting terminal for the virtual presentment of goods to market. A consignment node is a computer database of used goods preferably operated by a used good, collectable shop keeper or a bailee. A posting terminal is a low cost easy to use computer and computer peripheral devices used by a small store owner to present goods to a computerized marker and track the sales of goods and control the posted inventory. All consignment nodes users or operators, hereinafter users, are "trusted" licensees or franchisers of the software and hardware necessary to create and operate a consignment node. Thus, the network provides a trusted means for consignment node users, e.g. shop keepers, to establish electronic markets for collectable goods, establish electronic auctions, establish a means for searching each others shops to locate hard to find collectibles items, and a means to electronically present goods to a market. The present invention will allow, or license, certain consignments nodes to become a dominant market maker for a particular class of goods, for example, a consignment node franchise may be given the rights to establish the dominant market for collectable antique pens. It is understood, a central market maker computer may be virtually divided into different markets with posting terminals used as the means for the market to obtain virtual title goods. Other consignment nodes, after taking physical possession of a good, may make an electronic presentment of that good to such a dominant consignment node market. Thus, a local collector of antique pens may bring a pen to a convenient consignment node in Small town, USA, the consignment network would allow this collector to electronically "present" his pen to the dominant market make node for antique pens in for example, Chicago. Participants, e.g. customers and collectors (hereinafter "participants"), may reach a dominant node's market, or any other consignment nodes electronic store, from his or her home by logging on from a PC located at the participant's home to their locally operated consignment node and reaching the distant consignment node through the network of consignment nodes. Thus, each consignment node user, e.g. shop keeper, has a potential participant, i.e. customer base, of all consignment node participants. In other words, a potentially huge customer base that incurs the minimal cost of a local consignment node connection may reach any other consignment node through the consignment node network. And local collector's may economically participate in the collectable markets by using local access to a convenient consignment node "trusted" bailee, and electronically presenting collectable goods to an electronic market.

A consignment node in a simple form may have a computer 10, a digital camera 12, a bar code scanner 14, a display 16, a printer 20, a keyboard 18, a database 22 and a network connection 26 collectively called hereinafter a consignment node. The present invention also has a user interface application program to execute an a user or participant's data terminal 28.

The consignment node may have four modes of operation: a software download mode, an auction mode, a market mode, and an agent mode. The software download mode allows a participant to log into the consignment node and receive a download of a participant interface application program. The auction mode allows a participant, from the participant interface application program, to log into a consignment node to partake in an electronic auction. The market mode allows a participant with the participant interface program to log into a consignment node to browse the consignment node database to search for a used or collectable good. The agent mode allows a participant to log into a consignment node to formulate a search request for a particular used good or collectable. The consignment node may search its own database for the requested good and/or generate agents to search and report back a search request of other consignment nodes.

The present invention may allow a participant to electronically purchase goods from a consignment node and to select whether the good should be shipped to a participant designed location or the participant may take electronic legal ownership of a good and post a new participant defined offer or reserve price. By the interaction of a plurality of participants buying and selling collectibles on a consignment node, posting "buy at" and "sell at" quantities and prices the consignment node may establish a market or become a "market maker" for collectable goods. A participant may also elect to electronically transfer or present a good to a different consignment node or market. This allows a participant to speculate with collectable goods on the consignment node network's different markets and not incur the shipping costs with physically moving the goods, while providing a trusted means to assure potential buyers of the good's bona fide availability and legal title.

The consignment node operator or purveyor, hereinafter referred to as the consignment node user, establishes his consignment node by creating a database of used goods or collectibles, hereinafter the term "goods" shall be used to reflect used goods, new goods and collectibles. The user takes the first good to be put on the database and invokes the consignment node software to create a data record. For example, the user owns a baseball card collector shop and the user wants to post his Babe Ruth collection. The user in this instance invokes the consignment node to "build the database mode" and the invention initializes the digital camera 15. The user then "photographs" or digitizes the image of the particular Babe Ruth card. The consignment system then displays an empty database record on the display to accept text information concerning the card.

The user fills out the display record with information concerning the particular Babe Ruth card. The consignment node verifies that enough information has been filled out in the displayed computer record, as well known to the electronic database arts, and accepts the record. It should be noted that the consignment node database record has data fields for the consignment node user to add value to his consignment node postings with subjective information such as condition of the card, special features such as autographed by Babe Ruth, and the like. Thus, the consignment node user may build business goodwill into his particular consignment node operation by establishing his own particular subjectivity and quality standards in item postings.

After the data record or the particular Babe Ruth card is accepted by the consignment node the system may print out a bar code label on the printer 20. The user may then put the particular Babe Ruth card into a plastic bag and affix the bar code label to the bag. The bar code labeling system becomes a useful inventory management tool discussed below.

It is understood in this first example that the consignment node user is the legal and equitable owner of the Babe Ruth card and that the user posted a reserve or offer price on the particular card at his posting. In a second illustrative example, a local resident would like to post, for example, his Frank Robinson baseball card. The resident brings his Frank Robinson card to the baseball card store and tells the consignment node user he would like to offer his Frank Robinson card for a consignment sale. Again, the consignment node user invokes the system database posting node and "photographs" the Frank Robinson card with digital camera 12. As above, the user fills in the system generated display prompt for information concerning the Frank Robinson card. The resident informs the user of the reserve or offer price and signs or agrees to a consignment contract with the consignment node user to accept the consignment terms to pay the consignment node user on the sale of the card, for example 6%, of sales price as a consignment fee. Again, the system may print the appropriate bar code for the Frank Robinson card. The consignment node user then takes possession of the card and may affix the bar code label to an appropriate cardholder. It should be noted by the consignment node user may again "add value" to his consignment node by entering subjective criteria in the database entry for authenticity, condition, special attributes and the like. The participant or local resident may now electronically present his Frank Robinson card to any consignment node, consignment node auction or consignment node market maker in the consignment node network.

These processes may be repeated again and again to establish a substantial database of goods for sale. It should be noted that the consignment node user may at his discretion take postings from reputable dealers or collectors via a facsimile machine or other forms of electronic or verbal presentment of a good for sale. It is within the sound discretion of an individual consignment node user to establish these practices. It is within the scope of the invention, however, to take electronic postings from other consignment node users or individuals over the network, as discussed below. Each consignment node user may be a franchisee of a central franchiser and the franchiser may police the network to give quality control, detect fraud and revoke the franchises or licenses of poor quality consignment node users. Thus, the consignment node is a "trusted" network for consignment node users providing value to the network by imposing a quality and performance structure on the consignment nodes. The same franchise enforcement scheme is also available to the low cost posting terminal embodiment to the present invention.

The Sale

A buyer, hereinafter participant, may electronically log onto a consignment node via a network connection by use of a PC with participant interface software, through an interactive television application, workstation, internet browser or the like. The network connection drivers for the consignment node are discussed in detail below. The participant may enter the browse node and peruse the consignment node database of goods. It is understood that the participant may receive the image taken with a digital camera 12 of the goods at the participant terminal. The participant, upon finding for example the above-posted Frank Robinson card may decide to purchase the card. The participant may present electronic payment to the consignment node by entering a credit card number and expiration date or other forms of electronic payment. It is understood that a secure and/or encrypted means may be established between a participant's interface application and a consignment node to transfer sensitive or theft prone information. Moreover, a participant may establish an account with his local consignment node to be debited and credited with the funds used and generated with his transactions.

The consignment node may, for example, clear the transaction by charging the participant's charge card account and crediting the consignment node store account by well-known credit card clearing techniques. After the consignment node has cleared the transaction the system electronically transfers ownership of the Frank Robinson card to the participant. The participant may then be presented with the choice of directing the delivery of the Frank Robinson card to a desired location or may choose to post a new reserve or offer price for the card and direct the card to remain in the possession of the consignment node user. Thus, the consignment node allows a participant to speculate on the price of the Frank Robinson card and establishes an electronic market for the Frank Robinson card. It is understood that the consignment node may have many Frank Robinson cards available, thus by the interaction of collectors electronically buying and selling the collectibles it will establish a market price for a Frank Robinson card or any other good. For each transaction, the consignment node user extracts the small consignment fee, e.g., 6% of the sales price, thus the consignment node user directly benefits from operating a reputable consignment node. If the participant elects to take delivery of the purchased goods then the consignment node may track the delivery and ownership of this good to this particular participant in a data record. This data record may be useful to speed the posting of the good, should the participant later decide to re-post and sell the good, and it also creates a valuable database of records to track the possession and ownership of a collectable. This feature may be useful in the agent mode, e.g., tracking down very hard to find items, discussed more fully below.

The Auction

For a rare good, a good in a volatile market, or a good's initial posting the consignment node user or participant may wish to auction the good, with or without reserve, to the highest bidder. In this mode, the good may be posted on the consignment node by the means described above but the data record representing the good is identified as waiting for an auction date and may not be purchased on the electronic market. Alternatively, an item may be in the electronic market of the consignment node with a high reserve price that may be lowered in the auction or liquidation mode. Here the consignment node user or the good's participant owner may enter a protected data field a confidential reserve price for the auction mode. The consignment node user arranges by invoking the appropriate consignment node program a time and date for an electronic auction. The consignment node user or good's participant owner may establish, in a data record that represents the good, a desire for the item to be auctioned. For example, a pawnshop operator of a consignment node may have several Rolex watches he wishes to auction with reserve this Saturday night at 7:00 p.m. The consignment node user, here a pawnshop, identifies on the Rolex watch records the auction date and the confidential reserve price. The consignment node system may "advertise" auction dates, items and auction terms in the consignment node log on welcome message discussed below. Moreover, a good that is identified as awaiting an auction date may be viewed before auction in the consignment node browse mode by a perspective auction participant.

At the auction date, perspective participants log onto the consignment node auction mode locally or through the consignment node network and await the first good to be auctioned. It is understood that in the best mode of the invention the participant will have a data terminal with a digital to analog converter such as a "sound blaster" and speaker, the digital to analog capability may be used in the auction mode to bring the aural excitement of an auction, e.g., the call of the heckler, the caller and bidders, home to the auction participant. This is discussed in more detail below.

The consignment node takes the first item to be auctioned and posts the image of the good and the good's text record to the participants. The consignment node then posts the opening bid. It is understood that the bid postings may be in a protocol that invokes the generation of an auctioneer's voice at the participant terminals. The participants may then respond with a higher bid. The consignment node mode scans electronically the participants for bids and accepts the highest bid. If bids are tied the consignment node may take the first highest bid by the participants log on order. A particular bidding participant receives a special acknowledgment from the consignment node that her bid was accepted. The consignment node then posts the higher bid to all the electronic auction participants. The consignment node repeats this process until no higher bid is received for a predetermined amount of time and closes the auctioning of that particular good. The consignment node then checks whether the highest bid received is greater than the reserve price, if appropriate. The consignment node may then post sold! and the sell price to all participant terminals and proceed to post the next item for auction. Again a successful purchaser may elect to direct delivery of the good or post the good on the electronic market at a new participant determined offer price.

It is understood that the terms of the auction sale are posted and agreed to by the participants before allowing a participant to bid on goods in compliance with local requirements and statutes. It is also understood that a participant may make electronic payment for the goods or establish a line of credit or collect on delivery terms within a particular consignment node user's discretion. This may be established by a relationship between a local consignment node user and a local participant at the local consignment user's discretion.

It should be noted that a consignment node user may sell virtual advertising space or a central master node e.g., the franchiser, may coordinate the sale of advertising space on a pool of consignment nodes to reach target market participants. For example, if a participant has purchased or speculated in antique pens, and advertisers of an antique pen specially consignment node wishes to target market individuals on the network who have purchased collectable pens in the past. A central coordinated master node may sell advertising to an advertiser for the log on message or e-mail targeted participants and users. Thus, the network of consignment nodes can establish a market for target marketing or blanketed advertising of goods and services sold locally or on a network level by a central node.

The Agent

The Agent Mode allows a consignment node participant to search a plurality of consignment nodes and purchase records for a used good. A participant may log onto his local consignment node to shop. This participant, for example, may be interested in purchasing a particular used coin for her collection. The participant may invoke a consignment node Agent to search the network of consignment nodes for this coin. The participant fills in the search parameters for this coin, for example, a 1872 U.S. penny from the Denver Mint. The consignment node Agent task handler verifies the Agent form is sufficiently filled out and accepts the task. The Agent checks a list of other consignment nodes network addresses kept by the local consignment node database and generates an Agent communication message to each consignment node on the list and begins to establish communications to the other consignment nodes. An Agent message between consignment nodes begins by coordinating or reconciling the database on each consignment node of the locations and/or address of other consignment nodes. If a consignment node has a different list of consignment nodes in its database it will pass the node update information to the other consignment node. The consignment node originating the Agent task will generate a new Agent task to accommodate the information concerning the new consignment node. Once the consignment node database of consignment nodes is reconciled, the Agent will search the consignment node database for the goods requested. The Agent will report back whether the search of the local market database was successful and how many good that matches the Agent search request it found. An Agent may also search the consignment node database of past transactions to identify an owner of a particular good. The Agent may then report that John Doe of Main Street, U.S.A. was the last known purchaser of a 1872 U.S. penny from the Denver Mint at this node. It is understood that differing levels of privacy are available to consignment node purchasers, so as only allowing the local consignment node user to view past purchaser information and/or provide the Agent with an option of contacting that consignment user so he may contact the prior purchaser, thus, protecting privacy while allowing bona fide offers to reach the prior purchaser in confidence.

Once some of the Agents start reporting back to the Agent originating consignment node, the originating consignment node may report the results to the consignment node participant of the Agents' results. Such results may give the total number of matching items found thus providing the local participant/collector an indication of the depth of this market. It is understood that a local consignment node user may charge participants for Agent requests.

Computer Implementation

In the preferred embodiment of the present invention a consignment node may use a multitasking operating system such as UNIX, OS/2, NT or VMS. However, a Microsoft DOS or Windows implementation is within the scope of the present invention. The consignment node may be networked via TCP/IP and the internet or a private TCP/IP network or X.25 private or public network or service providers network of ISDN, ATM and the like. It is understood, that a consignment node may support a plurality of protocols simultaneously. Moreover, it is understood that the participant interface application program may execute on a wide variety of platforms such as PC's, MAC's, Power PC's, workstations, cable set-top boxes, video game hardware and the like and are within the scope of the present invention. The posting terminal embodiment is discussed in detail below.

BRIEF DESCRIPTION OF THE DRAWINGS

FIG. 13 is a diagram showing a user interface on a posting terminal or consignment node.

DETAILED DESCRIPTION OF THE PREFERRED EMBODIMENTS

Figure 1:
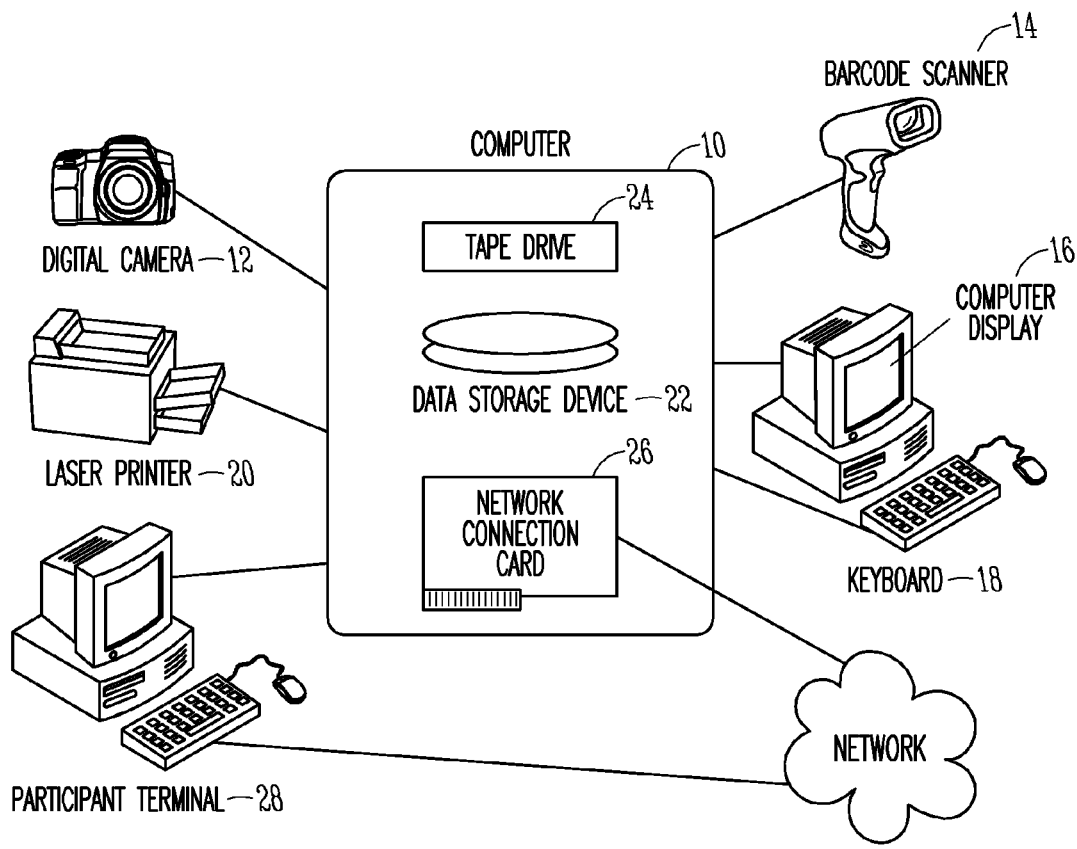
FIG. 1 shows the consignment node of the present invention may have a computer 10, a data storage device 22, a tape drive 24, a digital camera 12, a bar code scanner 14, a display 16, a keyboard 18, a laser printer 20, and a network connection 26. A participant user terminal is shown at 28.

It is understood that the get session identification procedure 100 is a routine that monitors the communication ports and virtual communication ports residing on a protocol stack. The consignment node may use, for example, a X.25 interface card, available from Eicon Corporation or Frontier Corporation to execute an X.25 protocol stack in a PC workstation. The get session identification 100 program may monitor the X.25 protocol for incoming calls. If the program identifies an incoming 15 call it may answer the call by transmitting the appropriate X.25 packet to the network on the appropriate virtual channel. It is understood that other protocols, such as TCP/IP, DECNET, SNA and ATM are within the scope of the present invention and that multiple protocol stacks may simultaneously execute in a consignment node. Therefore, the get session identification program 100 may have multiple instances to connect and monitor the various protocols. After the get session identification 100 has appropriately answered an incoming call to the consignment node, it may invoke the display welcome message and menu routine 102.

It is understood that the get session identification 100 provides sufficient information to the display welcome message and menu 102 to allow the display welcome message and menu 102 to connect to the appropriate session or virtual channel. At this juncture, if the participant is using an approved interface program, the interface program will send a predetermined code to indicate its version and other characteristics of its display driver. If a participant is logging in from a TTY terminal or other terminal the display welcome message and menu 102 may detect this information and send the appropriate TTY welcome message. This procedure may also be used to identify features and languages supported on various internet world wide web browsers. It is understood that the welcome message is viewed by the consignment node user as virtual advertising space that may be sold by the consignment node user or coordinated with the master control node (discussed in detail below). The participant may respond to the display welcome message and menu 102 program by giving an appropriate log on response 104. The get log on response 104 may verify and grant a level of access privileges to the participant. It is understood that the consignment node user may require the get log in response 104 to retrieve a credit card number, pin number, user ID and the like, to grant access privileges. If a participant is using a TTY terminal those sessions may be shunted to the download interface program (DIP) 106 routine to receive an appropriate interface program from the consignment node. The DIP 106 may present a list of choices as to what version interface program should be downloaded, such as DOS, Windows, UNIX, MAC platforms and what transfer program is desired such as Kermit, Xmodem, FTP and the like. A participant with a participant interface program may also elect to receive a new interface program from the DIP 106. It is understood that an older, no longer supported interface program participant may be shunted to the DIP 106 to receive a new interface program.

A participant with a supported interface program may select the auction 108, market 110 or agent handler 112 sections of the consignment node. If a participant selects auction 108 the participant may be presented with a menu of auction selections such as auctions in session, future auction times, dates, locations and topics, and auction preview. If a participant selects auctions in session the participants' session is passed to the appropriate auction handler, as discussed below. If a participant selects future auctions the participant will be given a list of future auction times, dates, terms, locations and topics of auctions on this and other consignment nodes. It is understood that these displays represent a virtual advertising opportunity for the consignment node user and the advertising space may be sold by the consignment node user or by the master control node. If the participant selects the auction preview, the auction process 108 passes the participant session to the market session 110 with data that indicates an auction preview desired by the user.

If the participant selects the market 110 choice the participant is given a menu of markets that the participants may browse, discussed further below. If the participant selects the agent handler 112 the participant may be provided with an electronic form to create a search for a good. The participant may then execute this Agent's search request to search the network of consignment nodes databases to look for the desired goods. The Agent is discussed more fully below. The Agent Handler 112 also receives incoming calls from other agents to process the external agents search request on the consignment node. The participant interface and consignment node participant functions are discussed in detail below. It is understood that the agent may also function between virtual markets on a market maker computer and with the transaction archive database discussed below. The discussion now turns to the operation of the consignment node by the user.

Figure 3:
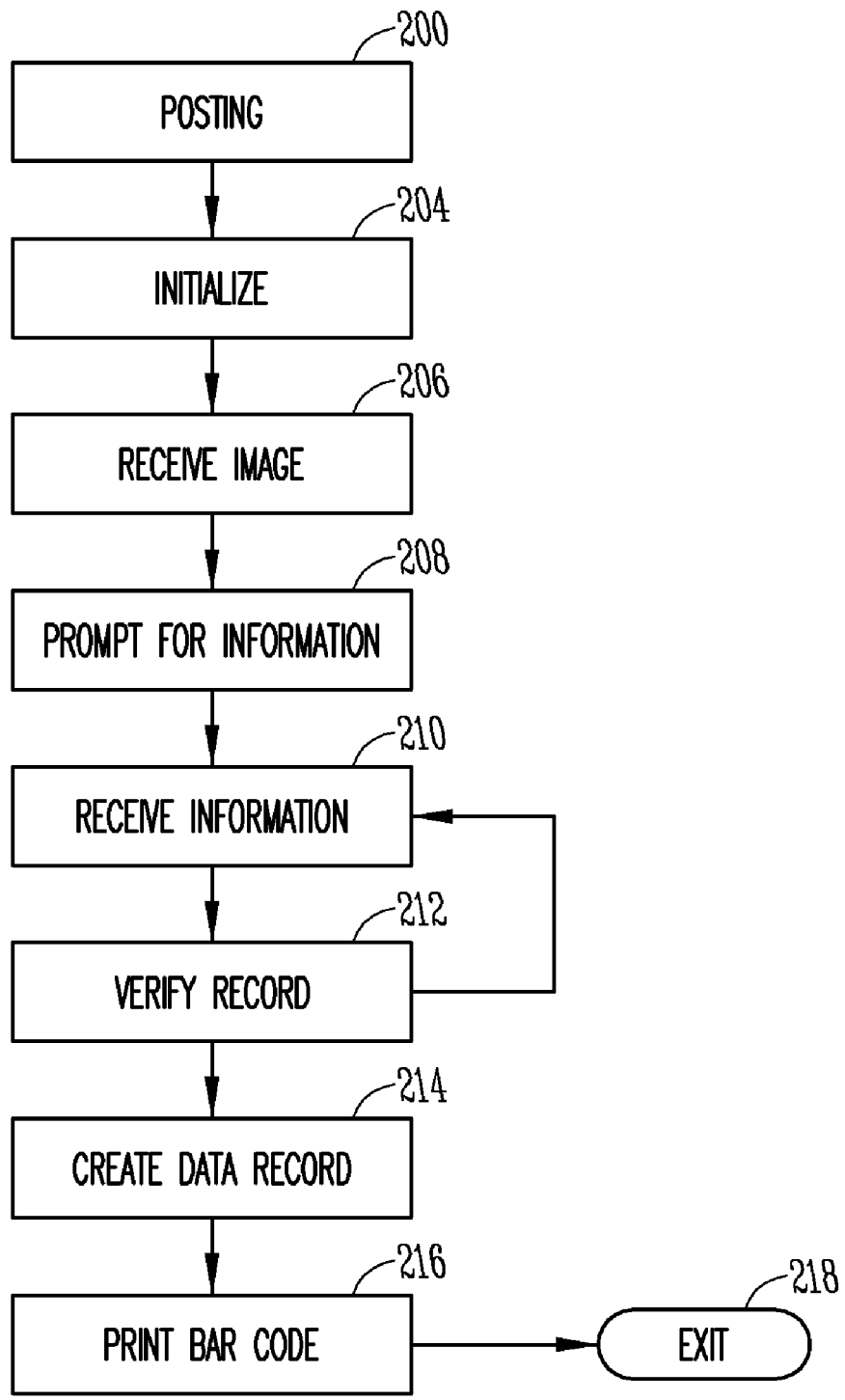
FIG. 3 is a schematic diagram showing the logical flow of the consignment node auction process.

FIG. 3 shows a logical flow diagram of the steps the consignment node may use to create a database record of a good for sale or for auction.

The consignment node user may invoke the consignment node program to enter the posting 200 mode to create a data record for the good. The posting 200 mode initializes 204 the consignment node to receive information on a new good. The initialization 204 step displays a data record with data fields on the consignment node terminal for the user to fill in information on the good. The initialization step 204 also initializes the consignment node peripheral devices such as the digital camera 12 and the printer 20. The consignment node user then "photographs" or digitizes the image of the good from one or more perspectives as well known to the digital camera arts. The consignment node receives the digitized image(s) at receive image 206 step. The consignment node program then prompts the consignment node user for information on the good 208. The consignment node receives information 210 that the consignment node user inputs to the data record displayed at step 208. The consignment node program verifies 212 that the necessary information, such as owners name, reserve price, market or auction designation is in the data record. The verify step 212 will reject the record and return the consignment node user data entry mode 210 if the record does not have the minimum information. If the record is verified 212 as complete enough to commit to the consignment node database, a data record is created 214 and linked into the consignment node database. The consignment node program then generates and prints a bar code 216 that indicated the data record. The bar code system is used by the consignment node to maintain an accurate inventory and is a hook for local sales (discussed below). The posting routine may then exit 218 and return from the posting program. By repeating the posting routine of FIG. 3 the consignment node user may build a database of goods for the consignment node market, auction and/or agent searches.

Figure 4:
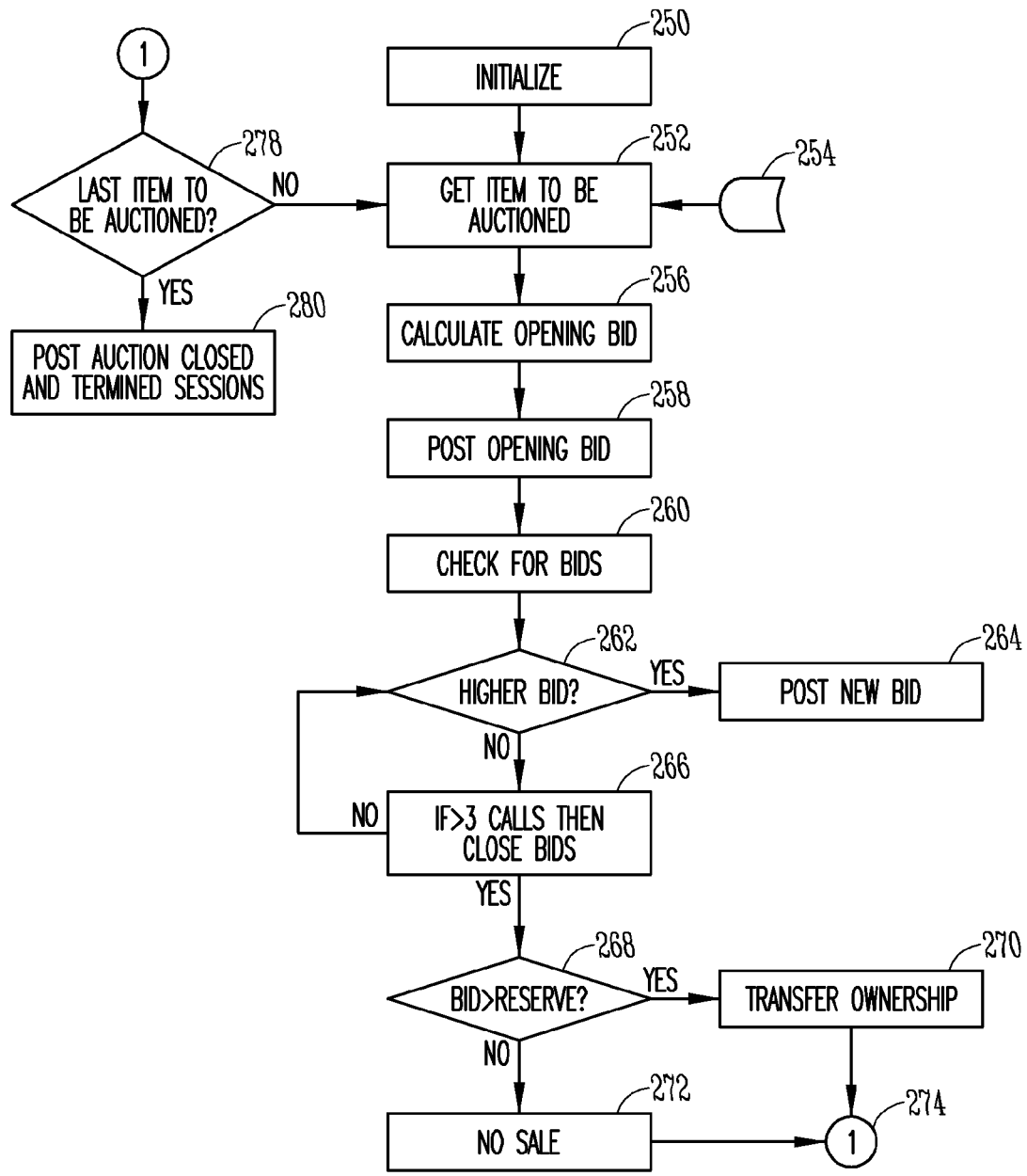
FIG. 4 is a schematic diagram showing the logical flow of the consignment node market or browse mode.

FIG. 4 shows the logical block flow diagram of the processes the consignment node may take to execute an auction. It is understood that the consignment node user may manually invoke the auction process, or may schedule the consignment node to execute the auction process. The auction process begins by initializing 250 the data structures, records, queues and the like to conduct the auction process. The connection between the auction process and auction participants is discussed below. The auction process gets the first item to be auctioned 252 from the database of goods to be auctioned 254. The consignment node then calculates the opening bid 256 by a predetermined formula such as 50% of the reserve or general solicitation of an opening bid is posted to the auction participants 258. The consignment node auction mode then scans the participants for a higher bids 262. If a higher bid is found the new bid is posted 264. It is understood that the steps of checking for bids 260 determines if the bid is higher 262 and posting the new higher bid 264 is repeated until no higher bids are received. After the typical auction closing of going once . . . twice . . . three times the auction is closed 266. The consignment node auction program then compares the highest bid received with the good's reserve price 268 to determine whether to transact the sale. If the highest bid is greater than the reserve price the consignment node auction process posts sold! for xxx amount to the auction participants and calls the transfer ownership subroutine 270, discussed further below, and transfers the ownership of the good. If the highest bid is less than the reserve price the consignment node auction process announces no sale! 272 to the auction participants. The auction process then proceeds 274 to get the next good to be auctioned 278. The consignment node auction process is then repeated until all the goods to be auctioned have been run through 278. The consignment node auction may then close and terminate the participant sessions 280. It is understood that the transfer ownership 270 sub-routine may require time to clear the transaction and, therefore, may be best implement as a spawned child process to the auction process. This will keep the consignment node auction executing at an exciting and fast pace for the participants. The consignment node auction process itself may execute in several instances to provide simultaneous auctions on a consignment node. Thus a consignment node may conduct several simultaneous auctions on several virtual runways. It is understood that in the auction mode the consignment node and the participant interface software may communicate using a protocol that allows the consignment node auction driver to "point to" locations stored in the participant interface software, to cause the participant interface software to generate the sound of a auctioneers voice on the sound blaster, or equivalent board. Thus, the present invention uses pre-stored sound samples of different auction prices and auctioneer "string" along aural calls inside the participant interface software, and allows the generation of said pre-stored sound bites to be invoked by the consignment node driver through the said special protocol. This method greatly reduces the bandwidth necessary for a consignment node to support the generation of exciting auctioneers calls at a plurality of participant terminals. It is understood that the generation of an audio bit stream from the consignment node to the participant terminals is also with the scope of the present invention.

Figure 5:
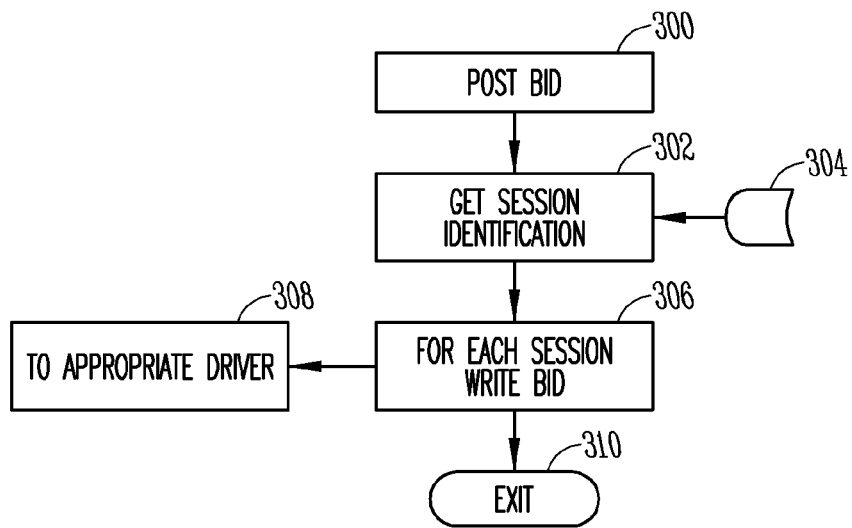
FIG. 5 is a schematic block diagram showing the logical flow for posting a new used good on the consignment node.

FIG. 5 shows the logical flow for the post bid subroutine 300. The post bid sub-routine may be invoked from several consignment node processes, those specifically described thus far are the post opening bid 258 and posting bid 264 logical processes. The post bid 300 sub-routine is used to communicate between a consignment node and multiple participants. The post bid 300 sub-routine gets participant session identifications 302 from a data record or data structure that contains a list of session identifications of participants who have logged onto the auction sessions. The next step sends the bid passed to the post bid 300 subroutine to each participant session identified in the data structure 306. Bids are posted to each participant through an appropriate driver 308. The driver may be identified for each particular user session. For example, a PC user logged into the consignment node via an X.25 virtual channel may require a host PAD driver in the consignment node to communicate asynchronously to the PC terminal interface application. A network user may require a TCP/IP driver to connect between the consignment node and the participant networked terminal. After communicating the bid to participants through the appropriate device driver 308, the post bid sub-routine may exit and return 310 to the calling routine.

Figure 2:
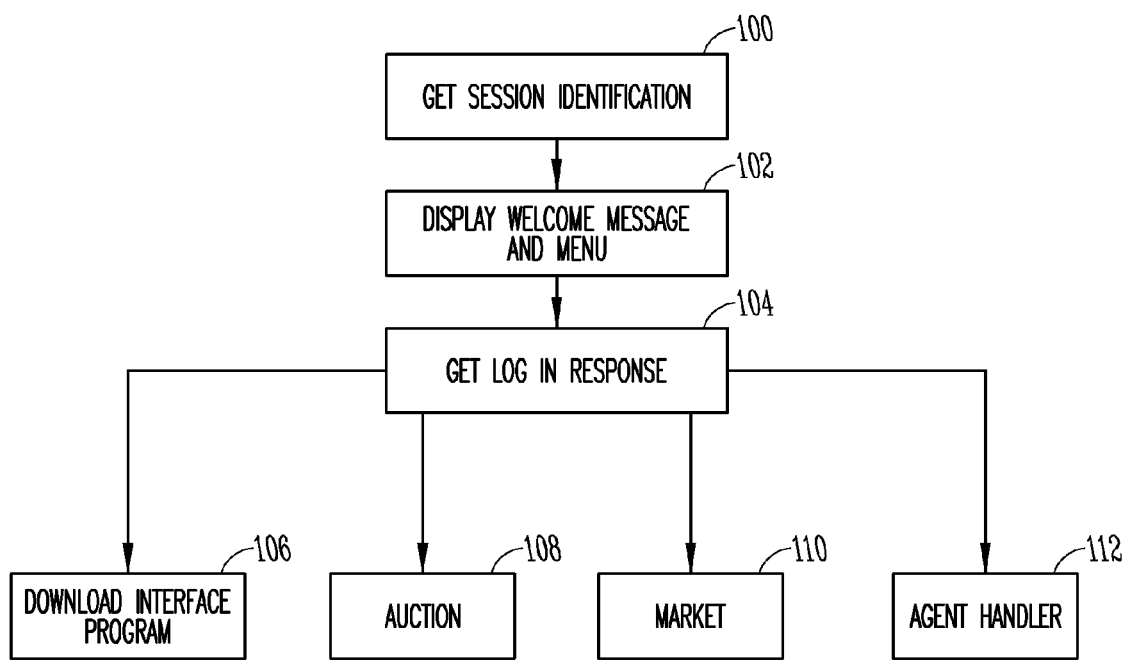
FIG. 2 shows a schematic block diagram showing the logic flow of a user log in at a consignment node.
Figure 6:
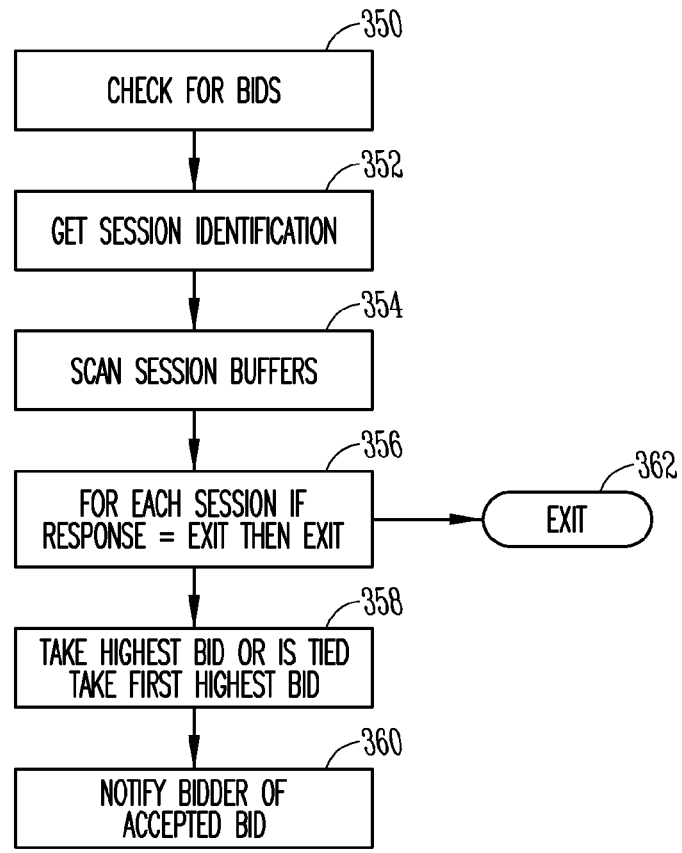
FIG. 6 is a schematic diagram of a subroutine that may be used to post auction bids.

FIG. 6 shows the consignment node subroutine to check participant sessions for bids during the auction mode. Check for bids 350 maybe a subroutine called by the auction program to scan for bids. It is understood that when a participant logs into the consignment node and selects the auction mode, (see FIG. 2), the participant's session identification is passed to a data structure. The data structure maybe used by the check for bids 350 sub-routine to correctly identify participants at a particular virtual auction. As noted above, the consignment node may support multiple simultaneous auctions, therefore, may require multiple instances of the aforesaid data structure. The check for bids sub-routine 350 opens or connects to the appropriate data structure storing or holding participant session identifications who are participating in the check for bids calling auction program instance at the get session identification step 352. The buffers associated with each session is scanned for an input 354. If a participant has input an "exit" command or symbol 356 the routine removes that participant's session identification from the auction identifying data structure and allows the participant to exit 362 the auction. The participant's session identification may be returned to a data structure that allows-the participant to return to the consignment nodes main menu, see FIG. 2, or terminate the participant session. The subroutine then compares the bids and takes the highest bid 358. If bids are tied for the highest bid the sub-routine may use the first received bid and reject the others 358. The sub-routine then notifies the participant session who had the highest bid 360. It is understood that the take the highest bid step 358 and notify bidder step 360 are aware of the current bid price for a good and will not allow a lower bid to be accepted. It is understood that the participant session buffers are flushed after they are scanned to remove old or latent bids. The check for bids sub-routine then returns to its calling routine.

Figure 7:
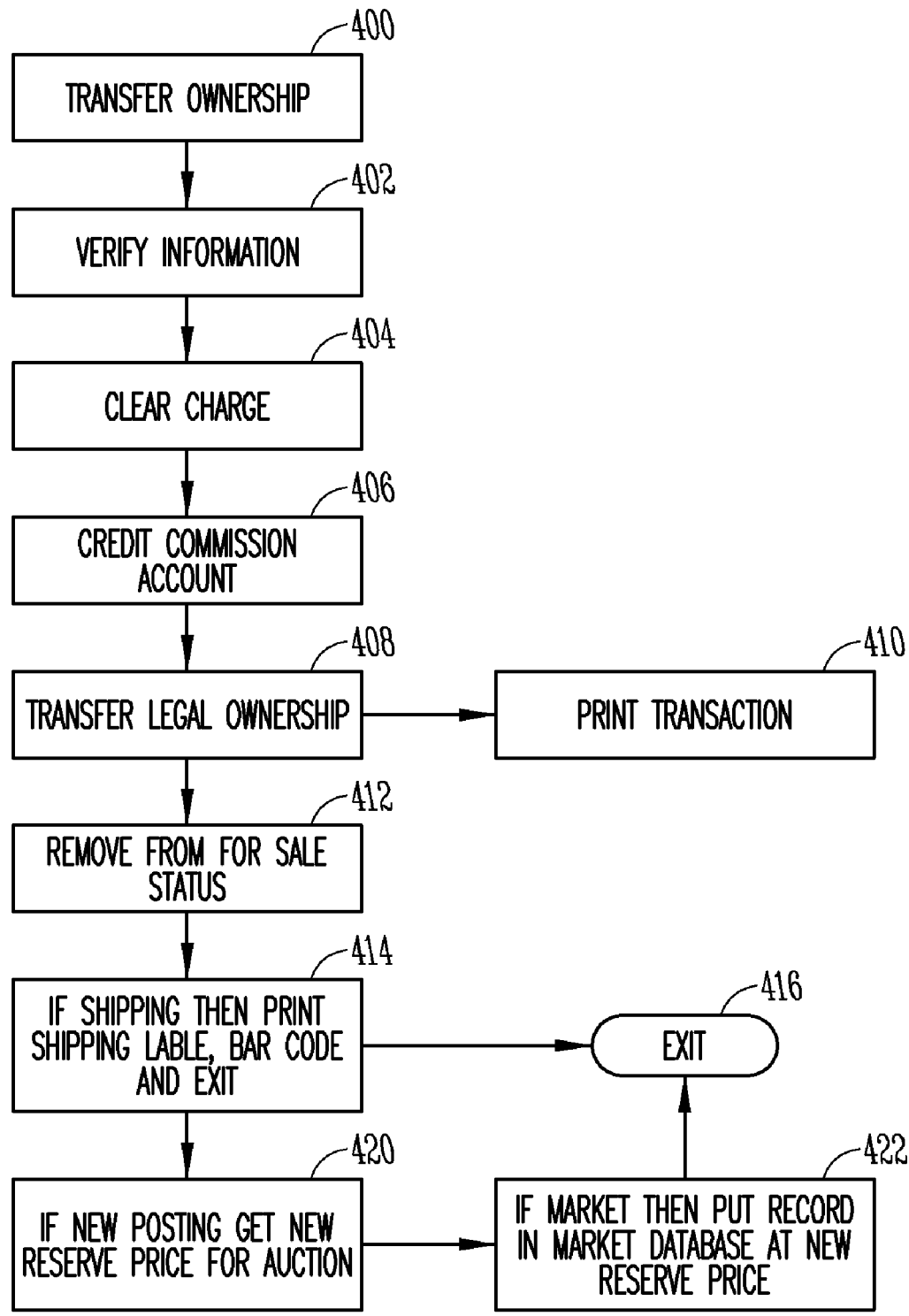
FIG. 7 is a schematic diagram of a subroutine that may be used by the consignment node auction process to receive participant auction bids.

FIG. 7 shows the transfer ownership routine 400 that may be used to transfer the ownership of goods and collectibles in the consignment node. The transfer ownership sub-routine may be called from several consignment node modes and processes to effect the transfer of legal ownership. The first step in the transfer ownership sub-routine 400 may be to verify a participant purchaser information 402. It is understood that the consignment node may use a variety of well known authenticating procedures to verify a participant, such verification techniques include personal identification numbers (PINS), passwords, call back, and a plethora of encryption techniques and personal information identification means to provide a reliable verification technique. It is understood that a consignment node user may have established a credit or deposit account for the participant from past sales or the transfer of funds and the verify step 402 may collect the participant to the account. The clear charge 404 step is used to clear the participant consignment node transaction. It is understood that this may be via an external credit card clearing network, a connection to a credit account, or though one of the many proposed electronic fund transfer schemes such as debit cards, e-money, and clearinghouses. After the transaction clears the charge 404, the consignment node credits the consignment node users commission account 406 to extract the consignment node transaction fee. The consignment node then transfers legal ownership 408 of the good by changing the ownership entry in the data record in the consignment node of the good. The consignment node may then print a record of the transaction 410. It is understood that step 410 may also be used to keep a log on the consignment node storage or tape drive. The consignment node then removes the good from sale or auction status 412. It is understood that the data record representing the good is "locked" during the transfer ownership sub-routine to prevent collisions of actions and transfers of the good. If the participant has elected to ship goods then the consignment node will print a shipping label 404 for the consignment node user to attach to the good for shipment. The transfer ownership routine may then exit 416. If the participant has elected to re-post the good or collectable the participant may specify a new reserve or offer price for the good or collectable. It is understood that the purchasing participant may elect to leave the good or collectable at the consignment node and post a new offer or reserve price and may identify that the good is on the market, e.g. may be bought and sold at, any time, or that the good is awaiting an auction date. Moreover, the participant may elect to have the good viewable on the market or "invisible" to the market while awaiting an auction date 422. It is understood that the participant may elect to leave the good at the purchased consignment node and electronically transfer the offering of a good to another consignment node. It is understood that consignment node users may run a "trusted" network between consignment nodes to provide the trust between merchants, that the goods exists and that the network between the consignment nodes to provide for electronic presentment of a good is a secure network connection. This allows collectable goods to be concentrated for a single electronic auction or virtual collectable market on a market maker consignment node without incurring the costs of shipping the goods to a central location to bring the good to the market maker consignment node. It is understood that the-trusted posting of goods on a market maker node is a value added feature a small town consignment node user can provide to his immediate collector community. It is understood that the master central node may also serve as a legal consignment node franchising authority to provide enforcement of integrity, security and quality control for the consignment node network.

Figure 8:
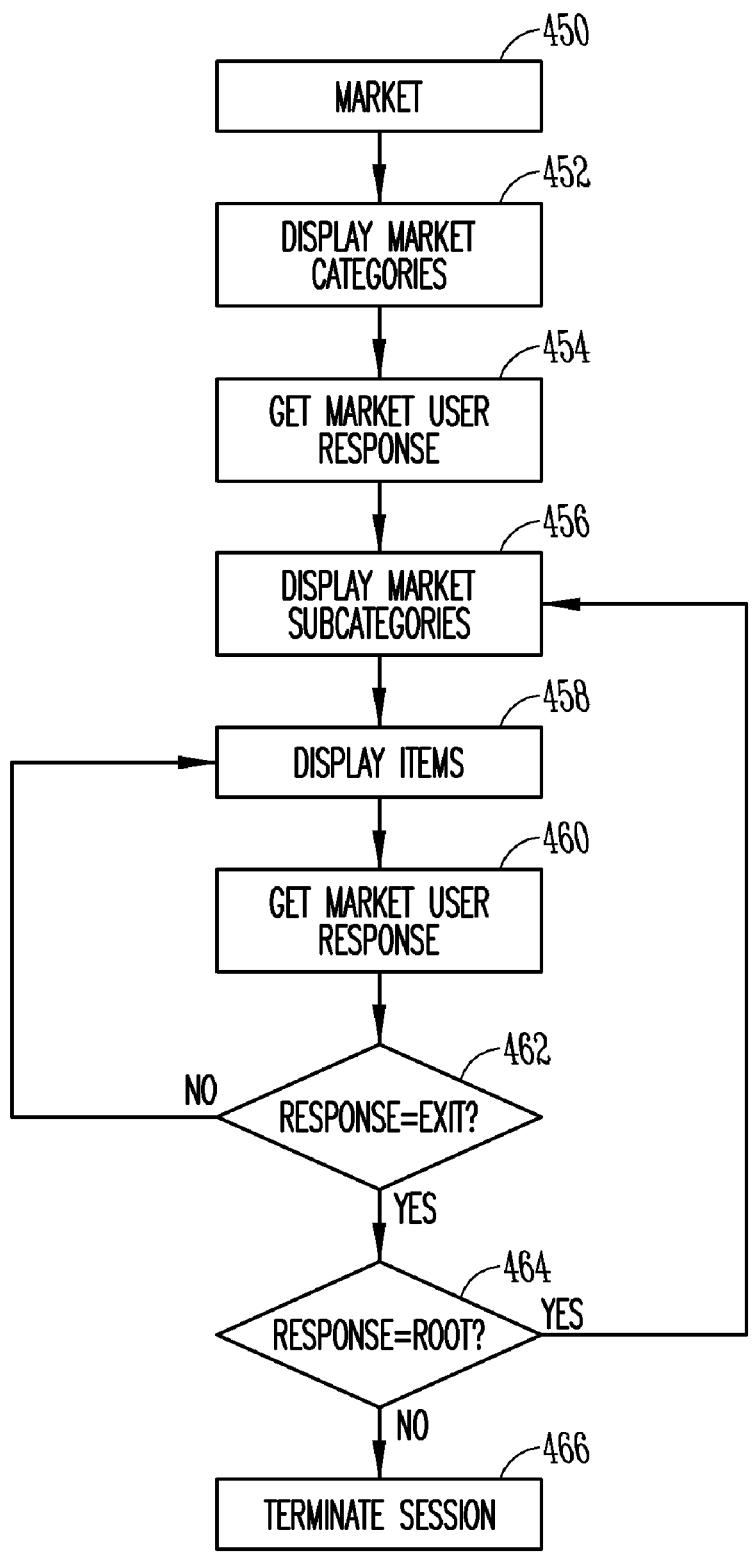
FIG. 8 is a schematic diagram showing the logical flow for a subroutine that may be used to transfer ownership of an item.

FIG. 8 shows the consignment node routine that may be used to establish a virtual market. The market 450 may be selected from the consignment node main menu, see FIG. 2, to allow a participant to browse the consignment node goods database. The market 450 will display to the participant market categories 452, categories may be defined by the consignment node user to reflect the specialization of his consignment node and the specialized markets or miscellaneous markets for his goods. The consignment node then gets the participants response 454 to the market choices. The consignment node may then display market sub-categories 456. Again, the consignment node user may specify market sub-categories to reflect the specialization of the consignment node. The consignment node may then display items 458 and get the participant or market user response 460 to the displayed choices. It is understood that the participant may browse or scroll through the goods on the market 462, 458, 460 until the participant responds with a desire to exit the market 463. If the response is a desire to transfer to the market root directory 464 then the consignment node will return the participant to the market subcategories 456. If the participant responded with a desire to terminate the session 466 the consignment node will exit the market and terminate the participant's session. It is understood that during the browse loop 458, 460, 462 a participant may elect to buy or make an offer on a good and may invoke the transfer ownership routine, see FIG. 7, to effect the transfer of a good's ownership. It is also understood that a participant may make an offer on a good below the asking (or offered) price. Such a proposed offer may be stored by the consignment node and used, to notify the good owner. The good owner may then accept the counter offer or reject. It is understood that a participant counter-offer may be made subject to an acceptance before date. It is also understood that a participant may establish a "buy at" or "sell at" price/quantity for any good in the market.

Figure 9:
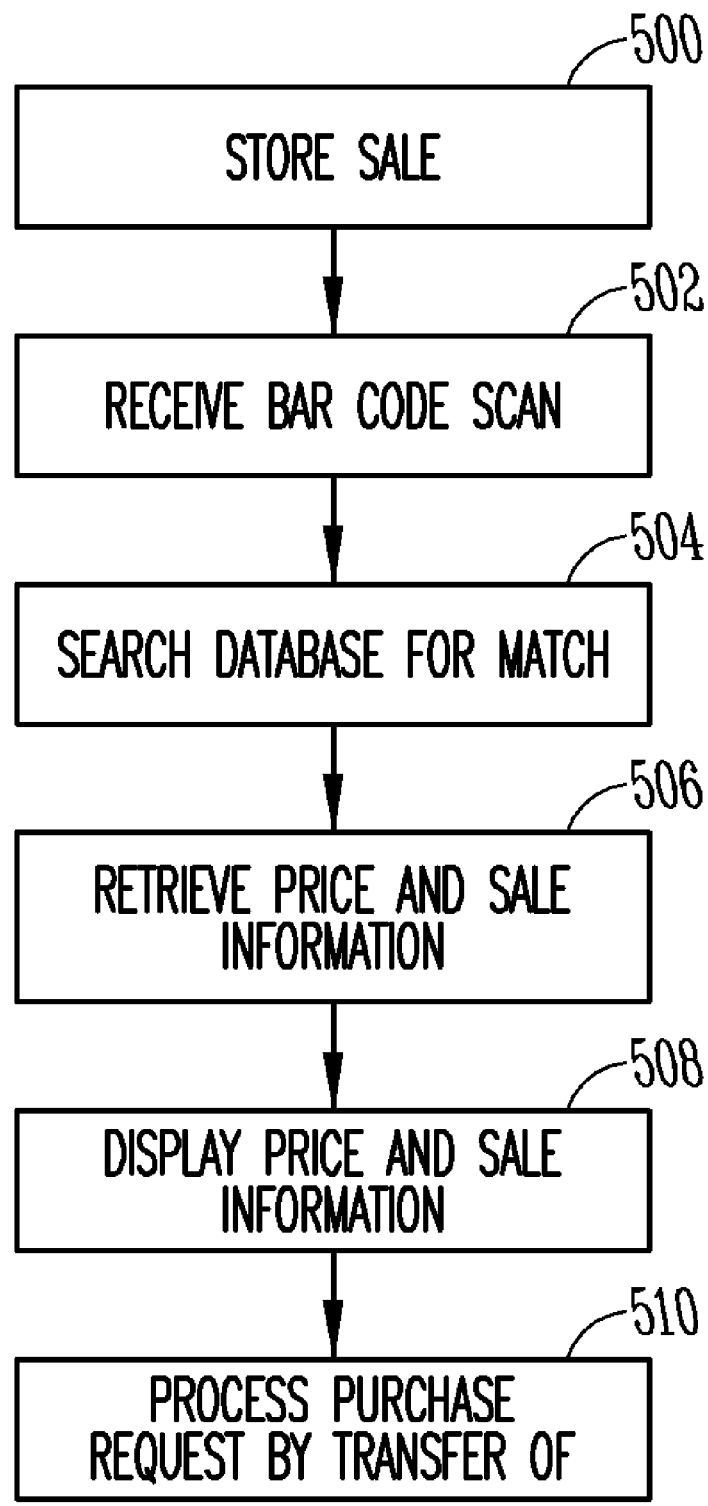
FIG. 9 is a schematic diagram showing the logical flow for a consignment node in-store sale of a good.

FIG. 9 shows a logical flow diagram of the process that may be use to transact the transfer of ownership of goods on a consignment node at the store where a consignment node may be located. The consignment node user invokes the store sale sub-routine 500 from a consignment node user terminal, see FIG. 1. The consignment node user may use the bar code scanner to scan the bar code of the good for sale 502. It is understood that the consignment node user may manually recall or search the consignment node database for the data record of the good or may let the consignment node software use the bar code to automatically retrieve the record 504. The data record is then scanned to retrieve price and sale information on the good 506. It is important to note that a good, while on display at a consignment node user's shop may have transferred ownership and changed price via network participants. The consignment node then displays this information 508 at the consigrunent node user terminal. The store customer may then elect to purchase the good. The consignment node may process a store customer purchase request by calling the appropriate sub-routine to transfer ownership, see FIG. 7, of the good.

Figure 10:
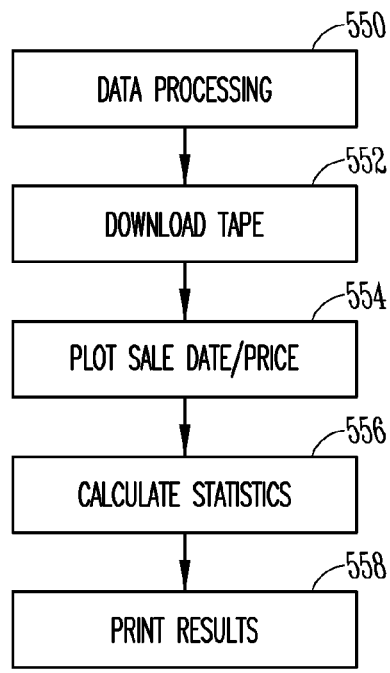
FIG. 10 is a schematic diagram showing the logical flow of post-processing and analyzing consignment node sales.

FIG. 10 shows a logical process diagram for the central node to collect and process data concerning transactions on a plurality of consignment nodes and provide value added feed back to consignment node users on market positions and trends. Data processing 550 may be executed on a consignment node or the central node to extract transaction data from a consignment node. It is understood that the tape drive, or storage device may be used to log network transactions on the posting, auctioning, buying and selling of goods and collectibles on a consignment node. This information may be collected by the central node over the consignment node network. The central node may then plot sales, sale date, price over time and the like to create graphs of market performance 554. It is understood that the data correlation and processing steps 554, 556 may, be customized to provide a particular consignment node user with useful market information. The central node may also provide hard copies or electronically transfer the information to the consignment node users. It is understood that this may be a value added feature of a service that may be provided by a franchiser. It is understood that the central node may log into a consignment node, with well known remote processing and data transfer techniques such as the logon and FTP UNIX utilities to make changes to the aforesaid virtual advertising space on a consignment node.

Figure 11:
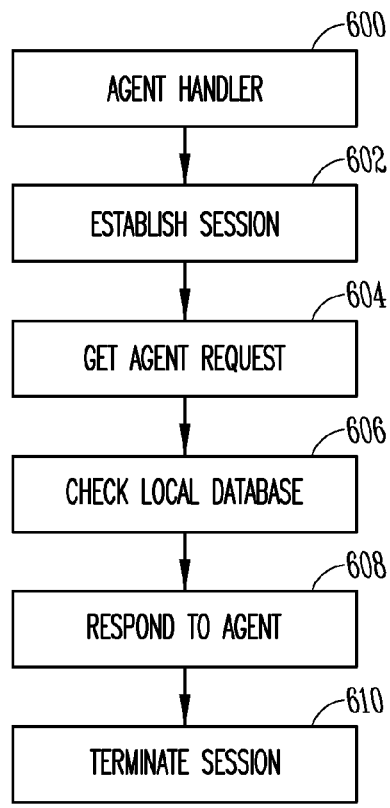
FIG. 11 is a schematic diagram showing the logical flow of the consignment node Agent handler subroutine.

FIG. 11 shows the agent handler the consignment node may use to establish agent-to-agent and consignment node-to-consignment node connections to process participant agent requests. The agent handler 600 may be entered by a predetermined series of codes and verification procedures to verify a request for an agent connection to the consignment node is from a bona fide agent and a bona fide consignment node. Once this is verified the agent handler may establish a session for the requesting agent 602. The requesting agent may then transfer its agents request to the consignment node 604 and the consignment node may then check its local database 606 to try to match the agents search request. The agent handler may then respond to the agents request 608 and terminate the agent session 610.

Figure 12:
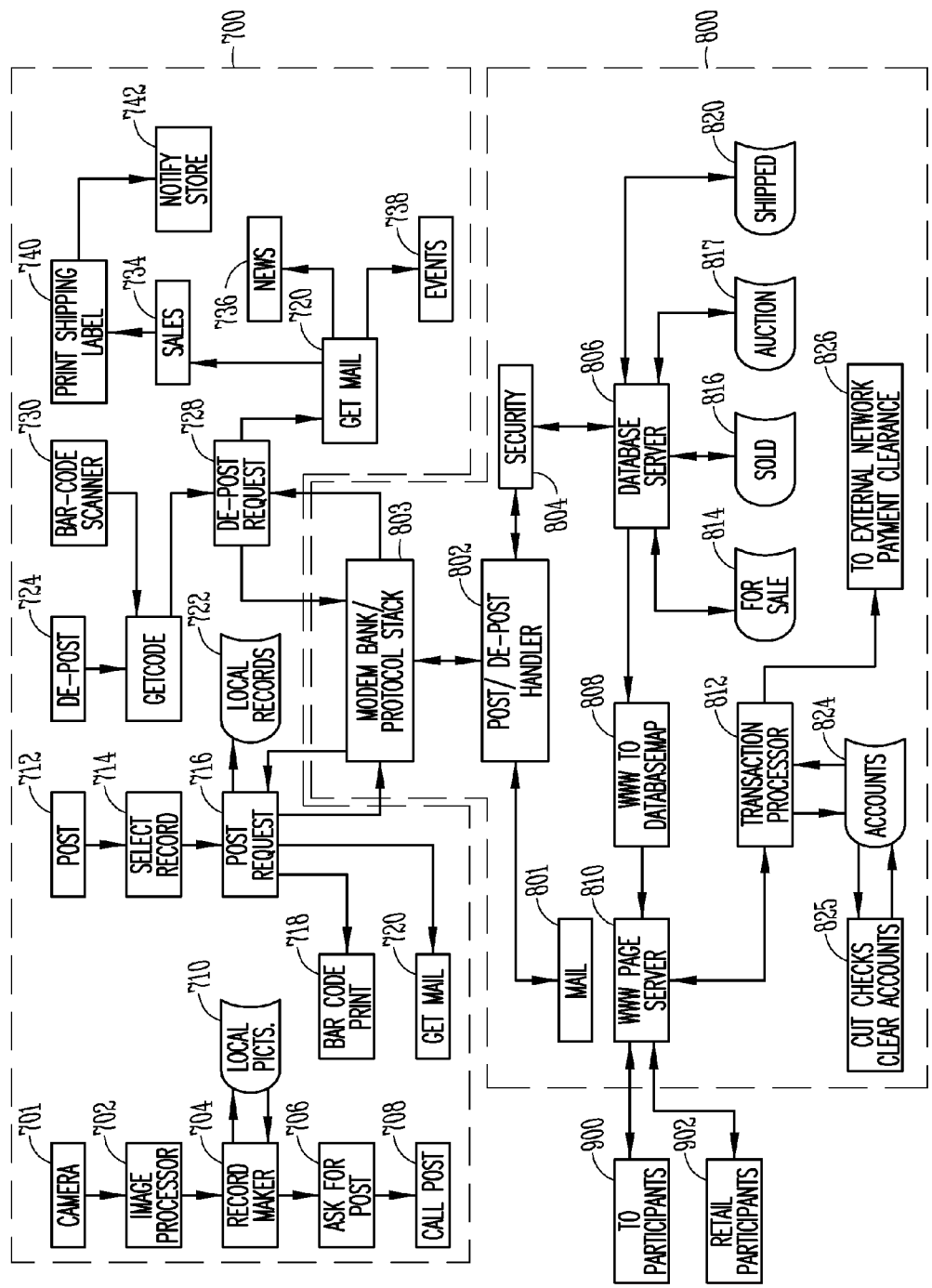
FIG. 12 is a block diagram of the posting terminal to market maker computer connections.

A second embodiment to the present invention, shown in FIG. 12, uses a low cost portable "posting" terminal to allow the virtual presentment of goods to market. The posting terminal has a digital camera, a bar code printer, a bar code scanner, a modem and posting terminal software. The posting terminal works in conjunction with a market maker computer. The market maker computer has a database of goods for sale, a posting/de-posting communication handler, a database to world wide web (www) mapping module, a www server, a transaction process, a posting terminal communication manager, a sold database, a shipping database and an account database and has much of the functionality of the previously described consignment node.

The posting terminal and market maker computer functional block diagram is shown in FIG. 12. The posting terminal has a camera interface 701, and image processing module 702, a record maker module 704, a storage unit 710, for storing images and records that have not been posted, a post module 712, a select records module 714, a post request module 716, a print bar code module 718, a get mail module 720, a storage unit for holding posted records and return codes 722, a depost module 724, a get code module 726, and de-post request module 728, a bar code scanner interface 730, another instance of the get mail module 720, a mail sales routine 738, a print shipping label routine 740, a notify store routine 740, and a check sales module 734. The posting terminal 700 contacts a market maker computer 800 to check sales, to post goods, to de-post goods and to receive mail. The posting terminal 700 is easier to administrate than a consignment node because it behaves like a retail point-of-sale terminal to manage goods that have been posted and are locally sold. The bar code labeling and scanning routines and methods make it easy for the posting terminal user to maintain an accurate account of what goods have been posted, de-posted, sold and/or shipped. The posting terminal may use an MS-DOS or MS-WINDOWS operating system that is much easier for a small store owner to operate and administer than a complex multi-user system like UNIX or WINDOWS NT.

The posting terminal 700 functionality begins with a user taking a digital picture with the posting terminal digital camera and connecting the digital camera to the camera interface module 701. The user selects an icon on a graphical user interface generated by the posting terminal software to pull the digital pictures from the digital camera. It is understood that other input devices such as scanners and the like may be use in place of the digital camera. The image process module 702 may convert the digital picture to a compressed data format such, as JPEG or MPEG, more suitable for communication of the image across a data link It is understood that the image may keep it's full resolution for posting. The posting terminal then invokes the record maker routine 704. The record maker routine 704 may display the image or allow the user to select an image from storage unit 710. The record maker may display on a posting terminal display a data entry record with pre-defined text fields, number fields, "buttons," knobs and other graphical user interface objects to allow a user to enter data to complete a posting record.

Figure 13:
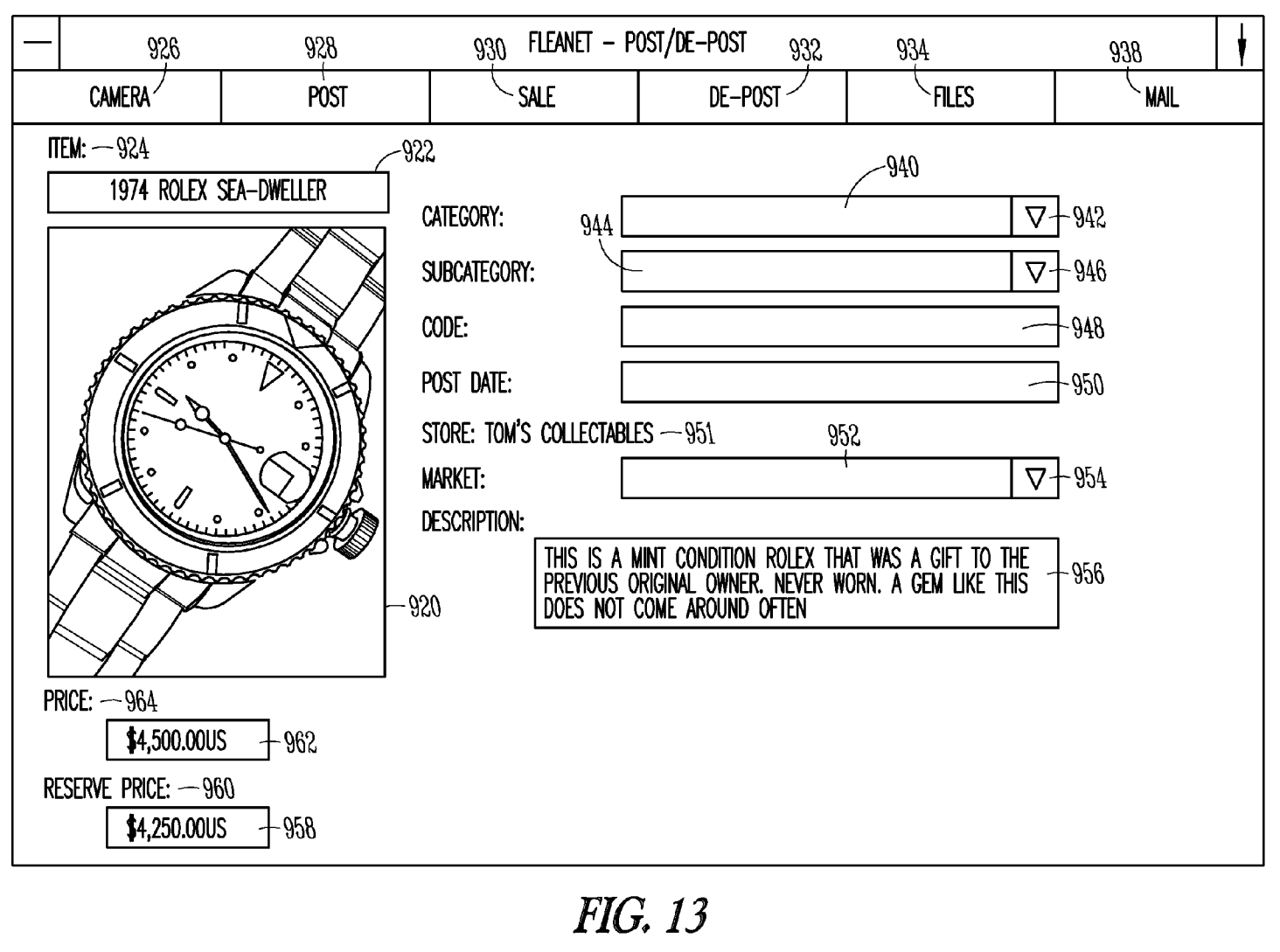

FIG. 13 shows an example of a graphical user interface that may be presented to a posting terminal 700 user. The graphical user interface for the posting terminal 700 may include an image of the item represented by the record 920, a description of the item 922, and 924, the "push button" commands to receive pictures from the digital camera 926, to post a record 928, to clear a local sale 930, to de-post a record 932, to access files of records 934, to view and/or receive and send mail 938, a database category field 940 with a pull down selection bar 942, a database subcategory 944 with a pull down selection bar 946, a code field 948, a posting date field 950, a store identification 951, a market designator field 954, a description field 956, a reserve or wholesale price field 958, and identifier 960, a retail or full price field 962 and identifier 964. The category 940 and sub-category 944 data fields are restricted to selections that can be made by the respective pull down bars 942 and 946. This aids the posting terminal operator in selecting the correct market for the good when creating a record and assures that all records can properly link into a market computer 900 market database. A file may be stored at posting terminal 700 that corresponds to database structure at the market maker computer 800. Having the database structure in a file at posting terminal 700 may allow the posting terminal to receive updates by remote file transfer techniques, such as the KERMIT, FTP, xmodem and ymodem protocols. It is understood that certain selections from the market category 940 and subcategory fields may be "greyed" or that is blocked from selection by a posting terminal 700 user to enforce a franchise and/or license grant that only allows posting in a certain field. This may allow a franchising scheme that restricts a franchisee to a field of use and/or category of goods. The code field 948 displays the bar code data in text form that the market maker computer 900 sends to the posting terminal 700 when a record is successfully posted. Therefore, the code field 948 can serve as a quick visual confirmation to the posting terminal user that the displayed record has been posted. The market field 952 may also be a restricted selection field accessible by pull down selection bar 954. Fields selectable by the market field 952 may include auction, on sale, hold and the like to give additional directionality to the record posting. The price 964 and reserve price fields 958 may be used to structure the two-tiered market of dealer-to-dealer and retail markets. The reserve price identifier 960 and reserve price field 958 may be hidden from view to retail participants. A dealer may be provided with special logon identifications and passwords to view the reserve price 958 and reserve price indicator 960. This feature encourages franchisees to use the electronic market for collectable goods dealer participant interface to generate local sales.

The posting terminal 700 user enters descriptions such as the name of the item, the sale price of the item, and a brief description of the item and the like to compose a record. It is understood that a posting terminal user may enter a retail price and a wholesale price. The retail price may then be displayed to participants 900. Other retail participants 902 may receive the wholesale price. It is understood that this two-tiered pricing scheme may be used to network retail store owners to provide additional incentives for the retail participants to use the network to locate goods and generate sales at the retail point of sale. For example, a retailer may charge the retail price for goods to store customers, while obtaining the benefits, e.g. the profit margin of wholesale or discounted pricing for goods. It is understood that the restricted fields are coordinated with the structure of the For-Sale database 814 to guide a posting terminal 700 user in the proper selection of a market category and subcategory of the posting of a good. Categories may include jewelry, rugs and tapestry, tools, quilts, furniture, art deco, books, pens, coins, stamps and costumes and clothing. Subcategories may include painting and drawings, sculpture, vintage clothing, costumes, shoes, bags, hats, wedding gowns, furs, rug types and the like to structure the database. The user may also select from a list box what category and sub-category from restricted fields in which to post a good. Referring back to FIG. 12, the user may store a composed record on the storage device 710. The record maker routine may also contain a command button 706 to immediately post the record 708. It is understood that the user may designate a time at which the posting terminal 700 may automatically contact the market maker computer 800 and post the selected goods. The post request 716 module may allow a user to select records from storage unit 710 or as in the case where the user selected the immediate post command 708, the post module 712 may accept a record as an input. The ability of the posting terminal 700 to store and select records for posting asynchronously from when a record is created allows a user to compose records when the posting terminal is isolated from communication with a market maker computer 800. The post module 712 may invoke the post request module 716 to post the designated records on the market and make a virtual presentment of a good. Rules and procedures may be imposed on the posting terminal 700 user through licensing and franchise agreements. Such rules may include the requirement that all goods posted must be in the physical and legal possession of the posting terminal franchisee or licensee, that legal possession of a good may be obtained by lawful ownership or through a franchise approved bailment or consignment contract. It is understood that these rules and legal framework may be imposed to allow the posted record to convey a legal title to a good such that the ownership designated in the record grants lawful ownership to the good designated by the record. The post request module 716 may use a communication package and protocols to transfer the records to the market maker computer 800. Communication libraries are packaged and are commercially available from WCSC 2740 S. Dairy Ashfor, Suite 188, Houston Tex. 77077 and from Marshallsoft Computing, Inc. at P.O. Box 4543 Huntsville, Ala. 35815. The communication protocols such as FTP and KERMIT may be enhanced by using known encryption and authentication techniques to provide an ultra-secure posting interface. The posting record may also include a header that identifies a store identification, user identification, passwords and the like to allow the market maker computer 800 to verify authenticity, approve authorization and track usage of the posting terminal 700 by a particular posting terminal 700 and posting terminal user.

The market maker computer 800 may verify and accept a record and generate and send a unique bar code number for each record. The bar code number may contain a code that identifies a posting terminal 700. The posting terminal accepts the bar code and places the code in the appropriate record. The unique code generated for each successfully posted record may serve as confirmation that a good has been successfully posted. The record may then be stored on storage unit 722 as a confirmed posted record. When the posting terminals' post request module 716 is finished, the posting terminal 700 or the market maker computer 800 may invoke a mail update routine 720 to pass mail from the market maker computer 800 to the posting terminal 700. Mail topics may include sales information 734, network news 736, and notification of upcoming events 738. The de-post module 724 may use the bar code scanner 730 to receive a posted collectible's identification code. The depost module 724 may call the de-post request routine 728 to establish communications between the posting terminal 700 and the market maker computer 800. The de-post request module 728 sends the item or collectible bar code to the post/de-post handler 802. The post/de-post handler 802 may remove the collectible identified by the bar code from the for-sale database 814, if the de-posting terminal identification has legal title to the identified collectible as indicated in a for-sale record, the market maker computer 800 may send a de-post confirm code to the posting terminal 700. The posting terminal 700 may process the confirm signal by indicating that the de-posting procedures was performed. If legal title to the posted collectible good does not belong to the deposting requesting entity, e.g., the deposting terminal 700 then indicated by the posting terminal identification, the market maker computer 800 may report the collectible good status, e.g., sold!, to the de-post request module 728. This may indicate to the posting terminal user that a bailee relationship now exists between the store and the new legal owner. It is understood that this bailee relationship may be contractually created and enforced through the franchise contract between the posting terminal user and the franchise granting authority. It is also understood that the bailee agreement may be for a predetermined time and/or require the posting terminal user to hold a good for a predetermined time and/or ship the good to a long term storage facility to ease the bailee burden of posting terminal users where a participant elects to hold legal ownership but keep the good available in the electronic market place for the long term. It is understood that a bond and/or insurance requirements may be required for the posting terminal user and/or the long term storage facility to provide assurance to a long term collectible investor that the risk of loss of the collectable good asset is maintained or at least hedged against loss. It is understood that a good may have sold and the new owner has elected to re-sell the good at a higher price. In this instance, the de-posting terminal will be advised that the good has been sold and advised of the new sales price. The posting terminal may then transact the local sale at the new price. After the de-post request module 728 is finished it may invoke or the market maker computer 800 may invoke the get mail routine 720 to send mail between the market maker computer 800 and the posting terminal 700. It is understood that through the procedures of generating a unique code for each posted good, checking a unique code that identifies each posting terminal 700 against the legal owner entry in a posted good on the market maker computer 800 the database of for-sale goods 814 will be extremely reliable and accurate and assure that a locally sold goods that have already been sold on the market maker computer 800 will not be inadvertently sold twice. The procedures, when used in conjunction with the rules and procedures imposed on the posting terminal user through a franchising or licensing legal framework assure that (1) when a record of a good is found on the market maker computer 800 by a participant 900 or another retailer 902, it is in fact for-sale and is in the physical and legal possession of a "trusted" franchise and (2) that when a bona fide purchase price is tendered by a participant 900 or another retailer 902 the legal title to a good as represented by the record will transfer to the buyer with an immediate or nearly immediate finality to the transaction. This frame work of trusted franchisee, high confidence and accurate market database, and the legal finality of transaction, where the legal transaction/"cash" clearing function is performed by the market maker computer, e.g., the participant credit card number or other payment means is only revealed and brokered by the market maker computer 800, is a massive step toward building confidence and trust between a small collectable merchant and participant with electronic transactions. These procedures may be used to give assurances and create trust to participants, who for example would like to buy and art deco collectable from a collectable shop in Russia but is very reluctant to send credit card information to an unknown Russian collectable shop for the obvious concerns of credit card fraud and/or fraud in the bona fides of the collectable good itself. Here, however, the franchising authority polices the franchisees to revoke the franchise if a fraud and/or misrepresentations of the bona fides of a collectable good is taking place by the posting terminal user and the assurance that credit card numbers are only revealed to the market maker computer 800 and not accessible to the, in this example, the Russian collectable store. This allows the Russian collectible store to receive the business good will of the electronic collectible market place of the present invention to establish immediate trust with prospective electronic customers.

The market maker computer 800 may have mail module 801, a post/de-post handler module 802, a security module 804, database server 806, a database to www map module 808, a www page server 810, a transaction processor 812, a for-sale database 814, a sold database 816, a shipped database 820, and an account database 824. A www to database mapping 808 module is commercially available from Expertelligence, Inc., Santa Barbara, Calif. at (805) 962-2558. Such a mapping module may map a ODBC database such as Microsoft Access to a www page. The market maker computer 800 may serve four primary functions. The first function is the call handler for processing calls from a posting terminals 700. The second function is a database to www mapping function to present participants 900 and other retailers 902 with a means to access the market database. The third function is to provide a means to process transactions from participants by clearing a transaction and transferring legal title to a good. The fourth function is to provide a means for managing the notification of the sale of a good to posting terminals 700.

The market maker computer 800 may use an accounts 824 database to track payments due to posting terminal 700 users. The clear accounts 825 module may print checks due to posting terminal 700 users. It is understood that electronic funds transfer techniques may be used for clearing account balances 825 for posting terminal users. A modem bank 803 may be used to receive posting calls from posting terminals. It is understood that the modem bank may be replaced by a network connection to the internet. At this juncture it is believed that an off-line, that is a modem bank, connection offers the best security for the posting of goods. However, it is understood that a network connection, e.g. through the internet, is within the scope of the present invention.

A security module 804 may be used to provide identification and password security. It is understood that other security and authentication techniques may be used at security module 804, It is understood that database server 806 may be an ODBC server available from many commercial database providers. Much of the market maker computers 800 functionality is disclosed above in the consignment node functionality. The databases may be structured to indicate of for-sale 814 database and sold database 816, and auction database 817 and a shipped database 820. It is understood that records may move between the databases by book entry transaction. The transaction processor 812 may use RSA certificates and/or other well-known techniques to process secured transactions between the market maker computer 800 and participants 702 and 902. It is understood that the transaction processor 812 may interface with external payment systems 826. It is understood that participant accounts may be tracked at the market maker computer 800. Moreover, it is understood that account surpluses may be acquired by participants speculating in collectable goods may be invested in highly liquid and safe assets such as U.S. Treasury bills to provide and interest bearing accounting for positive cash balances. This provides an incentive, or at least a hedge against inflation, for a participant to keep funds within the collectible market place and to use these funds to speculate in the collectible market. By using funds available at the market maker computer 800 participants can reduce the transaction costs associated with credit cards and other transaction clearing means and optimize the participants' return on price movements in the buying and selling of collectable goods. It is within the scope of the present invention to allow access to the electronic collectable market through stock brokers, banks, and other transaction providers through these providers private transaction networks, e.g., those networks that use dial in telephone lines to home computers and/or dedicated data lines. It is within the scope of the present invention to allow professional investment advisors to operate funds such as investment companies, mutual fund partnerships and the like, that use collectable goods as part of the funds assets. It is understood that the market "history" may be archived and provided to investment advisors and/or posting terminal users and/or participants on a CD-ROM or other mass storage medium to allow off-line analysis of trends in the collectable goods market. This will allow or create a new class of "learned" speculators in this unique, novel and non-obvious electronic market place and network of trusted franchisees in the collectable goods domain. It is also within the scope of the present invention to create the liquidity, volume and availability analysis to allow the creation of a secondary and derivative market for option and futures contracts and other speculative constructs to be created with the underlying assets as collectable goods in the electronic market place of the present invention.

Many variations of the present invention are possible once the present invention is known to those skilled in the arts and are within the spirit and scope of the present invention. Those skilled in the arts will be able to make many variations on the present invention once this invention is known to the arts.

What is claimed is:

1. A portable computing device for use in presenting information concerning a good, the device comprising:
    a scanner to scan a bar code associated with the good;
    a communications interface to communicate data associated with the scanned bar code over a network to a database, and to receive information concerning the good over the network from the database, wherein the information received from the database is information from a data record associated with the good, the data record selected and retrieved from the database using an identification code associated with the bar code with which the good is associated, the database storing data records associated with a plurality of goods being offered via a plurality of stores independently accessible via the Internet; and
    a user interface application to present the information concerning the good, the information received from the database and including a store identification indicating a store from which the good can be purchased.

2. The portable computing device of claim 1, wherein the information received from the database is information from a data record associated with the good, the data record selected and retrieved from the database using an identification code associated with the bar code with which the good is associated.

3. The portable computing device of claim 1, wherein the information received from the database facilitates establishing a network connection via the communications interface with a store from which the good can be purchased.

4. The portable computing device of claim 3, wherein the communications interface establishes the network connection over the Internet.

5. The portable computing device of claim 1, wherein the user interface application is facilitated via an Internet web browser.

6. The portable computing device of claim 1, wherein the information received from the database includes information to facilitate processing a user's purchase request for the good.

7. The portable computing device of claim 1, wherein the information received from the database includes information specifying a price at which the good is offered.

8. The portable computing device of claim 1, wherein the information received from the database includes information describing the good offered.

9. The portable computing device of claim 1, wherein the database to which the data associated with the scanned bar code is to be communicated is local to the portable computing device.

10. The portable computing device of claim 1, wherein the database to which the data associated with the scanned bar code is to be communicated is in the same geographical location as the portable computing device.

11. The portable computing device of claim 1, wherein the database to which the data associated with the scanned bar code is to be communicated is in the same local area network as the portable computing device.

12. The portable computing device of claim 1, wherein the database to which the data associated with the scanned bar code is to be communicated is internal to the portable computing device.

13. The portable computing device of claim 1, wherein the database to which the data associated with the scanned bar code is to be communicated is remote from the portable computing device.

14. The portable computing device of claim 1, wherein the communications interface is to communicate the data associated with the scanned bar code to the database over a public network.

15. The portable computing device of claim 1, wherein the communications interface is to communicate the data associated with the scanned bar code to a database over a private network.

16. The portable computing device of claim 1, wherein the communications interface is to communicate the data associated with the scanned bar code to a plurality of databases.

17. A method for displaying, at a portable computing device, information concerning a good, the method comprising:
   receiving a bar code associated with the good;
   communicating data associated with the bar code over a network to a database;
   receiving over the network from the database information concerning the good, wherein the information received from the database facilitates establishing a network connection via the communications interface with a computer-based store from which the good can be purchased; and
   displaying the information concerning the good, the information including a store identification indicating a store from which the good can be purchased.

18. The method of claim 17, wherein the information received from the database is information from a data record associated with the good, the data record selected and retrieved from the database using an identification code associated with the bar code with which the good is associated.

19. The method of claim 17, wherein the information received from the database is information from a data record associated with the good, the data record selected and retrieved from the database using an identification code associated with the bar code with which the good is associated, the database storing data records associated with a plurality of goods being offered via a plurality of stores independently accessible via the Internet.

20. The method of claim 17, wherein the information received from the database facilitates establishing a network connection via the communications interface with a computer hosting a second database storing information about the good.

21. The method of claim 20, wherein the communications interface establishes the network connection over the Internet.

22. The method of claim 17, wherein the information received from the database is re-rendered at the portable computing device.

23. The method of claim 17, wherein the user interface application is facilitated via an Internet web browser.

24. The method of claim 17, wherein the information received from the database includes information to facilitate processing a user's purchase request for the good.

25. The method of claim 17, wherein the information received from the database includes information specifying a price at which the good is offered.

26. The method of claim 17, wherein the information received from the database includes information describing the good offered.

27. The method of claim 17, wherein the database to which the data associated with the scanned bar code is communicated is local to the portable computing device.

28. The method of claim 17, wherein the database to which the data associated with the scanned bar code is communicated is remote from the portable computing device.

29. The method of claim 17, wherein communicating the data associated with the scanned bar code over a network to a database includes communicating the data associated with the scanned bar code over a public network to the database.

30. The method of claim 17, wherein communicating the data associated with the scanned bar code over a network to a database includes communicating the data associated with the scanned bar code over a private network to the database.

31. The method of claim 17, further comprising: communicating the data associated with the scanned bar code to a plurality of databases over the network.

32. A portable computing device for use in displaying information concerning a good, the device comprising:
   an image capture component to capture a bar code associated with the good, the bar code having an identification code identifying the good;
   a communications interface to communicate the identification code over a network to a database, and to receive information concerning the good over the network from the database, wherein the information received from the database is information from a data record associated with the good, the data record selected and retrieved from the database using an identification code associated with the bar code with which the good is associated, the database storing data records associated with a plurality of goods being offered via a plurality of stores independently accessible via the Internet; and
   a user interface application to display the information concerning the good, the information received from the database including a store identification indicating a store from which the good can be purchased.

33. The portable computing device of claim 32, wherein the identification code represents a text version of the bar code.

34. The portable computing device of claim 32, wherein the information received from the database is information from a data record associated with the good, the data record selected and retrieved from the database using the identification code.

35. The portable computing device of claim 32, wherein the information received from the database facilitates establishing a network connection via the communications interface with a computer-based store from which the good can be purchased.

36. The portable computing device of claim 32, wherein the communications interface establishes the network connection over the Internet.

37. The portable computing device of claim 32, wherein the user interface application is facilitated via an Internet web browser.

38. The portable computing device of claim 32, wherein the information received from the database includes information to facilitate processing a user's purchase request for the good.

39. The portable computing device of claim 32, wherein the information received from the database includes information specifying a price at which the good is offered.

40. The portable computing device of claim 32, wherein the information received from the database includes information describing the good offered.

41. The portable computing device of claim 32, wherein the database to which the identification code is to be communicated is local to the portable computing device.

42. The portable computing device of claim 32, wherein the database to which the identification code is to be communicated is remote from the portable computing device.

43. The portable computing device of claim 32, wherein the communications interface is to communicate the identification code to the database over a public network.

44. The portable computing device of claim 32, wherein the communications interface is to communicate the identification code to a database over a private network.

45. The portable computing device of claim 32, wherein the communications interface is to communicate the identification code to a plurality of databases.

46. The portable computing device of claim 32, wherein the image capture component includes a camera.

47. The portable computing device of claim 32, wherein the image capture component is a camera.

48. A method for displaying, at a portable computing device, information concerning a good, the method comprising:
   receiving a bar code associated with the good, the bar code encoding an identification code;
   communicating the identification code over a network to a database;
   receiving over the network from the database information concerning the good, wherein the information received from the database facilitates establishing a network connection via the communications interface with a store from which the good can be purchased; and
   displaying the information concerning the good, the information including a store identification indicating a store from which the good can be purchased.

49. The method of claim 48, wherein the identification code represents a text version of the bar code, the method further comprising: decoding the bar code to obtain the identification code.

50. The method of claim 48, wherein the information received from the database is information from a data record associated with the good, the data record selected and retrieved from the database using the identification code associated with the bar code with which the good is associated.

51. The method of claim 48, wherein the information received from the database is information from a data record associated with the good, the data record selected and retrieved from the database using the identification code associated with the bar code with which the good is associated, the database storing data records associated with a plurality of goods being offered via a plurality of stores independently accessible via the Internet.

52. The method of claim 48, wherein the information received from the database facilitates establishing a network connection via the communications interface with a computer hosting a second database storing information about the good.

53. The method of claim 52, wherein the communications interface establishes the network connection over the Internet.

54. The method of claim 48, wherein the information received from the database is re-rendered at the portable computing device.

55. The method of claim 48, wherein the user interface application is facilitated via an Internet web browser.

56. The method of claim 48, wherein the information received from the database includes information to facilitate processing a user's purchase request for the good.

57. The method of claim 48, wherein the information received from the database includes information specifying a price at which the good is offered.

58. The method of claim 48, wherein the information received from the database includes information describing the good offered.

59. The method of claim 48, wherein the database to which the identification code is communicated is local to the portable computing device.

60. The method of claim 48, wherein the database to which the identification code is communicated is in the same geographical location as the portable computing device.

61. The method of claim 48, wherein the database to which the identification code is communicated is hosted at a computer that is in the same local area network as the portable computing device.

62. The method of claim 48, wherein the database to which the identification code is communicated is internal to the portable computing device.

63. The method of claim 48, wherein the database to which the identification code is communicated is remote from the portable computing device.

64. The method of claim 48, wherein communicating the identification code over a network to a database includes communicating the identification code over a public network to the database.

65. The method of claim 48, wherein communicating the identification code over a network to a database includes communicating the identification code over a private network to the database.

66. The method of claim 48, further comprising: communicating the identification code to a plurality of databases over the network.

67. A portable computing device for use in displaying information concerning a good, the device comprising:
   image scanning means for capturing a bar code associated with the good, the bar code having an identification code identifying the good;
   communications interface means for communicating the identification code over a network to a database, and for receiving information concerning the good over the network from the database, wherein the information received from the database is information from a data record associated with the good, the data record selected and retrieved from the database using an identification code associated with the bar code with which the good is associated, the database storing data records associated with a plurality of goods being offered via a plurality of stores independently accessible via the Internet; and
   a user interface means for displaying the information concerning the good, the information received from the database including a store identification indicating a store from which the good can be purchased.

68. The portable computing device of claim 67, wherein the identification code represents a text version of the bar code.

69. The portable computing device of claim 67, wherein the information received from the database is information from a data record associated with the good, the data record selected and retrieved from the database using the identification code.

70. The portable computing device of claim 67, wherein the information received from the database facilitates establishing a network connection via the communications interface means with a computer-based store from which the good can be purchased.

71. The portable computing device of claim 67, wherein the communications interface means establishes the network connection over the Internet.

72. The portable computing device of claim 67, wherein the user interface means is facilitated via an Internet web browser.

73. The portable computing device of claim 67, wherein the information received from the database includes information to facilitate processing a user's purchase request for the good.

74. The portable computing device of claim 67, wherein the information received from the database includes information specifying a price at which the good is offered.

75. The portable computing device of claim 67, wherein the information received from the database includes information describing the good offered.

76. The portable computing device of claim 67, wherein the database to which the identification code is to be communicated is local to the portable computing device.

77. The portable computing device of claim 67, wherein the database to which the identification code is communicated is in the same geographical location as the portable computing device.

78. The portable computing device of claim 67, wherein the database to which the identification code is communicated is hosted at a computer that is in the same local area network as the portable computing device.

79. The portable computing device of claim 67, wherein the database to which the identification code is communicated is internal to the portable computing device.

80. The portable computing device of claim 67, wherein the database to which the identification code is to be communicated is remote from the portable computing device.

81. The portable computing device of claim 67, wherein the communications interface is to communicate the identification code to the database over a public network.

82. The portable computing device of claim 67, wherein the communications interface is to communicate the identification code to a database over a private network.

83. The portable computing device of claim 67, wherein the communications interface is to communicate the identification code to a plurality of databases.

\* \* \* \* \*

UNITED STATES PATENT AND TRADEMARK OFFICE
CERTIFICATE OF CORRECTION

PATENT NO. : 8,332,279 B2  
APPLICATION NO. : 12/978102  
DATED : December 11, 2012  
INVENTOR(S) : Thomas G. Woolston It is certified that error appears in the above-identified patent and that said Letters Patent is hereby corrected as shown below:

On the Title Page, Item (56)

On page 4, in column 1, under "Other Publications", line 23, before "Order", insert --"--, therefor On page 4, in column 1, under "Other Publications", line 23, after "Opinion", insert --"--, therefor On page 4, in column 1, under "Other Publications", line 23, delete "et al." and insert --et al.,--, therefor On page 4, in column 1, under "Other Publications", line 24, delete "(Oct. 18, 2002)." and insert --(Oct. 21, 2002).--, therefor On page 4, in column 1, under "Other Publications", line 28, delete "http;" and insert --http:--, therefor On page 4, in column 1, under "Other Publications", line 42, delete "Inc." and insert --Inc.,--, therefor On page 4, in column 1, under "Other Publications", line 49, delete "INternet" and insert --Internet--, therefor On page 4, in column 1, under "Other Publications", line 59, before "Order", insert --"--, therefor On page 4, in column 1, under "Other Publications", line 59, after "Opinion", insert --"--, therefor On page 4, in column 2, under "Other Publications", line 2, delete "5,845,362." and insert --5,845,362, PAIR printout for U.S. Patent 6,202,051.--, therefor On page 4, in column 2, under "Other Publications", line 10, delete "Inc." and insert --Inc.,--, therefor On page 4, in column 2, under "Other Publications", line 12, delete "Inc." and insert --Inc.,--, therefor Signed and Sealed this  
Twenty-fifth Day of November, 2014

Michelle K. Lee  
*Deputy Director of the United States Patent and Trademark Office*

On page 4, in column 2, under "Other Publications", line 14, delete "Inc." and insert --Inc.,--, therefor On page 4, in column 2, under "Other Publications", line 16, delete "Inc." and insert --Inc.,--, therefor On page 4, in column 2, under "Other Publications", line 18, delete "Inc." and insert --Inc.,--, therefor On page 4, in column 2, under "Other Publications", line 20, after "MercExchange", insert --,--, therefor On page 4, in column 2, under "Other Publications", line 23, delete "Channer" and insert --Channel--, therefor On page 4, in column 2, under "Other Publications", line 28, delete "et al." and insert --et al.,--, therefor On page 4, in column 2, under "Other Publications", line 29, after "U.S.C.", delete "Ã?Â", therefor On page 4, in column 2, under "Other Publications", line 30, after "and", delete "Ã?Â", therefor On page 4, in column 2, under "Other Publications", line 35, delete "days.," and insert --days,--, therefor On page 4, in column 2, under "Other Publications", line 36, delete "et al." and insert --et al.,--, therefor On page 4, in column 2, under "Other Publications", line 38, delete "defenses.," and insert --defenses,--, therefor On page 4, in column 2, under "Other Publications", line 42, delete "et," and insert --et al.,--, therefor On page 4, in column 2, under "Other Publications", line 46, delete "103.," and insert --103,--, therefor On page 4, in column 2, under "Other Publications", line 48, delete "follwoing" and insert --following--, therefor On page 4, in column 2, under "Other Publications", line 50, after "Patent;", delete "(6,", therefor On page 4, in column 2, under "Other Publications", line 54, delete "Reexamination.," and insert --Reexamination,--, therefor On page 4, in column 2, under "Other Publications", line 56, delete "materrials" and insert --materials--, therefor On page 4, in column 2, under "Other Publications", line 57, delete "Reexamination.," and insert --Reexamination,--, therefor On page 4, in column 2, under "Other Publications", line 67, delete "Motions" and insert --Motion--, therefor On page 4, in column 2, under "Other Publications", line 68, delete "Patents.," and insert --Patents,--, therefor On page 4, in column 2, under "Other Publications", line 73, delete "invalid.," and insert --invalid,--, therefor On page 5, in column 1, under "Other Publications", line 1, delete "brief).," and insert --brief),--, therefor On page 5, in column 1, under "Other Publications", line 9, delete "Inc." and insert --Inc.,--, therefor On page 5, in column 1, under "Other Publications", line 10, delete "Com.," and insert --com,--, therefor On page 5, in column 1, under "Other Publications", line 13, delete "Inc." and insert --Inc.,--, therefor On page 5, in column 1, under "Other Publications", line 14, delete "Com," and insert --com,--, therefor On page 5, in column 1, under "Other Publications", line 17, delete "Inc." and insert --Inc.,--, therefor On page 5, in column 1, under "Other Publications", line 18, delete "Com.," and insert --com,--, therefor On page 5, in column 1, under "Other Publications", line 21, delete "Inc." and insert --Inc.,--, therefor On page 5, in column 1, under "Other Publications", line 29, delete "Inc." and insert --Inc.,--, therefor On page 5, in column 1, under "Other Publications", line 32, delete "Case No. 2:0." and insert --Case No. 2:01-CV-736.--, therefor On page 5, in column 1, under "Other Publications", line 36, delete "United S." and insert --United States.--, therefor On page 5, in column 1, under "Other Publications", line 40, delete "Distric." and insert --District.--, therefor On page 5, in column 1, under "Other Publications", line 46, delete "Inc." and insert --Inc.,--, therefor On page 5, in column 1, under "Other Publications", line 48, delete "Virg." and insert --Virginia.--, therefor

CERTIFICATE OF CORRECTION (continued)

U.S. Pat. No. 8,332,279 B2

On page 5, in column 1, under "Other Publications", line 61, delete "Inc." and insert --Inc.,--, therefor On page 5, in column 1, under "Other Publications", line 61, delete "Com," and insert --com,--, therefor On page 5, in column 1, under "Other Publications", line 64, delete "Distr." and insert --District.--, therefor On page 5, in column 1, under "Other Publications", line 68, delete "Commision" and insert --Commission--, therefor On page 5, in column 1, under "Other Publications", line 72, delete "Inc." and insert --Inc.,--, therefor On page 5, in column 2, under "Other Publications", line 9, after "5,845,265", insert --,--, therefor On page 5, in column 2, under "Other Publications", line 13, before "U.S.", insert --"--, therefor On page 5, in column 2, under "Other Publications", line 13, delete "1997." and insert --1997".--, therefor On page 5, in column 2, under "Other Publications", line 18, delete "Inc." and insert --Inc.,--, therefor On page 5, in column 2, under "Other Publications", line 18, delete "Com," and insert --com,--, therefor On page 5, in column 2, under "Other Publications", line 28, delete "w:01cv736" and insert --2:01-CV-736--, therefor On page 5, in column 2, under "Other Publications", line 37, after "6,202,051", insert --,--, therefor On page 5, in column 2, under "Other Publications", line 47, delete "et al." and insert --et al.,--, therefor On page 5, in column 2, under "Other Publications", line 53, after "6,202,051", insert --,--, therefor On page 5, in column 2, under "Other Publications", line 56, after "6,202,051", insert --,--, therefor On page 5, in column 2, under "Other Publications", line 59, after "6,202,051", insert --,--, therefor On page 5, in column 2, under "Other Publications", line 62, after "6,202,051", insert --,--, therefor On page 5, in column 2, under "Other Publications", line 65, after "6,202,051", insert --,--, therefor On page 5, in column 2, under "Other Publications", line 68, after "6,202,051", insert --,--, therefor On page 5, in column 2, under "Other Publications", line 71, after "6,202,051", insert --,--, therefor On page 6, in column 1, under "Other Publications", line 2, after "6,202,051", insert --,--, therefor On page 6, in column 1, under "Other Publications", line 11, delete "Inc." and insert --Inc.,--, therefor On page 6, in column 1, under "Other Publications", line 15, delete "Inc." and insert --Inc.,--, therefor On page 6, in column 1, under "Other Publications", line 25, delete "Ã§2259" and insert --§ 2259--, therefor On page 6, in column 1, under "Other Publications", line 28, delete "Dated" and insert --mailed--, therefor On page 6, in column 1, under "Other Publications", line 29, after "2005", insert --,--, therefor On page 6, in column 1, under "Other Publications", line 46, delete "K.L.C." and insert --L.L.C.--, therefor On page 6, in column 1, under "Other Publications", line 52, delete "dated" and insert --mailed--, therefor On page 6, in column 1, under "Other Publications", line 54, delete "dated" and insert --mailed--, therefor On page 6, in column 1, under "Other Publications", line 57, before "U.S.", insert --"--, therefor On page 6, in column 1, under "Other Publications", line 58, after "1995)", insert --"--, therefor On page 6, in column 2, under "Other Publications", line 19, after "103", insert --,--, therefor On page 6, in column 2, under "Other Publications", line 22, delete "(Ilegible)" and insert --(Illegible)--, therefor On page 7, in column 1, under "Other Publications", line 11, after "1997"", insert --, 12 pgs--, therefor On page 7, in column 1, under "Other Publications", line 40, after "2001"", insert --, 17 pgs--, therefor On page 7, in column 1, under "Other Publications", line 45, delete "Oct. 16, 1998" and insert --Oct. 06, 1998--, therefor On page 7, in column 2, under "Other Publications", line 17, delete "Apr. 28, 2002" and insert --Apr. 08, 2002--, therefor On page 7, in column 2, under "Other Publications", line 20, after "2004"", insert --, 25 pgs--, therefor On page 7, in column 2, under "Other Publications", line 22, after "2001"", insert --, 1 pg--, therefor On page 7, in column 2, under "Other Publications", line 48, after "2001"", insert --, 38 pgs--, therefor On page 7, in column 2, under "Other Publications", line 53, after "2000"", insert --, 2 pgs--, therefor On page 8, in column 1, under "Other Publications", line 57, after "1999"", insert --, 16 pgs--, therefor On page 8, in column 1, under "Other Publications", line 70, after "Summary", insert --mailed--, therefor On page 8, in column 2, under "Other Publications", line 30-31, delete "Response to Non Final Office Action." and insert --17 pgs.--, therefor On page 9, in column 1, under "Other Publications", line 3, delete "fFinal" and insert --Final--, therefor On page 9, in column 1, under "Other Publications", line 6, delete "Nov. 18, 2005" and insert --8 pgs--, therefor On page 9, in column 1, under "Other Publications", line 34, delete "Feb. 17, 2003" and insert --Dec. 17, 2003--, therefor On page 10, in column 1, under "Other Publications", line 2, delete "Inc.,," and insert --Inc.,--, therefor On page 10, in column 1, under "Other Publications", line 22, delete "htnl" and insert --html--, therefor On page 10, in column 1, under "Other Publications", line 41, delete "16.," and insert --16,--, therefor On page 10, in column 1, under "Other Publications", line 70, delete "Inc.,," and insert --Inc.,--, therefor On page 10, in column 2, under "Other Publications", line 5, delete "Inc." and insert --Inc.,--, therefor On page 10, in column 2, under "Other Publications", line 38, delete "corn" and insert --com--, therefor On page 10, in column 2, under "Other Publications", line 40, delete "Sothebys" and insert --Sotheby's--, therefor On page 10, in column 2, under "Other Publications", line 45, delete "Inc." and insert --Inc.,--, therefor On page 10, in column 2, under "Other Publications", line 50, delete "Inc." and insert --Inc.,--, therefor On page 10, in column 2, under "Other Publications", line 62, delete "Dateline" and insert --Dataline--, therefor On page 10, in column 2, under "Other Publications", line 68, delete "Inc." and insert --Inc.,--, therefor On page 11, in column 2, under "Other Publications", line 1, delete "Inc.,," and insert --Inc.,--, therefor On page 11, in column 2, under "Other Publications", line 7, delete "PhOct." and insert --Ph, Oct.--, therefor On page 11, in column 2, under "Other Publications", line 28, delete "Inc." and insert --Inc.,--, therefor On page 11, in column 2, under "Other Publications", line 31, delete "Inc." and insert --Inc.,--, therefor On page 11, in column 2, under "Other Publications", line 32, delete "Inc." and insert --Inc.,--, therefor On page 11, in column 2, under "Other Publications", line 35, delete "Inc." and insert --Inc.,--, therefor On page 11, in column 2, under "Other Publications", line 38, delete "Inc." and insert --Inc.,--, therefor On page 11, in column 2, under "Other Publications", line 42, delete "Inc." and insert --Inc.,--, therefor On page 11, in column 2, under "Other Publications", line 46, delete "Inc." and insert --Inc.,--, therefor On page 11, in column 2, under "Other Publications", line 48, delete "Inc." and insert --Inc.,--, therefor On page 11, in column 2, under "Other Publications", line 50, delete "Inc." and insert --Inc.,--, therefor On page 11, in column 2, under "Other Publications", line 52, delete "Inc." and insert --Inc.,--, therefor

CERTIFICATE OF CORRECTION (continued)
U.S. Pat. No. 8,332,279 B2

On page 11, in column 2, under "Other Publications", line 55, delete "Inc." and insert --Inc.,--, therefor On page 11, in column 2, under "Other Publications", line 58, delete "Inc." and insert --Inc.,--, therefor On page 11, in column 2, under "Other Publications", line 61, delete "Inc." and insert --Inc.,--, therefor On page 11, in column 2, under "Other Publications", line 64, delete "Inc." and insert --Inc.,--, therefor On page 11, in column 2, under "Other Publications", line 67, delete "Inc." and insert --Inc.,--, therefor On page 11, in column 2, under "Other Publications", line 70, delete "Inc." and insert --Inc.,--, therefor On page 11, in column 2, under "Other Publications", line 73, delete "Inc." and insert --Inc.,--, therefor On page 12, in column 1, under "Other Publications", line 1, delete "Inc." and insert --Inc.,--, therefor On page 12, in column 1, under "Other Publications", line 4, delete "Inc." and insert --Inc.,--, therefor On page 12, in column 1, under "Other Publications", line 7, delete "Inc." and insert --Inc.,--, therefor On page 12, in column 1, under "Other Publications", line 10, delete "Inc." and insert --Inc.,--, therefor On page 12, in column 1, under "Other Publications", line 13, delete "Inc." and insert --Inc.,--, therefor On page 12, in column 1, under "Other Publications", line 17, delete "Inc." and insert --Inc.,--, therefor On page 12, in column 1, under "Other Publications", line 45, delete "Inc." and insert --Inc.,--, therefor On page 12, in column 1, under "Other Publications", line 62, delete "work,," and insert --work,--, therefor On page 13, in column 1, under "Other Publications", line 12, delete "Inc.," and insert --Inc,--, therefor On page 13, in column 1, under "Other Publications", line 46, delete "66." and insert --66 pgs.--, therefor On page 13, in column 1, under "Other Publications", line 57, delete "Inc." and insert --Inc.,--, therefor On page 13, in column 1, under "Other Publications", line 65, delete "Inc." and insert --Inc.,--, therefor On page 13, in column 1, under "Other Publications", line 72, delete "Inc." and insert --Inc.,--, therefor On page 13, in column 2, under "Other Publications", line 2, delete "Inc." and insert --Inc.,--, therefor On page 13, in column 2, under "Other Publications", line 28, after "Amendment", insert --filed--, therefor On page 13, in column 2, under "Other Publications", line 46, delete "Inc." and insert --Inc.,--, therefor On page 13, in column 2, under "Other Publications", line 49, delete "IP.NET,," and insert --IP.NET,--, therefor On page 13, in column 2, under "Other Publications", line 65, delete "Chcago,IL." and insert --Chicago, IL.--, therefor On page 14, in column 1, under "Other Publications", line 3, delete "Inc." and insert --Inc.,--, therefor On page 14, in column 1, under "Other Publications", line 6, delete "Inc." and insert --Inc.,--, therefor On page 14, in column 1, under "Other Publications", line 19, delete "COM,," and insert --COM,--, therefor On page 14, in column 1, under "Other Publications", line 28, delete "Inc.,," and insert --Inc.,--, therefor On page 14, in column 1, under "Other Publications", line 53, after "09/253,014", insert --,--, therefor On page 14, in column 2, under "Other Publications", line 63, delete "Inc.,," and insert --Inc.,--, therefor On page 15, in column 1, under "Other Publications", line 69, delete "p." and insert --page--, therefor On page 15, in column 2, under "Other Publications", line 35, delete "G," and insert --G.,--, therefor On page 15, in column 2, under "Other Publications", line 55, delete "A," and insert --A.,-- therefor On page 15, in column 2, under "Other Publications", line 55, delete "Proceedings.," and insert --Proceedings,--, therefor On page 15, in column 2, under "Other Publications", line 56, delete "H," and insert --H.,--, therefor On page 15, in column 2, under "Other Publications", line 58, delete "Y," and insert --Y.,--, therefor On page 15, in column 2, under "Other Publications", line 59, delete "No. 3,," and insert --No. 3,--, therefor On page 15, in column 2, under "Other Publications", line 62, delete "vol. 29 No." and insert --vol. 29, No. 1--, therefor On page 16, in column 1, under "Other Publications", line 8, delete "W," and insert --W.,--, therefor On page 16, in column 1, under "Other Publications", line 9, delete "Bulletin,," and insert --Bulletin,--, therefor On page 16, in column 1, under "Other Publications", line 13, delete "WWW>VRX.NET," and insert --WWW.VRX.NET,--, therefor On page 16, in column 1, under "Other Publications", line 40, delete "34." and insert --34 pgs.--, therefor On page 16, in column 2, under "Other Publications", line 43, delete "E," and insert --E.,--, therefor On page 16, in column 2, under "Other Publications", line 64, delete "SLippers" and insert --Slippers--, therefor On page 17, in column 1, under "Other Publications", line 5, delete """, Stealing the Real Estate Spotlight," and insert --"Stealing the Real Estate Spotlight",--, therefor On page 17, in column 1, under "Other Publications", line 7, delete "A," and insert --A.,--, therefor On page 17, in column 1, under "Other Publications", line 9, delete "v. 304, n2914," and insert --vol. 304, No. 2914,--, therefor On page 17, in column 1, under "Other Publications", line 13, delete "Inc." and insert --Inc.,--, therefor On page 17, in column 1, under "Other Publications", line 25, delete "driving,;" and insert --driving,--, therefor

CERTIFICATE OF CORRECTION (continued)

On page 17, in column 1, under "Other Publications", line 26, delete "Calif.:," and insert --Calif.,--, therefor On page 17, in column 1, under "Other Publications", line 31, delete "51(21)." and insert --51(21),--, therefor On page 17, in column 1, under "Other Publications", line 34, delete "T," and insert --T.,--, therefor On page 17, in column 1, under "Other Publications", line 36, delete "T," and insert --T.,--, therefor On page 17, in column 1, under "Other Publications", line 40, delete """, Better Impression: Art Market Continues to Show Recovery Signs," and insert --"Better Impression: Art Market Continues to Show Recovery Signs",--, therefor On page 17, in column 1, under "Other Publications", line 58, delete "Banker,," and insert --Banker,--, therefor On page 17, in column 1, under "Other Publications", line 69, delete "papers; v.40n3," and insert --papers, vol. 40, No. 3,--, therefor On page 17, in column 2, under "Other Publications", line 11, after "R.,", delete """," therefor On page 17, in column 2, under "Other Publications", line 24, delete "M," and insert --M.,--, therefor On page 17, in column 2, under "Other Publications", line 53, delete "I," and insert --I.,--, therefor On page 17, in column 2, under "Other Publications", line 68, delete "131." and insert --131 pgs.--, therefor On page 18, in column 1, under "Other Publications", line 1, delete "R," and insert --R.,--, therefor On page 18, in column 1, under "Other Publications", line 4-5, delete, """, Declaration of Choy Heng-Wah Regarding BidBroker Software-an Electronic Auction System" and insert --"Declaration of Choy Heng-Wah Regarding BidBroker Software-an Electronic Auction System",--, therefor On page 18, in column 1, under "Other Publications", line 6, delete "eBayInc.," and insert --eBay Inc.,--, therefor On page 18, in column 1, under "Other Publications", line 13, delete "Auction.," and insert --Auction,--, therefor On page 18, in column 1, under "Other Publications", line 22, delete, """, Google Newsgroup: de.sci.medizin," and insert --"Google Newsgroup: de.sci.medizin",--, therefor On page 18, in column 1, under "Other Publications", line 35, delete "K," and insert --K.,--, therefor On page 18, in column 1, under "Other Publications", line 37, delete """, Newsgroup Posting Re: Nice Postcard for Best Answer," and insert --"Newsgroup Posting Re: Nice Postcard for Best Answer",--, therefor On page 18, in column 1, under "Other Publications", line 61, after "J.,", delete """,", therefor On page 18, in column 1, under "Other Publications", line 62, delete """," and insert --"Memorandum",--, therefor On page 18, in column 1, under "Other Publications", line 63, delete, """, Status Review and Plans," and insert --"Status Review and Plans",--, therefor On page 18, in column 1, under "Other Publications", line 64-65, delete """, Summary of Our Meeting-Intermart Mosiac HTML-Interface Design," and insert --"Summary of Our Meeting-Intermart Mosiac HTML-Interface Design",--, therefor On page 18, in column 1, under "Other Publications", line 66, delete "J," and insert --J.,--, therefor On page 18, in column 2, under "Other Publications", line 41, delete "No. 1,," and insert --No. 1,--, therefor On page 19, in column 1, under "Other Publications", line 3, delete """, Lego Sale: Auczilla is here," and insert --"Lego Sale: Auczilla is here",--, therefor On page 19, in column 1, under "Other Publications", line 5, delete """, Gallery-Hopping- and Shopping-via PCT," and insert --"Gallery-Hopping- and Shopping-via PCT",--, therefor On page 19, in column 1, under "Other Publications", line 31, delete """, Stamp Auction Via Internet? rec.collecting.stamps," and insert --"Stamp Auction Via Internet? rec.collecting.stamps",--, therefor On page 19, in column 1, under "Other Publications", line 33, delete "M," and insert --M.,--, therefor On page 19, in column 1, under "Other Publications", line 56, delete "REL" and insert --RE--, therefor On page 19, in column 1, under "Other Publications", line 57, delete "Inc.,," and insert --Inc.,--, therefor On page 19, in column 1, under "Other Publications", line 72, delete "K, """, Google Search Subject Stamps List Update," and insert --K., "Google Search Subject Stamps List Update",--, therefor On page 19, in column 2, under "Other Publications", line 33, delete "39." and insert --39 pgs.--, therefor

CERTIFICATE OF CORRECTION (continued)
U.S. Pat. No. 8,332,279 B2

On page 19, in column 2, under "Other Publications", line 36, delete "43." and insert --43 pgs.--, therefor On page 19, in column 2, under "Other Publications", line 54, delete "Inc.,," and insert --Inc.,--, therefor On page 19, in column 2, under "Other Publications", line 61, delete "J," and insert --J.,--, therefor On page 19, in column 2, under "Other Publications", line 63, delete "T," and insert --T.,--, therefor On page 20, in column 1, under "Other Publications", line 3, delete "L," and insert --L.,--, therefor On page 20, in column 1, under "Other Publications", line 10, delete "B S," and insert --B. S.,--, therefor On page 20, in column 1, under "Other Publications", line 13, delete "B" and insert --B.--, therefor On page 20, in column 1, under "Other Publications", line 40, delete "N," and insert --N.,--, therefor On page 20, in column 1, under "Other Publications", line 44, delete "W," and insert --W.,--, therefor On page 20, in column 1, under "Other Publications", line 68, delete "R," and insert --R.,--, therefor On page 20, in column 1, under "Other Publications", line 70, delete "L," and insert --L.,--, therefor On page 20, in column 2, under "Other Publications", line 4, delete "D L," and insert --D. L.,--, therefor On page 20, in column 2, under "Other Publications", line 9, delete "Mau" and insert --May--, therefor On page 20, in column 2, under "Other Publications", line 26, delete """, Ubid Adds Auction Traffic with iWon Deal," and insert --"Ubid Adds Auction Traffic with Iwon Deal",--, therefor On page 20, in column 2, under "Other Publications", line 38, delete """, MercExchange response to eBay's Appeal Brief" and insert --"MercExchange response to eBay's Appeal Brief",--, therefor On page 20, in column 2, under "Other Publications", line 40, delete "T E," and insert --T. E.,--, therefor On page 20, in column 2, under "Other Publications", line 51, delete "G>," and insert --G.,--, therefor On page 20, in column 2, under "Other Publications", line 52, delete "A??"" and insert --(fwd)--, therefor On page 20, in column 2, under "Other Publications", line 53, delete "J," and insert --J.,--, therefor On page 21, in column 1, under "Other Publications", line 17, delete "B F," and insert --B. F.,-- therefor On page 21, in column 1, under "Other Publications", line 31, delete "I," and insert --I.,--, therefor On page 21, in column 1, under "Other Publications", line 33, delete "J," and insert --J.,--, therefor On page 21, in column 1, under "Other Publications", line 52, delete "B," and insert --B.,--, therefor On page 21, in column 2, under "Other Publications", line 20, delete "Hill,Inc.," and insert --Hill, Inc.,--, therefor On page 21, in column 2, under "Other Publications", line 45, delete "M," and insert --M.,--, therefor On page 21, in column 2, under "Other Publications", line 55, delete """, M:tG Auction (winding down)-Updated No. 77," and insert --"MTG Auction (winding down)-Updated No. 77",--, therefor On page 21, in column 2, under "Other Publications", line 57, delete """, MTG: All Editions Rare and Uncommon Auction," and insert --"MTG: All Editions Rare and Uncommon Auction",--, therefor On page 21, in column 2, under "Other Publications", line 67, delete "W," and insert --W.,--, therefor On page 21, in column 2, under "Other Publications", line 72, delete "S," and insert --S.,--, therefor On page 22, in column 1, under "Other Publications", line 13, delete """, Google Newsgroup Re: Electronic Stamp Auction," and insert --"Google Newsgroup Re: Electronic Stamp Auction",--, therefor On page 22, in column 1, under "Other Publications", line 15, delete "A," and insert --A.,--, therefor On page 22, in column 1, under "Other Publications", line 27, delete "P," and insert --P.,--, therefor On page 22, in column 1, under "Other Publications", line 30, delete "P," and insert --P.,--, therefor On page 22, in column 1, under "Other Publications", line 38, delete "106." and insert --106 pgs.--, therefor On page 22, in column 1, under "Other Publications", line 57, after ""U.S. Appl. No. 13/198,609, Non Final Office Action mailed Nov. 4, 2011",7 pgs.", delete ""U.S. Appl. No. 13/198,609, Response Filed Feb. 6, 2012 to Non-Final Office Action", 7 pgs.", therefor In the Drawings On Sheet 1 of 11, Fig. 1, reference numeral 14, line 1, delete "BARCODE" and insert --BAR CODE--, therefor

CERTIFICATE OF CORRECTION (continued)
U.S. Pat. No. 8,332,279 B2

On Sheet 4 of 11, Fig. 4, reference numeral 280, line 2, delete "TERMINED" and insert --TERMINATES--, therefor On Sheet 10 of 11, Fig. 12, reference numeral 730, line 1, delete "BAR-CODE" and insert --BAR CODE--, therefor In the Specification In column 1, line 24, delete "two tiered" and insert --two-tiered--, therefor In column 1, line 52, delete "store front." and insert --storefront.--, therefor In column 1, line 55, delete "dealer to dealer" and insert --dealer-to-dealer--, therefor In column 2, line 5, delete "a" and insert --an--, therefor In column 2, line 59, delete "make" and insert --maker--, therefor In column 3, line 12, delete "database" and insert --data storage device--, therefor In column 3, line 15, after "an", delete "a", therefor In column 3, line 60, delete "15." and insert --12.--, therefor In column 4, line 32, delete "for example 6%," and insert --for example, 6%--, therefor In column 7, line 35, delete "it" and insert --is--, therefor In column 7, line 50, delete "Agents'" and insert --Agent's--, therefor In column 8, line 52, after "incoming", delete "15", therefor In column 9, line 14, delete "log on" and insert --get log in--, therefor In column 9, line 15, delete "on" and insert --in--, therefor In column 9, line 39, delete "participants'" and insert --participant's--, therefor In column 10, line 29-30, delete "indicated" and insert --indicates--, therefor
In column 12, line 7, delete "allows-the", insert --allows the--, therefor In column 12, line 30, delete "(PINS)," and insert --(PINs),--, therefor In column 12, line 56, delete "404" and insert --414--, therefor In column 13, line 13, delete "the-trusted" and insert --the trusted--, therefor In column 13, line 38, delete "463." and insert --462.--, therefor In column 15, line 1, delete "depost" and insert --de-post--, therefor In column 15, line 5, delete "740," and insert --742,--, therefor In column 15, line 28, after "link", insert --.--, therefor In column 15, line 48, delete "954," and insert --952,--, therefor In column 15, line 56, delete "market computer900" and insert --market maker computer800--, therefor In column 15, line 63, after "fields", insert --944--, therefor In column 16, line 2, delete "900" and insert --800--, therefor In column 16, line 10, delete "964" and insert --962--, therefor In column 16, line 16, delete "indicator" and insert --identifier--, therefor In column 16, line 29, delete "point of sale." and insert --point-of-sale.--, therefor In column 17, line 8, after "Inc.", insert --,--, therefor In column 17, line 27, delete "terminals'" and insert --terminal's--, therefor In column 17, line 29, delete "mail update", insert --get mail--, therefor In column 17, line 34, delete "depost" and insert --de-post--, therefor In column 17, line 42, delete "for-sale" and insert --for sale--, therefor In column 18, line 21, delete "for-sale" and insert --for sale--, therefor In column 18, line 36, after "example", insert --,--, therefor In column 18, line 54, delete "database to www" and insert --www to database--, therefor In column 19, line 21, delete "804," and insert --804.--, therefor In column 19, line 31, delete "702" and insert --900--, therefor In column 19, line 46, delete "participants'" and insert --participant's--, therefor In the Claims In column 22, line 19, in Claim 31, after "comprising:", insert --¶--, therefor In column 23, line 41, in Claim 49, after "comprising:", insert --¶--, therefor In column 24, line 35, in Claim 66, after "comprising:", insert --¶--, therefor